US008345952B2

(12) United States Patent
Tsujimoto et al.

(10) Patent No.: US 8,345,952 B2
(45) Date of Patent: Jan. 1, 2013

(54) IMAGE PROCESSING SYSTEM, IMAGE PROCESSING APPARATUS, IMAGE SENSING APPARATUS, AND CONTROL METHOD THEREOF

(75) Inventors: Takuya Tsujimoto, Kawasaki (JP);
Hiroyuki Yamamoto, Chigasaki (JP);
Akihiro Katayama, Yokohama (JP);
Tomohiko Shimoyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1155 days.

(21) Appl. No.: 11/734,073

(22) Filed: Apr. 11, 2007

(65) Prior Publication Data

US 2007/0242086 A1    Oct. 18, 2007

(30) Foreign Application Priority Data

Apr. 14, 2006    (JP) ................................. 2006-112757

(51) Int. Cl.
*G06K 9/00*    (2006.01)
(52) U.S. Cl. ...................................... 382/154; 382/103
(58) Field of Classification Search .................. 382/154, 382/103; 345/634, 639
See application file for complete search history.

(56) References Cited

U.S. PATENT DOCUMENTS

| | | | | |
|---|---|---|---|---|
| 6,389,153 B1* | 5/2002 | Imai et al. | ...................... | 382/106 |
| 6,549,641 B2* | 4/2003 | Ishikawa et al. | .............. | 382/103 |
| 6,759,979 B2* | 7/2004 | Vashisth et al. | .......... | 342/357.31 |
| 6,968,084 B2* | 11/2005 | Satoh | ............................ | 382/190 |
| 6,972,370 B2* | 12/2005 | Wang et al. | ................... | 174/535 |
| 6,990,429 B2* | 1/2006 | Anabuki | ....................... | 702/150 |
| 7,427,996 B2* | 9/2008 | Yonezawa et al. | ............ | 345/629 |
| 7,529,387 B2* | 5/2009 | Kotake et al. | ................. | 382/103 |
| 7,693,702 B1* | 4/2010 | Kerner et al. | ................... | 703/22 |
| 7,991,220 B2* | 8/2011 | Nagai et al. | .................... | 382/154 |
| 2003/0156144 A1* | 8/2003 | Morita | ......................... | 345/848 |
| 2004/0021664 A1* | 2/2004 | Takemoto et al. | ........... | 345/419 |
| 2004/0041822 A1* | 3/2004 | Iizuka et al. | ................... | 345/634 |
| 2004/0066417 A1* | 4/2004 | Anabuki et al. | .............. | 345/848 |

FOREIGN PATENT DOCUMENTS

| | | |
|---|---|---|
| JP | 11-088913 | 3/1999 |
| JP | 2002-112286 A | 4/2002 |
| JP | 2003-204481 A | 7/2003 |
| JP | 2003-256876 A | 9/2003 |
| JP | 2004-355131 A | 12/2004 |
| JP | 2005-182350 A | 7/2005 |

(Continued)

OTHER PUBLICATIONS

Marker tracking-system., Kato et al., INSPEC, 1999, 10.1109/IWAR, pp. 85-94.*

(Continued)

*Primary Examiner* — Jayesh A Patel
(74) *Attorney, Agent, or Firm* — Cowan, Liebowitz & Latman, P.C.

(57) ABSTRACT

A first process to be executed by an apparatus and a second process to be executed by an apparatus to obtain a composite image by compositing a real space image with a virtual space image are determined by negotiation. The apparatus (101) transmits data necessary for executing the second process to the apparatus. The apparatus executes the second process by using the data and transmits the process result to the apparatus. The apparatus receives the process result by the apparatus and executes the first process. The apparatus displays a composite image obtained on the basis of the result of the first process or a composite image obtained on the basis of the process result and the received process result.

8 Claims, 37 Drawing Sheets

FOREIGN PATENT DOCUMENTS

JP        2005-228140 A    8/2005

OTHER PUBLICATIONS

Kato, H. and Billinghurst, M., "Marker Tracking and HMD Calibration for a video-based Augmented Reality Conferencing System", Proceedings of the 2nd International Workshop on Augmented Reality (IWAR 99), Oct. 1999, San Francisco USA.

T. Porter and T. Duff, "Compositing Digital Images", Computer Graphics vol. 18, No. 3 (1984).

Tomohiro Fukuzawa, et al., "Method for sharing information over the network for desktop based MR system", IEICE Technical Report, Japan, The Institute of Electronics, Information and Communication Engineers, vol. 105, No. 256, pp. 35-40, Published date Aug. 25, 2005.

The above references were cited in a Jul. 15, 2011 Japanese Office Action, which is enclosed without an English Translation, that issued in Japanese Patent Application No. 2006-112757.

* cited by examiner

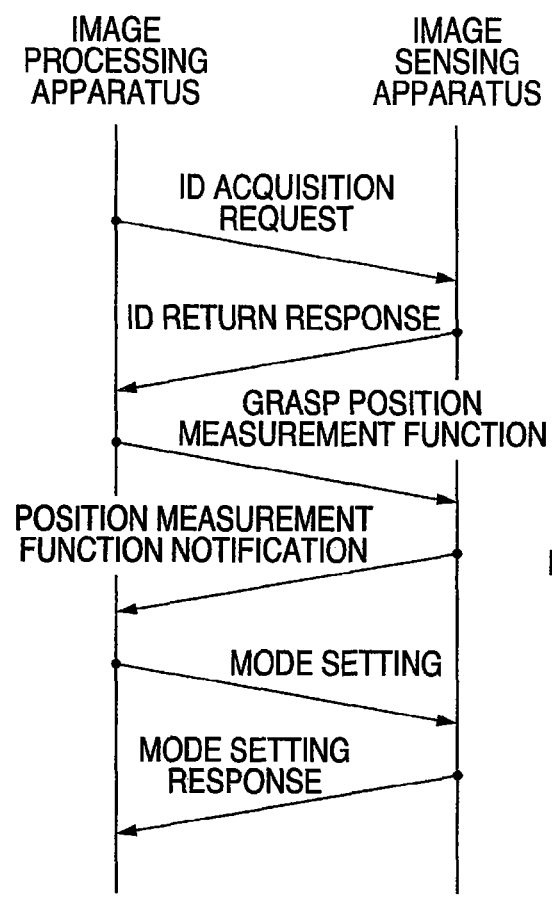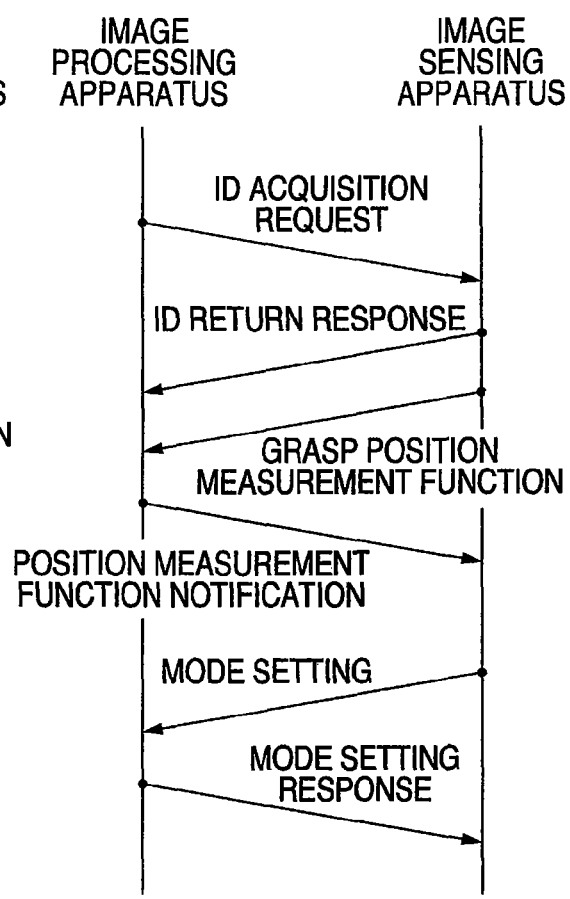

FIG. 8

| MODE | TRANSMISSION DATA ON IMAGE SENSING APPARATUS SIDE | PROCESS CONTENTS ON IMAGE PROCESSING APPARATUS SIDE | COMPOSITION PROCESS SUPPORTING APPARATUS |
|---|---|---|---|
| 1 | SENSED IMAGE DATA | POSITION MEASUREMENT (FULL FUNCTION) | IMAGE PROCESSING APPARATUS |
| 2 | SENSED IMAGE DATA + POSITION MEASUREMENT AUXILIARY DATA | POSITION MEASUREMENT (USING AUXILIARY DATA) | IMAGE PROCESSING APPARATUS |
| 3 | REDUCED IMAGE DATA | ENLARGEMENT PROCESS + POSITION MEASUREMENT (FULL FUNCTION) | IMAGE PROCESSING APPARATUS |
| 4 | REDUCED IMAGE + POSITION MEASUREMENT AUXILIARY DATA | ENLARGEMENT PROCESS + POSITION MEASUREMENT (USING AUXILIARY DATA) | IMAGE PROCESSING APPARATUS |
| 5 | REDUCED IMAGE | POSITION MEASUREMENT (FULL FUNCTION) | IMAGE SENSING APPARATUS |
| 6 | LUMINANCE DATA | FROM BINARIZATION PROCESS | IMAGE SENSING APPARATUS |
| 7 | BINARY DATA | FROM MARKER EXTRACTION | IMAGE SENSING APPARATUS |
| 8 | MARKER INFORMATION | FROM CONVERGENCE CALCULATION | IMAGE SENSING APPARATUS |
| 9 | POSITION AND ORIENTATION INFORMATION | NO PROCESS | IMAGE SENSING APPARATUS |

F I G. 32
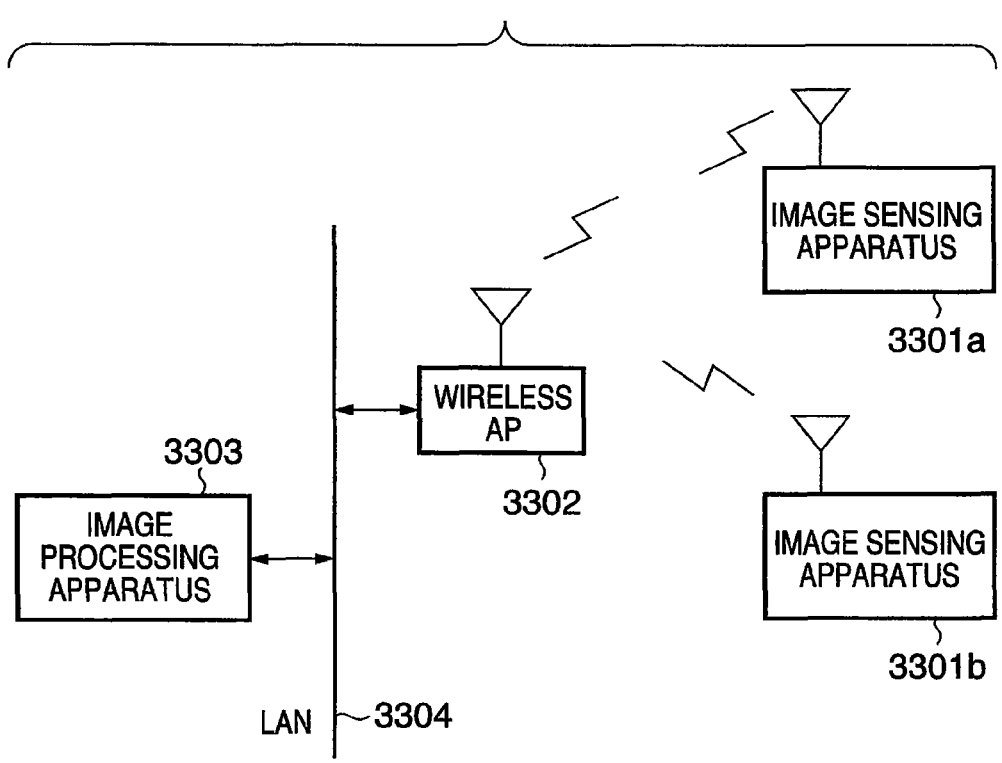

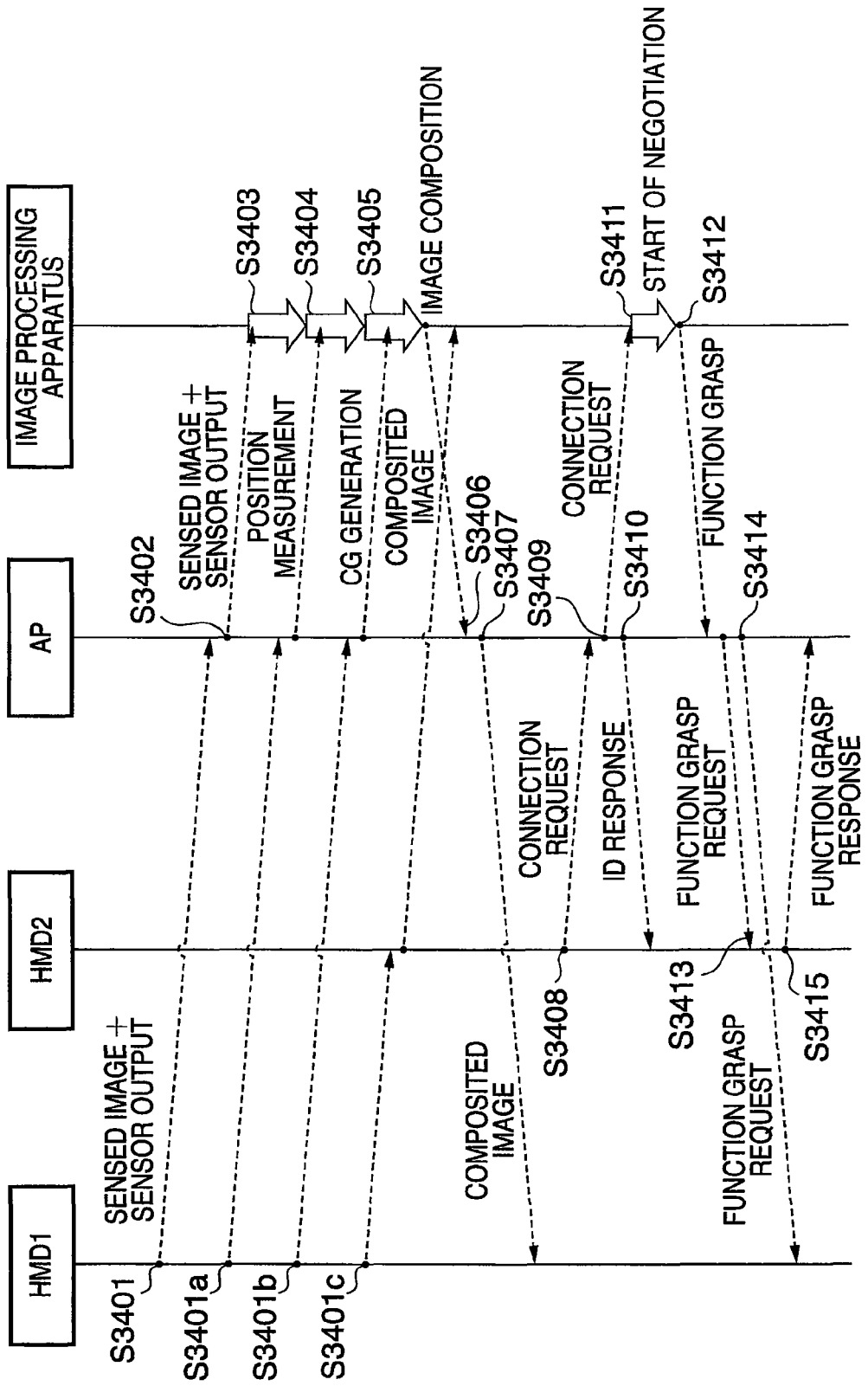

F I G. 34

| MODE | TRANSMISSION DATA ON IMAGE SENSING APPARATUS SIDE | TRANSMISSION DATA ON IMAGE PROCESSING APPARATUS SIDE | POSITION MEASUREMENT SUPPORTING APPARATUS | COMPOSITION PROCESS SUPPORTING APPARATUS |
|---|---|---|---|---|
| 1 | SENSED IMAGE DATA | COMPOSITED IMAGE | IMAGE PROCESSING APPARATUS | IMAGE PROCESSING APPARATUS |
| 2 | SENSED IMAGE DATA + POSITION MEASUREMENT AUXILIARY DATA | COMPOSITED IMAGE | IMAGE PROCESSING APPARATUS | IMAGE PROCESSING APPARATUS |
| 3 | SENSED IMAGE DATA (DATA REDUCTION) | COMPOSITED IMAGE | IMAGE PROCESSING APPARATUS | IMAGE PROCESSING APPARATUS |
| 4 | SENSED IMAGE DATA (DATA REDUCTION) + POSITION MEASUREMENT AUXILIARY DATA | VIRTUAL IMAGE | IMAGE PROCESSING APPARATUS | IMAGE SENSING APPARATUS |
| 5 | POSITION MEASUREMENT INFORMATION | VIRTUAL IMAGE | IMAGE SENSING APPARATUS | IMAGE SENSING APPARATUS |
| 6 | POSITION MEASUREMENT INFORMATION | VIRTUAL IMAGE + $\alpha$ CHANNEL | IMAGE SENSING APPARATUS | IMAGE SENSING APPARATUS |

IMAGE PROCESSING SYSTEM, IMAGE PROCESSING APPARATUS, IMAGE SENSING APPARATUS, AND CONTROL METHOD THEREOF

BACKGROUND OF THE INVENTION

1. Field of the Invention

The present invention relates to a technique of providing a composite image obtained by compositing a real space image and a virtual space image.

2. Description of the Related Art

Mixed reality, i.e., so-called MR is recently known as a technology of merging a real world and a virtual world seamlessly in real time. There is an MR technology using a video see-through HMD (Head Mounted Display). An object almost matching an object observed from the pupil position of an HMD wearer is sensed by, e.g., a video camera. A CG (Computer Graphics) image is superimposed on the sensed image to generate a mixed reality image. The mixed reality image is provided to the HMD wearer.

FIG. 29 is a block diagram showing the functional arrangement of a general mixed reality system using a video see-through HMD. As shown in FIG. 29, the system includes an image processing apparatus 3002 and a video see-through HMD 3001.

As shown in FIG. 29, the video see-through HMD 3001 includes an image sensing unit 3003 that senses the outside world, a display unit 3004 that displays an MR image obtained by compositing a real space image sensed by the image sensing unit 3003 with a CG image, a three-dimensional position and orientation sensor unit 3005 to calculate the position and orientation of the viewpoint of the video see-through HMD 3001, and an I/F 3006 functioning as an interface for data communication with the image processing apparatus 3002.

The image processing apparatus 3002 generates a CG image on the basis of the sensed image and three-dimensional position and orientation information received from the video see-through HMD 3001 and generates a composite image by compositing the CG image with the sensed image. Generally, an apparatus such as a personal computer or workstation with an advanced calculation processing function and graphic display function is used as the image processing apparatus 3002.

The image sensing unit 3003 senses an observation image in the outside world which can be seen from a viewpoint almost matching that of the observer who is wearing the video see-through HMD 3001 on the head. More specifically, the image sensing unit 3003 includes two sets of image sensing elements and optical systems which respectively correspond to the right and left eyes and generate a stereoscopic image, and a DSP that executes an image process of the succeeding stage.

The display unit 3004 displays the composite image of the sensed image and CG image. The display unit 3004 also includes two sets of display devices and optical systems for the right and left eyes. A small liquid crystal device or a retina scan type device by MEMS is used as the display device.

The three-dimensional position and orientation sensor unit 3005 obtains the position and orientation information of the viewpoint of the observer. The three-dimensional position and orientation sensor unit 3005 uses a magnetic sensor or a gyro sensor (acceleration and angular velocity).

The I/F 3006 transmits a real space image sensed by-the image sensing unit 3003 and position and orientation information measured by the three-dimensional position and orientation sensor unit 3005 to the image processing apparatus 3002 and receives a composite image generated on the side of the image processing apparatus 3002. The I/F 3006 that is required to transmit an enormous quantity of data in real time uses a metal line such as a USB or IEEE1394 or an optical fiber such as GigabitEthernet.

The components of the image processing apparatus 3002 will be described next.

An I/F 3007 on the side of the image processing apparatus 3002 functions as an interface for data communication with the video see-through HMD 3001.

A position and orientation information generation unit 3008 obtains the position and orientation of the viewpoint of the observer. To do this, the position and orientation are obtained by using the position and orientation information received from the three-dimensional position and orientation sensor unit 3005. In addition, a marker in the sensed image from the video see-through HMD 3001 is extracted, and the position and orientation are corrected on the basis of the marker position.

A content DB (database) 3009 holds data to be used to display each virtual object included in a virtual space. A CG rendering unit 3010 forms a virtual space by using the data stored in the content DB 3009 and generates a virtual space image (CG image) observed from the viewpoint of the position and orientation based on the position and orientation information generated by the position and orientation information generation unit 3008.

An image composition unit 3011 generates a composite image (MR image) by compositing a CG image generated by the CG rendering unit 3010 with a sensed image received from the video see-through HMD 3001 and sends the composite image to the video see-through HMD 3001 via the I/F 3007. The display unit 3004 displays the received composite image, as described above.

With the above-described arrangement and process, the observer who wears the video see-through HMD 3001 on the head can experience, before his/her eyes, a mixed reality space obtained by merging a real space and a virtual space seamlessly in real time.

Japanese Patent Laid-Open No. 11-88913 discloses a general MR technology and system configuration (FIGS. 7A and 7B; paragraph No. 0035).

However, the above-described prior art has the following problems.

To obtain a more real MR space, the resolution and tonality of the sensed image and CG image (virtual image) must be high. To display a more smooth moving image, a higher frame rate is necessary. To meet these requirements, the data amount of a sensed image and MR image dramatically increases. The transmission band to transmit/receive the data is also required to be very wide. Especially when data transmission is done by wireless communication, the transmission band is limited as compared to a wired system. It is therefore very difficult to simultaneously ensure a high resolution, a high tonality, and a high frame rate for moving image display and real-time image display with a minimum delay time.

Image processing for accurate registration is executed only on the side of the image processing apparatus, i.e., one of the apparatuses included in the system. For this reason, the load is heavy. The time required for information processing for registration mainly executed by software is also increasing. This may hinder implementation of MR that should minimize the delay.

SUMMARY OF THE INVENTION

The present invention has been made in consideration of the above-described problems, and has as its object to provide a technique of optimally distributing the load in accordance with the object, application purpose, and system configuration in a process of providing a composite image of a real space and a virtual space to an observer.

In order to achieve an object of the present invention, for example, an image processing system of the present invention comprises the following arrangement.

That is, an image processing system including an image sensing apparatus for sensing a real space, and an image processing apparatus capable of data communication with the image sensing apparatus, the image sensing apparatus comprising:

first determination unit adapted to determine, by negotiation with the image processing apparatus, a first process to be executed by the image sensing apparatus and a second process to be executed by the image processing apparatus to obtain a composite image by compositing a sensed image by the image sensing apparatus with an image of a virtual space seen from a viewpoint of the image sensing apparatus;

first transmission unit adapted to transmit, to the image processing apparatus, data necessary for causing the image processing apparatus to execute the second process;

first reception unit adapted to receive a result of the process executed by the image processing apparatus by using the data transmitted by the first transmission unit;

first processing unit adapted to execute the first process; and display unit adapted to display one of the composite image obtained on the basis of the process result by the first processing unit and the composite image obtained on the basis of the process result by the first processing unit and a reception result received by the first reception unit, and the image processing apparatus comprising:

second determination unit adapted to determine the first process and the second process by the negotiation;

second processing unit adapted to execute the second process by using the data transmitted by the first transmission unit; and second transmission unit adapted to transmit a process result by the second processing unit to the image sensing apparatus.

In order to achieve an object of the present invention, for example, an image processing apparatus of the present invention comprises the following arrangement.

That is, an image processing apparatus capable of data communication with an image sensing apparatus for sensing a real space, comprising:

determination unit adapted to determine, by negotiation with the image processing apparatus, a first process to be executed by the image sensing apparatus and a second process to be executed by the image processing apparatus to obtain a composite image by compositing a sensed image by the image sensing apparatus with an image of a virtual space seen from a viewpoint of the image sensing apparatus;

processing unit adapted to execute the second process by using data that is received from the image sensing apparatus as data necessary for causing the image processing apparatus to execute the second process; and transmission unit adapted to transmit a process result by the processing unit to the image sensing apparatus.

In order to achieve an object of the present invention, for example, an image sensing apparatus of the present invention comprises the following arrangement.

That is, an image sensing apparatus which executes data communication with an image processing apparatus and senses a real space, comprising:

determination unit adapted to determine, by negotiation with the image processing apparatus, a first process to be executed by the image sensing apparatus and a second process to be executed by the image processing apparatus to obtain a composite image by compositing a sensed image by the image sensing apparatus with an image of a virtual space seen from a viewpoint of the image sensing apparatus;

transmission unit adapted to transmit, to the image processing apparatus, data necessary for causing the image processing apparatus to execute the second process;

reception unit adapted to receive a result of the process executed by the image processing apparatus by using the data transmitted by the transmission unit;

processing unit adapted to execute the first process; and display unit adapted to display one of the composite image obtained on the basis of the process result by the processing unit and the composite image obtained on the basis of the process result by the processing unit and a reception result received by the reception unit.

In order to achieve an object of the present invention, for example, an image processing system of the present invention comprises the following arrangement.

That is, an image processing system including an image sensing apparatus for sensing a real space, and an image processing apparatus capable of data communication with the image sensing apparatus, the image sensing apparatus comprising:

unit adapted to obtain a position and orientation of a viewpoint of the image sensing apparatus on the basis of a sensed image by the image sensing apparatus;

first transmission unit adapted to transmit the position and orientation of the viewpoint to the image processing apparatus;

first reception unit adapted to receive, from the image processing apparatus, a virtual space image generated by the image processing apparatus on the basis of the position and orientation of the viewpoint;

unit adapted to generate a composite image by compositing the sensed image with the virtual space image received by the first reception unit; and display unit adapted to display the composite image, and the image processing apparatus comprising:

second reception unit adapted to receive the position and orientation of the viewpoint transmitted by the first transmission unit;

generation unit adapted to generate the virtual space image on the basis of the position and orientation of the viewpoint received by the second reception unit; and second transmission unit adapted to transmit the virtual space image generated by the generation unit to the image sensing apparatus.

In order to achieve an object of the present invention, for example, an image processing system of the present invention comprises the following arrangement.

That is, an image processing system including an image sensing apparatus for sensing a real space, and an image processing apparatus capable of data communication with the image sensing apparatus, the image sensing apparatus comprising:

image generation unit adapted to generate a first image by reducing a data amount of a sensed image by the image sensing apparatus;

first transmission unit adapted to transmit the first image to the image processing apparatus;

first reception unit adapted to receive, from the image processing apparatus, a composite image obtained by setting the first image to the same size as a virtual space image and compositing the set first image with the virtual space image;

replacement unit adapted to, if a specific area on the composite image received by the first reception unit corresponds to an area on the first image, replace the specific area with a corresponding area on the sensed image; and display unit adapted to display one of the composite image received by the first reception unit and the composite image that has undergone the process by the replacement unit, and the image processing apparatus comprising:

second reception unit adapted to receive the first image transmitted by the first transmission unit;

unit adapted to obtain a position and orientation of a viewpoint of the image sensing apparatus by using the first image received by the second reception unit;

virtual space image generation unit adapted to generate the virtual space image on the basis of the position and orientation of the viewpoint;

composition unit adapted to generate the composite image by setting size of the first image to the size of the virtual space image generated by the virtual space image generation unit and compositing the set first image with the virtual space image; and second transmission unit adapted to transmit the composite image generated by the composition unit to the image sensing apparatus.

In order to achieve an object of the present invention, for example, a control method of an image processing system of the present invention comprises the following arrangement.

That is, a control method of an image processing system including an image sensing apparatus for sensing a real space, and an image processing apparatus capable of data communication with the image sensing apparatus, a control method of the image sensing apparatus comprising:

a first determination step of determining, by negotiation with the image processing apparatus, a first process to be executed by the image sensing apparatus and a second process to be executed by the image processing apparatus to obtain a composite image by compositing a sensed image by the image sensing apparatus with an image of a virtual space seen from a viewpoint of the image sensing apparatus;

a first transmission step of transmitting, to the image processing apparatus, data necessary for causing the image processing apparatus to execute the second process;

a first reception step of receiving a result of the process executed by the image processing apparatus by using the data transmitted in the first transmission step;

a first processing step of executing the first process; and a display step of displaying one of the composite image obtained on the basis of the process result in the first processing step and the composite image obtained on the basis of the process result in the first processing step and a reception result received in the first reception step, and a control method of the image processing apparatus comprising:

a second determination step of determining the first process and the second process by the negotiation;

a second processing step of executing the second process by using the data transmitted in the first transmission step; and a second transmission step of transmitting a process result in the second processing step to the image sensing apparatus.

In order to achieve an object of the present invention, for example, a control method of an image processing apparatus of the present invention comprises the following arrangement.

That is, a control method of an image processing apparatus capable of data communication with an image sensing apparatus for sensing a real space, comprising steps of:

determining, by negotiation with the image processing apparatus, a first process to be executed by the image sensing apparatus and a second process to be executed by the image processing apparatus to obtain a composite image by compositing a sensed image by the image sensing apparatus with an image of a virtual space seen from a viewpoint of the image sensing apparatus;

executing the second process by using data that is received from the image sensing apparatus as data necessary for causing the image processing apparatus to execute the second process; and transmitting a process result in the processing step to the image sensing apparatus.

In order to achieve an object of the present invention, for example, a control method of an image sensing apparatus of the present invention comprises the following arrangement.

That is, a control method of an image sensing apparatus which executes data communication with an image processing apparatus and senses a real space, comprising steps of:

determining, by negotiation with the image processing apparatus, a first process to be executed by the image sensing apparatus and a second process to be executed by the image processing apparatus to obtain a composite image by compositing a sensed image by the image sensing apparatus with an image of a virtual space seen from a viewpoint of the image sensing apparatus;

transmitting, to the image processing apparatus, data necessary for causing the image processing apparatus to execute the second process;

receiving a result of the process executed by the image processing apparatus by using the data transmitted in the transmitting step;

executing the first process; and displaying one of the composite image obtained on the basis of the process result in the processing step and the composite image obtained on the basis of the process result in the processing step and a reception result received in the receiving step.

In order to achieve an object of the present invention, for example, a control method of an image processing system of the present invention comprises the following arrangement.

That is, a control method of an image processing system including an image sensing apparatus for sensing a real space, and an image processing apparatus capable of data communication with the image sensing apparatus, a control method of the image sensing apparatus comprising:

a step of obtaining a position and orientation of a viewpoint of the image sensing apparatus on the basis of a sensed image by the image sensing apparatus;

a first transmission step of transmitting the position and orientation of the viewpoint to the image processing apparatus;

a first reception step of receiving, from the image processing apparatus, a virtual space image generated by the image processing apparatus on the basis of the position and orientation of the viewpoint;

a step of generating a composite image by compositing the sensed image with the virtual space image received in the first reception step; and a display step of displaying the composite image, and a control method of the image processing apparatus comprising:

a second reception step of receiving the position and orientation of the viewpoint transmitted in the first transmission step;

a generation step of generating the virtual space image on the basis of the position and orientation of the viewpoint received in the second reception step; and a second transmission step of transmitting the virtual space image generated in the generation step to the image sensing apparatus.

In order to achieve an object of the present invention, for example, a control method of an image processing system of the present invention comprises the following arrangement.

That is, a control method of an image processing system including an image sensing apparatus for sensing a real space, and an image processing apparatus capable of data communication with the image sensing apparatus, a control method of the image sensing apparatus comprising:

an image generation step of generating a first image by reducing a data amount of a sensed image by the image sensing apparatus;

a first transmission step of transmitting the first image to the image processing apparatus;

a first reception step of receiving, from the image processing apparatus, a composite image obtained by setting size of the first image to the same size as a virtual space image and compositing the set first image with the virtual space image;

a replacement step of, if a specific area on the composite image received in the first reception step corresponds to an area on the first image, replacing the specific area with a corresponding area on the sensed image; and a display step of displaying one of the composite image received in the first reception step and the composite image that has undergone the process in the replacement step, and a control method of the image processing apparatus comprising:

a second reception step of receiving the first image transmitted in the first transmission step;

a step of obtaining a position and orientation of a viewpoint of the image sensing apparatus by using the first image received in the second reception step;

a virtual space image generation step of generating the virtual space image on the basis of the position and orientation of the viewpoint;

a composition step of generating the composite image by setting size of the first image to the size of the virtual space image generated by the virtual space image generation step and compositing the set first image with the virtual space image; and a second transmission step of transmitting the composite image generated in the composition step to the image sensing apparatus.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 7A and 7B are sequence charts showing the communication state between the image sensing apparatus 101 and the image processing apparatus 102 in a negotiation process in steps S401 and S412;

FIG. 8 is a view showing an arrangement example of a table representing the correspondence defined on the basis of the set mode between data transmitted from the image sensing apparatus 101 to the image processing apparatus 102, the contents of processes executed by the image processing apparatus 102, and an apparatus that executes a composite image generation process;

FIG. 32 is a block diagram showing the configuration of a system according to the seventh embodiment of the present invention;

FIGS. 33A and 33B are sequence charts showing the communication state between image sensing apparatuses 3301, a wireless access point 3302, and an image processing apparatus 3303 in a negotiation process and subsequent image process;

FIG. 34 is a view showing an arrangement example of a table representing the correspondence defined on the basis of the set mode between data transmitted from the image sensing apparatus 3301 to the image processing apparatus 3303, data transmitted from the image processing apparatus 3303 to the image sensing apparatus 3301, an apparatus that measures the position, and an apparatus that executes a composite image generation process;

DESCRIPTION OF THE EMBODIMENTS

Preferred embodiments of the present invention will now be described in detail in accordance with the accompanying drawings.

[First Embodiment]

Figure 1:
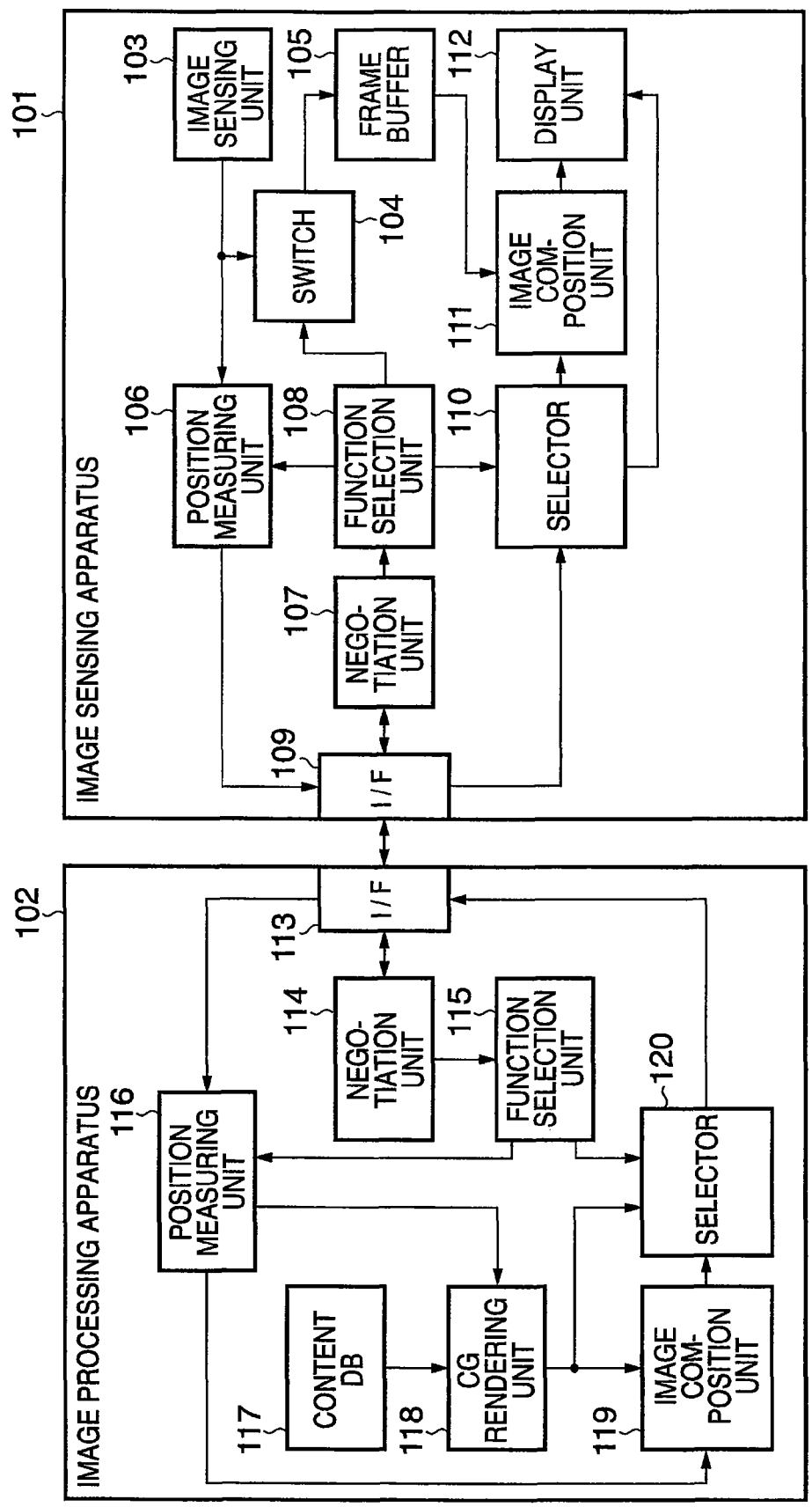
FIG. 1 is a block diagram showing the functional arrangement of a system according to the first embodiment of the present invention.

FIG. 1 is a block diagram showing the functional arrangement of a system according to this embodiment. As shown in FIG. 1, the system of this embodiment includes an image sensing apparatus 101 and an image processing apparatus 102.

The image sensing apparatus 101 will be described. In this embodiment, the image sensing apparatus 101 is a video see-through HMD.

An image sensing unit 103 includes two sets of image sensing elements and optical systems which respectively correspond to the right and left eyes and generate a stereoscopic image, and a DSP (Digital Signal Processor) that executes an image process of the succeeding stage. The image sensing unit 103 senses a moving image of a real space which can be seen from the viewpoint of an observer who is wearing the image sensing apparatus 101 on the head. Each sensed frame image is transferred to a switch 104 and a position measuring unit 106 of the succeeding stage.

The switch 104 changes the sending destination of each frame image sequentially output from the image sensing unit 103 to a frame buffer 105. The sending destination switching will be described later.

The frame buffer 105 sequentially receives and holds each frame image sequentially output from the image sensing unit 103 via the switch 104 only when the switch 104 selects image sending to the frame buffer 105. The frame buffer 105 stores the sensed images of several frames in correspondence with the left and right image sensing units 103 in consideration of a delay in a composite image generation process (to be described later).

The position measuring unit 106 measures the position and orientation of itself by a process to be described later. When the position and orientation relationship (bias) between the position measuring unit 106 itself and the observer viewpoint is obtained in advance, the position and orientation of the viewpoint of the observer can be obtained by adding the bias to the result obtained by the position measuring unit 106. In the following description, the position measuring unit 106 (and a position measuring unit 116 to be described later) obtains the position and orientation of the viewpoint of the observer, although a description of the process of adding a bias will be omitted. The position and orientation measurement process of the position measuring unit 106 will be described later.

A negotiation unit 107 negotiates with the image processing apparatus 102. The process of the negotiation unit 107 will be described later.

A function selection unit 108 issues various selection instructions (to be described later) on the basis of the result of negotiation between the image sensing apparatus 101 and the image processing apparatus 102.

An I/F 109 functions as an interface for data communication between the image sensing apparatus 101 and the image processing apparatus 102. This also applies to an I/F 113 provided on the side of the image processing apparatus 102. Both the I/Fs 109 and 113 are required to execute a real-time operation and preferably employ a communication standard capable of transmitting an enormous quantity of data. In a wired system, a metal line such as a USB or IEEE1394 or an optical fiber such as GigabitEthernet is used. In a wireless system, high-speed wireless communication complying with the IEEE802.11 wireless LAN standard or IEEE802.15 wireless PAN standard is used. In this example, a wired system is assumed to use an optical fiber, and a wireless system is assumed to use UWB (Ultra Wide Band). The transmission band of the optical fiber is several Gbps, and that of UWB is several hundred Mbps.

To execute the composite image generation process on the side of the image sensing apparatus 101, a selector 110 transfers, to an image composition unit 111, a CG image (virtual space image) received from the image processing apparatus. 102 via the I/F 109. On the other hand, when the composite image generation process is executed on the side of the image processing apparatus 102, the selector 110 transfers, to a display unit 112, a composite image received from the image processing apparatus 102 via the I/F 109.

The image composition unit 111 receives a CG image from the selector 110 and generates a composite image (MR image) by compositing the received CG image with the real space image held in the frame buffer 105. Various techniques are available to generate a composite image. In this example, a composition process using chroma key and α-channel is used. Various image composition processes will be described later.

The display unit 112 to display a composite image includes two sets of display devices and optical systems for the right and left eyes, like the image sensing unit 103. A small liquid crystal device or a retina scan type device by MEMS (Micro Electro Mechanical Systems) is used as the display unit 112.

The image processing apparatus 102 will be described. An apparatus such as a general PC (Personal Computer) or WS (WorkStation) is applicable to the image processing apparatus 102.

A negotiation unit 114 negotiates with the image sensing apparatus 101. The process of the negotiation unit 114 will be described later.

A function selection unit 115 issues various selection instructions (to be described later) on the basis of the result of negotiation between the image sensing apparatus 101 and the image processing apparatus 102.

The position measuring unit 116 fundamentally executes the same operation as the position measuring unit 106. The position and orientation measurement process of the position measuring unit 116 will be described later.

A content DB (database) 117 holds data related to each virtual object included in a virtual space. Data about a virtual object contains, e.g., data representing the layout, position, and orientation of the virtual object and its operation rules. If a virtual object is formed from polygons, the normal vector data and color data of each polygon, and the coordinate position data of the vertices of each polygon are contained in the data of the virtual object. If the virtual object has texture mapping, texture data is also contained.

A CG rendering unit 118 forms a virtual space by laying out virtual objects in it by using data about the virtual objects held in the content DB 117. The CG rendering unit 118 generates an image (CG image) of the formed virtual space seen from the viewpoint of the observer. The process of generating a virtual space image seen from a viewpoint with predetermined position and orientation is known, and a detailed description thereof will be omitted.

An image composition unit 119 generates a composite image by compositing a sensed image received from the image sensing apparatus 101 via the I/F 113 with a CG image generated by the CG rendering unit 118.

When the composite image generation process is executed on the side of the image processing apparatus 102, a selector 120 transfers a composite image generated by the image composition unit 119 to the image sensing apparatus 101 via the I/F 113. To execute the composite image generation process on the side of the image sensing apparatus 101, the selector 120 transfers a CG image generated by the CG rendering unit 118 to the image sensing apparatus 101 via the I/F 113.

Figure 2:
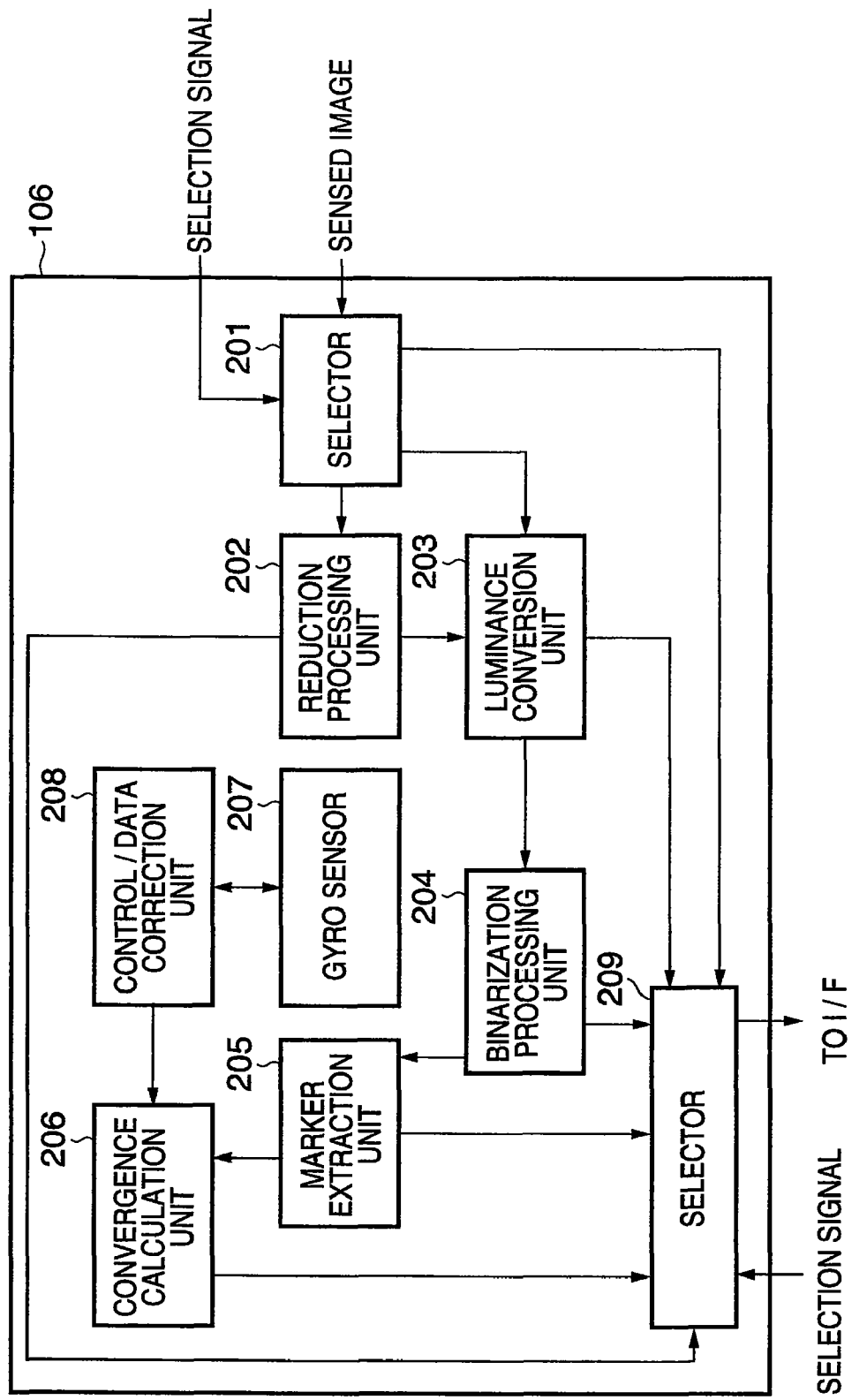
FIG. 2 is a block diagram showing the detailed arrangement of a position measuring unit 106 of an image sensing apparatus 101.

FIG. 2 is a block diagram showing the detailed arrangement of the position measuring unit 106 of the image sensing apparatus 101.

Reference numeral 201 denotes a selector. The selector 201 sends a real space image received from the image sensing unit 103 to one of a reduction processing unit 202, a luminance conversion unit 203, and a selector 209 to select the output of the final stage.

Reference numeral 202 denotes the reduction processing unit. Upon receiving a real space image via the selector 201, the reduction processing unit 202 reduces the received image. The most simple reduction process is 0th-order resolution conversion for periodically thinning lines and pixels. The order is not particularly limited here. The size of reduction is determined by negotiation with the image processing apparatus 102.

Reference numeral 203 denotes the luminance conversion unit. The luminance conversion unit 203 converts a color image containing RGB components into an image having only a luminance signal. More specifically, upon receiving a real space image via the selector 201, the luminance conversion unit 203 generates the luminance image of the received image. The luminance conversion unit 203 can either directly select and output the G component of RGB color signals or convert RGB images into luminance and color difference signals such as YUV or YCC by color representation conversion and extract the luminance signal. If each of the RGB components is represented by 8 bits per pixel, i.e., the total data amount is 24 bits, the data amount of the luminance signal is 8 bits. That is, the data amount decreases to ⅓.

Reference numeral 204 denotes a binarization processing unit. The binarization processing unit 204 converts a multi-level luminance signal into a binary signal represented by 0 and 1 on the basis of an arbitrary threshold value. When the amount of input data, i.e., luminance data is 8 bits, the output signal, i.e., binary data is expressed by 1 bit. That is, the data amount decreases to ⅛. The data amount of the real space image, i.e., the color image of RGB components decreases to 1/24 as compared to a case wherein the image data is transmitted without conversion.

Reference numeral 205 denotes a marker extraction unit. If a marker exists in the real space image input to the selector 201, the marker extraction unit 205 extracts the marker. The process of the marker extraction unit 205 will be described later in detail.

Reference numeral 206 denotes a convergence calculation unit. When the marker extraction unit 205 extracts at least one marker, the convergence calculation unit 206 executes iterative calculation to accurately calculate its position. As a result of this calculation, the position and orientation of the viewpoint of the observer are obtained. Even when the real space image has no marker, it is possible to accurately calculate the position and orientation by compensating for the acceleration and angular velocity as a relative moving amount with another sensor information on the basis of the position and orientation upon marker extraction. Generally, a technique of obtaining, by using a marker (index) in an image, the position and orientation of an image sensing apparatus that has sensed the image is known.

Reference numeral 207 denotes a gyro sensor. The gyro sensor 207 includes three-dimensional position and orientation detection sensors incorporating a compass serving as a magnetic azimuth sensor to grasp a triaxial acceleration, triaxial angular velocity, and, as needed, the absolute azimuth of the sensor itself. "Gyro sensor" is a general term for these sensors. The position and orientation of the HMD user may be grasped relatively or absolutely by using a magnetic sensor other than the gyro sensor or an RF-ID.

Reference numeral 208 denotes a control/data correction unit. The control/data correction unit 208 controls the gyro sensor 207 to grasp the three-dimensional position and orientation and corrects the output signal from the gyro sensor 207. The functions of the gyro sensor 207 and control/data correction unit 208 are complementary and not indispensable for the position measuring unit. However, the position measuring unit preferably includes them because markers and natural features (to be described later) in a real space image have limits.

Reference numeral 209 denotes the selector. The selector 209 selects a target to be transmitted to the image processing apparatus 102 from the real space image input to the selector 201, the reduced image generated by the reduction processing unit 202, the luminance image generated by the luminance conversion unit 203, the binary image generated by the binarization processing unit 204, marker information about markers extracted by the marker extraction unit 205, and the position and orientation of the viewpoint of the observer obtained by the convergence calculation unit 206, and transmits the selected data to the image processing apparatus 102 via the I/F 109. The above-described function selection unit 108 issues a selection instruction by a selection signal.

Figure 3:
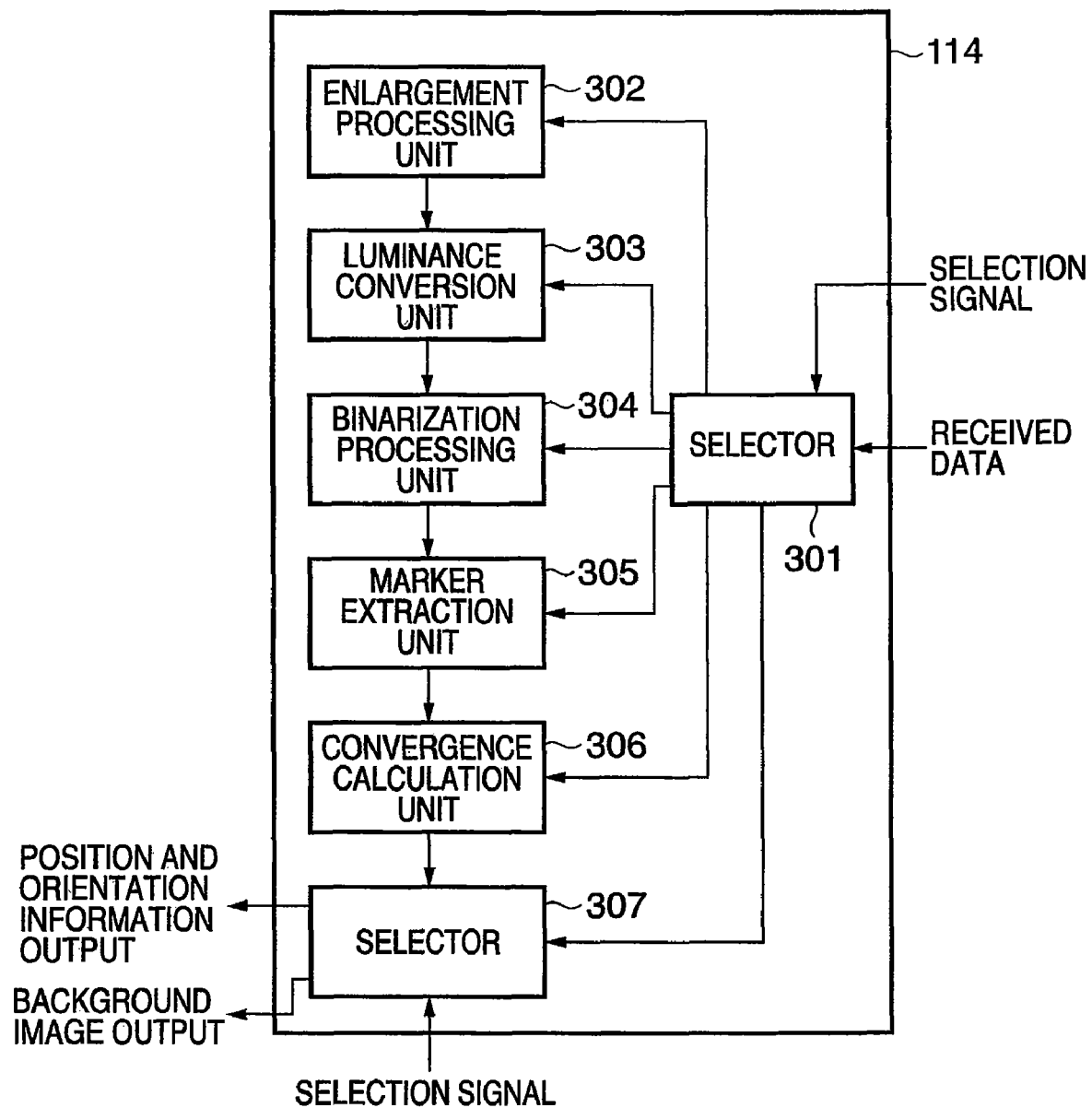
FIG. 3 is a block diagram showing the detailed arrangement of a position measuring unit 116 of an image processing apparatus 102.

FIG. 3 is a block diagram showing the detailed arrangement of the position measuring unit 116 of the image processing apparatus 102.

Reference numeral 301 denotes a selector. The selector 301 switches the output destination of received data on the basis of the type of the data received from the image sensing apparatus 101 via the I/F 113 and the result of negotiation with the image sensing apparatus 101. Upon receiving a real space image from the image sensing apparatus 101, the selector 301 transfers it to a luminance conversion unit 303. Upon receiving a reduced image, the selector 301 transfers it to an enlargement processing unit 302. Upon receiving a luminance image, the selector 301 transfers it to a binarization processing unit 304. Upon receiving a binary image, the selector 301 transfers it to a marker extraction unit 305. Upon receiving marker information, the selector 301 transfers it to a convergence calculation unit 306. Upon receiving a position and orientation, the selector 301 transfers it to a selector 307.

Reference numeral 302 denotes the enlargement processing unit. The enlargement processing unit 302 enlarges an image reduced on the side of the image sensing apparatus 101. The most simple enlargement method is 0th-order resolution conversion for interpolating lines and pixels by the same value. Even in this case, the order is not particularly limited. The size of enlargement is the size necessary for composite image generation.

Reference numeral 303 denotes the luminance conversion unit; 304, the binarization processing unit; 305, the marker extraction unit; and 306, the convergence calculation unit. The luminance conversion unit 303, the binarization processing unit 304, the marker extraction unit 305, and the convergence calculation unit 806 execute the same operations as the luminance conversion unit 203, the binarization processing unit 204, the marker extraction unit 205, and the convergence calculation unit 206 on the side of the image sensing apparatus 101, respectively. The process contents of the luminance conversion unit 303, the binarization processing unit 304, the marker extraction unit 305, and the convergence calculation unit 306 are the same as those of the luminance conversion unit 203, the binarization processing unit 204, the marker extraction unit 205, and the convergence calculation unit 206, respectively. It is possible to shorten the process time and increase the accuracy by using the latest process algorithm.

Reference numeral 307 denotes the selector. The selector 307 selectively outputs the position and orientation calculated on the side of the image sensing apparatus 101 or the position and orientation calculated by the convergence calculation unit 306. The above-described function selection unit 115 issues a selection instruction by a selection signal.

Figure 30:
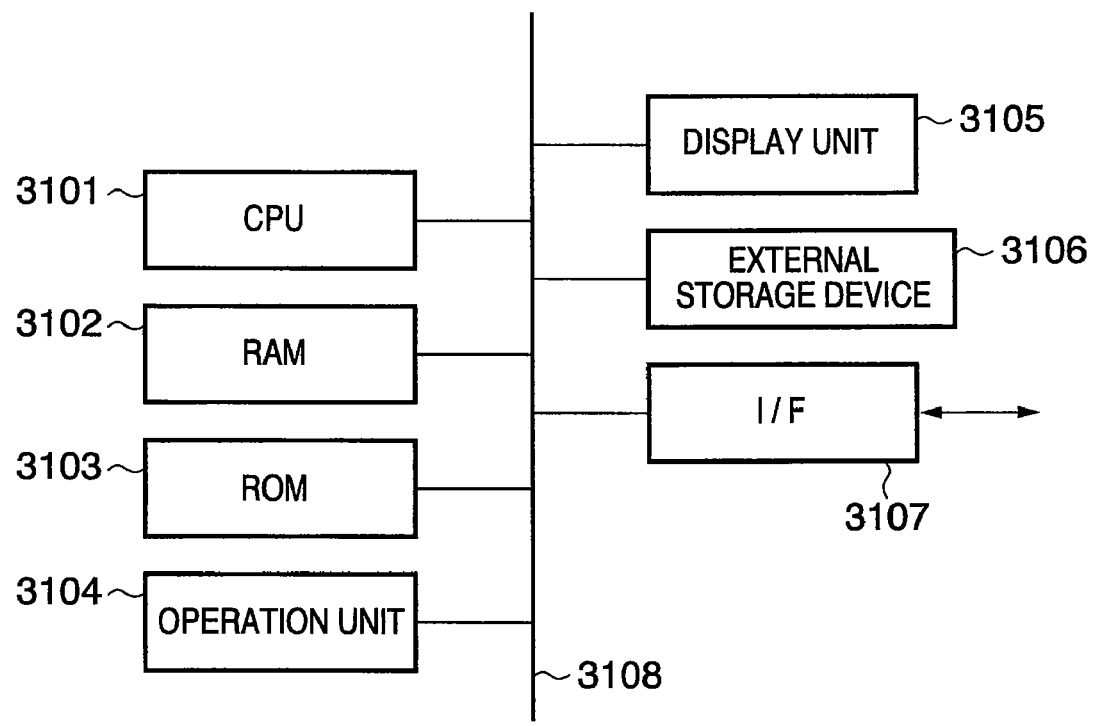
FIG. 30 is a block diagram showing the hardware configuration of a computer applicable to the image processing apparatus 102.

FIG. 30 is a block diagram showing the hardware configuration of a computer applicable to the image processing apparatus 102.

A CPU 3101 controls the entire computer by using programs and data stored in a RAM 3102 and a ROM 3103. The CPU 3101 also executes the process (to be described later) of the image processing apparatus 102 using the computer.

The RAM 3102 has an area to temporarily store programs and data loaded from an external storage device 3106 and data received from an external device (image sensing apparatus-101 in this embodiment) via an I/F 3107. The RAM 3102 also has a work area to be used by the CPU 3101 to execute various kinds of processes. That is, the RAM 3102 can provide various areas as needed.

The ROM 3103 stores the setting data and boot programs of the computer.

The operator of this computer can input various instructions to the CPU 3101 by operating an operation unit 3104 including a keyboard and a mouse.

A display unit 3105 including a CRT or a liquid crystal panel can display the process result of the CPU 3101 by an image or a text.

The external storage device 3106 is a mass storage device represented by a hard disk drive. The external storage device 3106 stores the OS (Operating System), and programs and data to make the CPU 3101 execute the process (to be described later) of the image processing apparatus 102. The programs and data are loaded to the RAM 3102, as needed, under the control of the CPU 3101 and processed by the CPU 3101.

The I/F 3107 corresponding to the I/F 113 in FIG. 1 functions as an interface for data communication with the image sensing apparatus 101.

A bus 3108 connects the above-described units.

Figure 31:
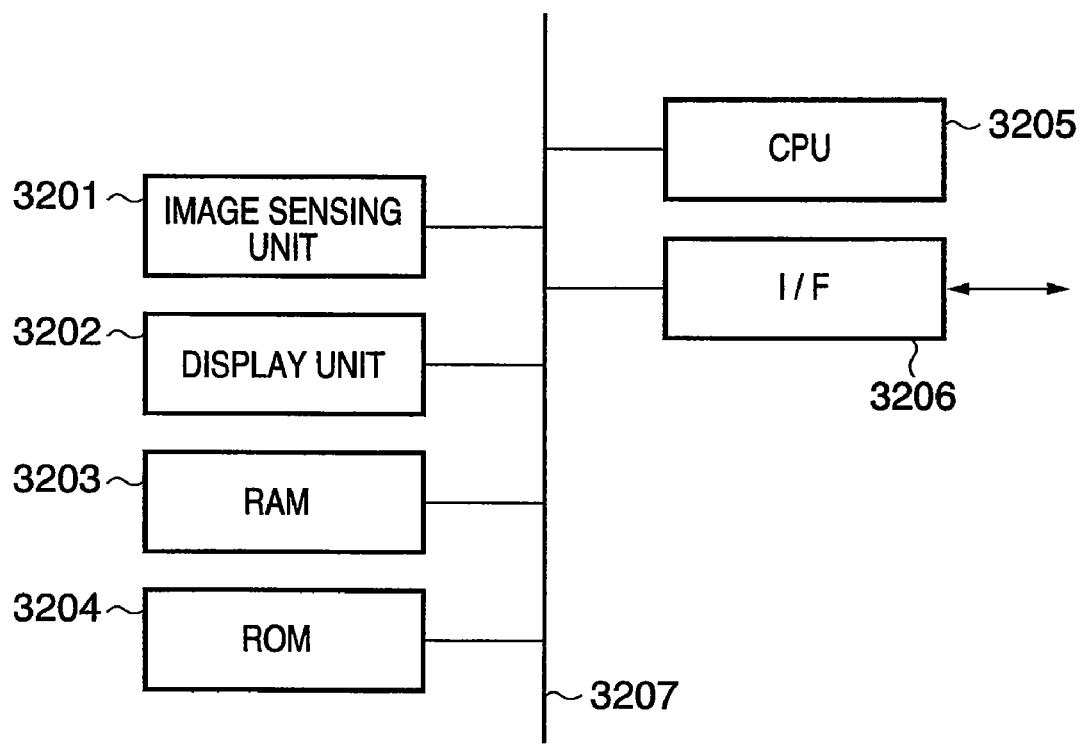
FIG. 31 is a block diagram showing the hardware configuration of the image sensing apparatus 101.

FIG. 31 is a block diagram showing the hardware configuration of the image sensing apparatus 101.

An image sensing unit 3201 is equivalent to the image sensing unit 103. A display unit 3202 is equivalent to the display unit 112. A RAM 3203 has a work area to be used by a CPU 3205 to execute various kinds of processes and an area to temporarily store data received from an external device (image processing apparatus 102 in this case) via an I/F 3206.

A ROM 3204 stores programs and data to make the CPU 3205 execute the process (to be described later) of the image sensing apparatus 101.

The CPU 3205 executes the process (to be described later) of the image sensing apparatus 101.

The I/F 3206 is equivalent to the I/F 109 in FIG. 1.

A bus 3207 connects the above-described units.

Figure 4:
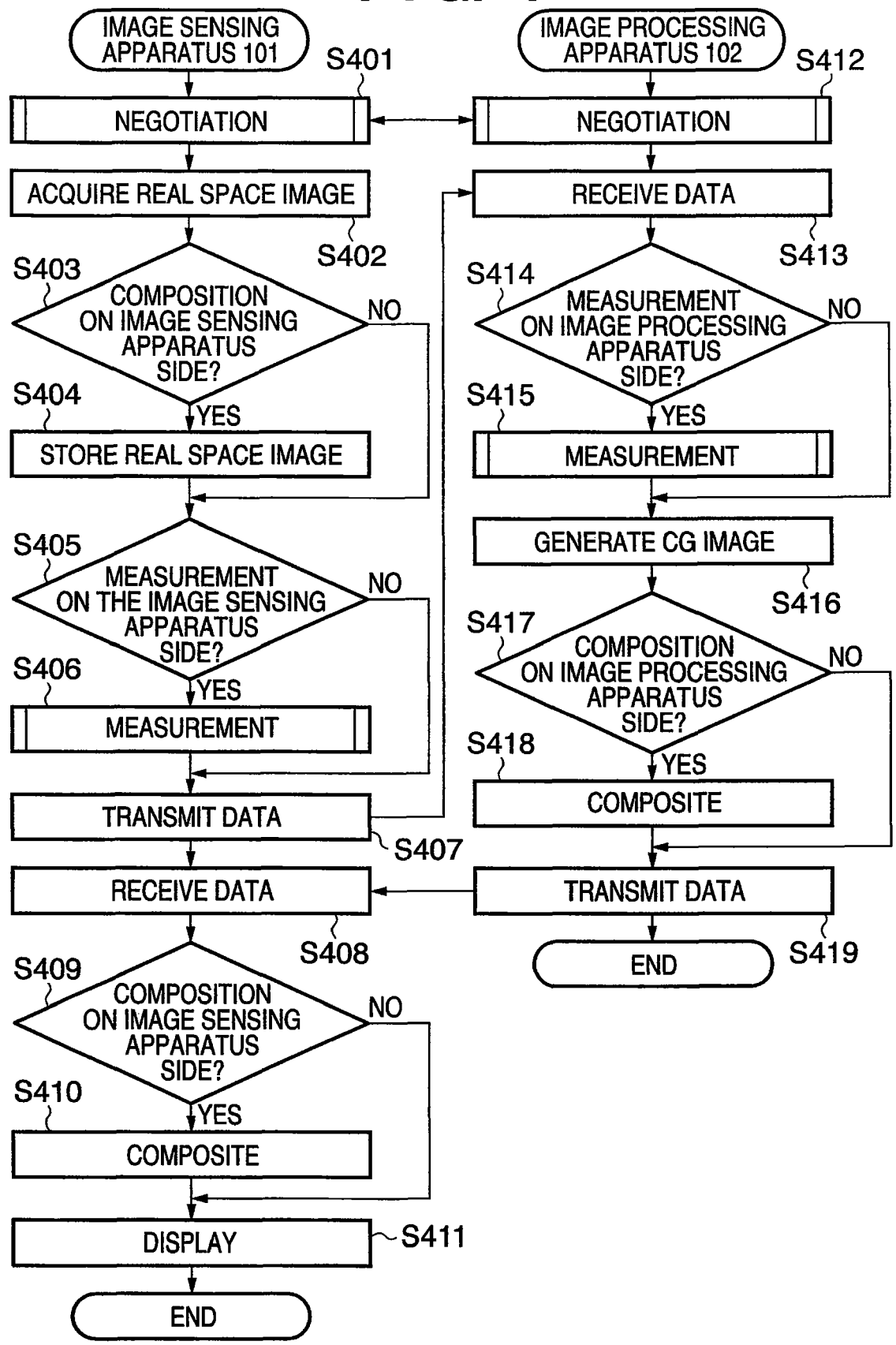
FIG. 4 is a flowchart showing processes executed by the image sensing apparatus 101 and image processing apparatus 102 to display, on a display unit 112 of the image sensing apparatus 101, a composite image obtained by compositing a real space image sensed by the image sensing apparatus 101 with a CG image generated by the image processing apparatus 102.

FIG. 4 is a flowchart showing processes executed by the image sensing apparatus 101 and image processing apparatus 102 to display, on the display unit 112 of the image sensing apparatus 101, a composite image obtained by compositing a real space image sensed by the image sensing apparatus 101 with a CG image generated by the image processing apparatus 102.

The process in steps S401 to S411 of the flowchart in FIG. 4 is executed by the image sensing apparatus 101. The ROM 3204 stores the program and data to make the CPU 3205 of the image sensing apparatus 101 execute the process in steps S401 to S411. The image sensing apparatus 101 therefore executes the process in steps S401 to S411 by causing the CPU 3205 to execute the process by using the program and data.

The process in steps S412 to S419 of the flowchart in FIG. 4 is executed by the image processing apparatus 102. The external storage device 3106 stores the program and data to make the CPU 3101 of the image processing apparatus 102 execute the process in steps S412 to S419. The image processing apparatus 102 therefore executes the process in steps S412 to S419 by causing the CPU 3101 to load the program and data to the RAM 3102 and execute the process by using them.

In step S401, the CPU 3205 negotiates with the image processing apparatus 102. The same process is executed in step S412 even on the side of the image processing apparatus 102.

This negotiation determines the first process to be executed by the image sensing apparatus 101 and the second process to be executed by the image processing apparatus 102, which are necessary for finally displaying a composite image on the display screen of the display unit 3202. Each of the first and second processes includes one or both of a process of obtaining the position and orientation of the viewpoint (viewpoint position and orientation calculation process) and a process of generating a composite image of a real space image and a CG image (composite image generation process). That is, the image sensing apparatus 101 or the image processing apparatus 102 may execute both the viewpoint position and orientation calculation process and the composite image generation process. Alternatively, the image sensing apparatus 101 may execute one of the processes, whereas the image processing apparatus 102 may execute the other process. The process in step S401 will be described later in detail.

In step S402, the image sensing unit 3201 senses the real space image under the control of the CPU 3205. The sensed image is acquired on the RAM 3203.

In step S403, it is determined whether the result of negotiation in step S401 indicates that the image sensing apparatus 101 should generate a composite image. If it is determined that the image processing apparatus 102 should generate a composite image, the process advances to step S405.

If the image sensing apparatus 101 should execute the process, the process advances to step S404. In step S404, the real space image acquired on the RAM 3203 in step S402 is stored in the frame buffer 105 provided on the RAM 3203.

In step S405, it is determined whether the result of negotiation in step S401 indicates that the image sensing apparatus 101 should obtain the position and orientation of the viewpoint. If it is determined that the image processing apparatus 102 should obtain the position and orientation of the viewpoint, the process advances to step S407.

If the image sensing apparatus 101 should execute the process, the process advances to step S406 to obtain the position and orientation of the viewpoint, and as needed, auxiliary data to obtain the position and orientation. In step S406, other processes are also executed. This will be described later in detail.

In step S407, the image sensing apparatus 101 transmits data necessary for the image processing apparatus 102 to execute the second process. The transmission data is one of the position and orientation of the viewpoint (and auxiliary data, as needed) obtained in step S406, the real space image acquired in step S402, a reduced image, binary image, luminance image, and marker information generated on the basis of the real space image. The transmission data is determined depending on which one of the image sensing apparatus 101 and the image processing apparatus 102 should execute the viewpoint position and orientation calculation process and the composite image generation process. The data transmission process in step S407 will be described later in detail.

In step S413, the CPU 3101 of the image processing apparatus 102 receives the data transmitted in step S407 via the I/F 3107 and acquires it on the RAM 3102.

In step S414, it is determined whether the result of negotiation indicates that the image processing apparatus 102 should obtain the position and orientation of the viewpoint. If it is determined that the image sensing apparatus 101 should obtain the position and orientation of the viewpoint, the process advances to step S416. If the image processing apparatus 102 should obtain the position and orientation of the viewpoint, the process advances to step S415.

In step S415, the position and orientation of the viewpoint are obtained by using the data received from the image sensing apparatus 101 in step S413. In this step, the position and orientation of the viewpoint, and as needed, auxiliary data are obtained. The process in steps 415 will be described later in detail.

In step S416, first, the position and orientation of the viewpoint are determined by using the position and orientation (and auxiliary data, as needed) received in step S413 or the position and orientation (and auxiliary data, as needed) obtained in step S415. On the other hand, data about each virtual object is read out from the content DB 117 in the external storage device 3106. A virtual space is formed by laying out the virtual objects in it. An image, i.e., CG image of the formed virtual space seen from the viewpoint with the determined position and orientation is generated.

In step S417, it is determined whether the result of negotiation indicates that the image processing apparatus 102 should generate a composite image. If it is determined that the image sensing apparatus 101 should generate a composite image, the process advances to step S419.

If the image processing apparatus 102 should generate a composite image, the process advances to step S418. In step S418, the CG image generated in step S416 is superimposed on the real space image received in step S413 to generate a composite image on the RAM 3102. If the data received in step S413 is the reduced image of the real space image, the image is enlarged to the size of the CG image, as described above. A composite image is generated by superimposing the CG image on the enlarged reduced image.

In step S419, the image processing apparatus 102 transmits the data to the image sensing apparatus 101. The transmission data changes depending on the process executed by the image processing apparatus 102. More specifically, when the composite image generation process is executed on the side of the image processing apparatus 102, the composite image generated in step S418 is transmitted to the image sensing apparatus 101. If the composite image generation process is not executed on the side of the image processing apparatus 102, the CG image generated in step S416 is transmitted to the image sensing apparatus 101.

In step S408, the image sensing apparatus 101 receives the data transmitted from the image processing apparatus 102 in step S419 and acquires it on the RAM 3203.

In step S409, it is determined whether the result of negotiation indicates that the image sensing apparatus 101 should generate a composite image. If it is determined that the image processing apparatus 102 should generate a composite image, the process advances to step S411 to display the composite image received from the image processing apparatus 102 in step S408 on the display screen of the display unit 112.

If the image sensing apparatus 101 should generate a composite image, the process advances to step S410. In step S410, the CG image generated in step S416 is superimposed on the real space image stored in the frame buffer 105 in step S404 to generate a composite image. In step S411, the composite image generated in step S410 is displayed on the display screen of the display unit 112.

Figure 5:
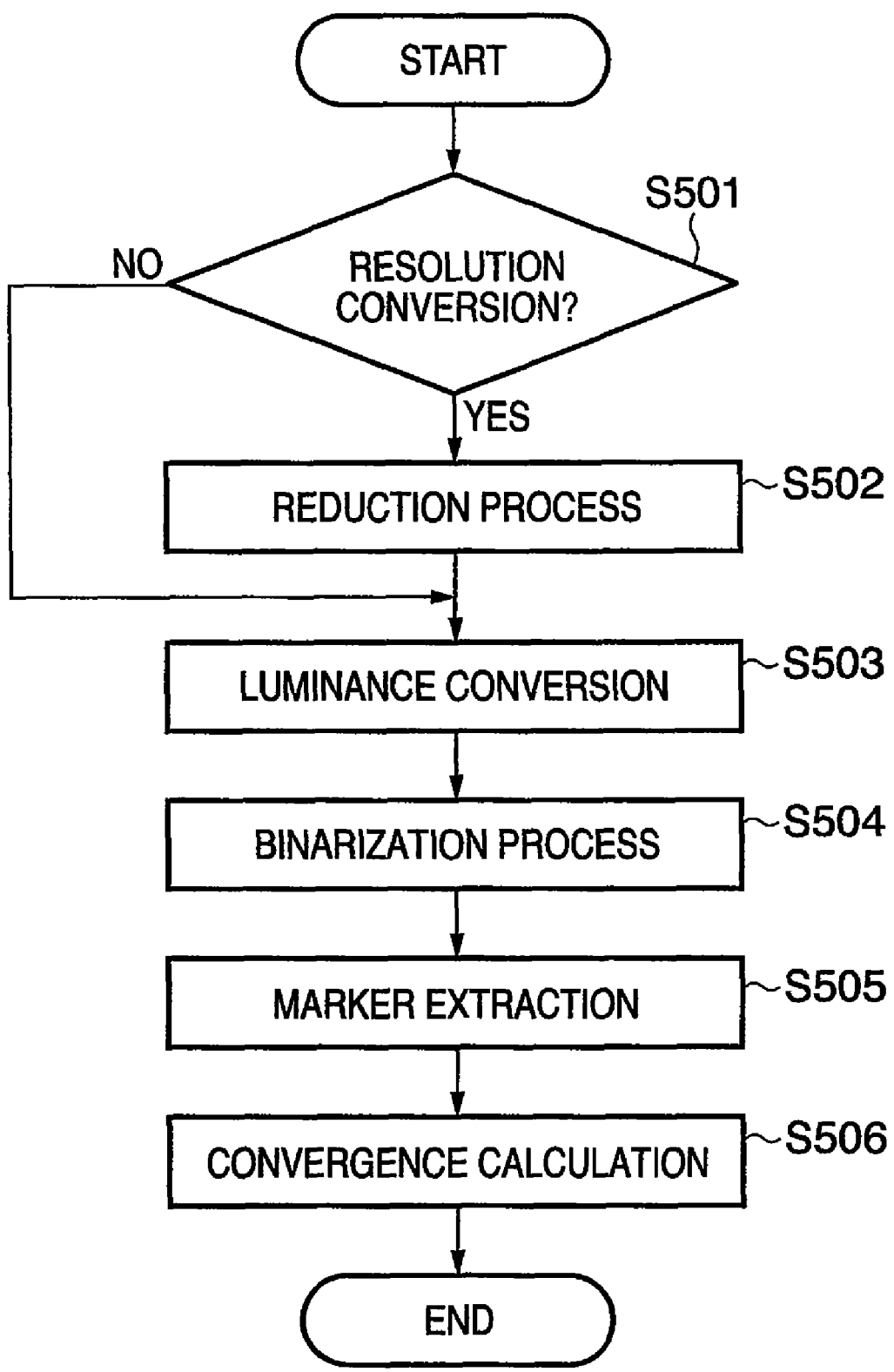
FIG. 5 is a flowchart showing details of a process in step S406.

FIG. 5 is a flowchart showing details of the process in step S406.

In step S501, it is determined whether to generate a reduced image of a real space image by resolution conversion. If NO in step S501, the process advances to step S503. If YES in step S501, the process advances to step S502. The CPU 3205 functions as the reduction processing unit 202 to generate a reduced real space image by reducing the real space image acquired in step S402.

In step S503, the CPU 3205 functions as the luminance conversion unit 203 to generate a luminance image of the real space image acquired in step S402 or the reduced real space image reduced in step S502.

In step S504, the CPU 3205 functions as the binarization processing unit 204 to generate a binary image by binarizing the luminance image generated in step S503.

In step S505, the CPU 3205 functions as the marker extraction unit 205 to extract markers from the binary image generated in step S504.

In step S506, the CPU 3205 functions as the convergence calculation unit 206 to execute accurate convergence calculation by a direct method using the positions of the markers extracted in step S505. With this process, the position and orientation of the viewpoint, and as needed, the auxiliary data are obtained.

One of the data obtained in the above-described steps is transmitted to the image processing apparatus 102.

Figure 6:
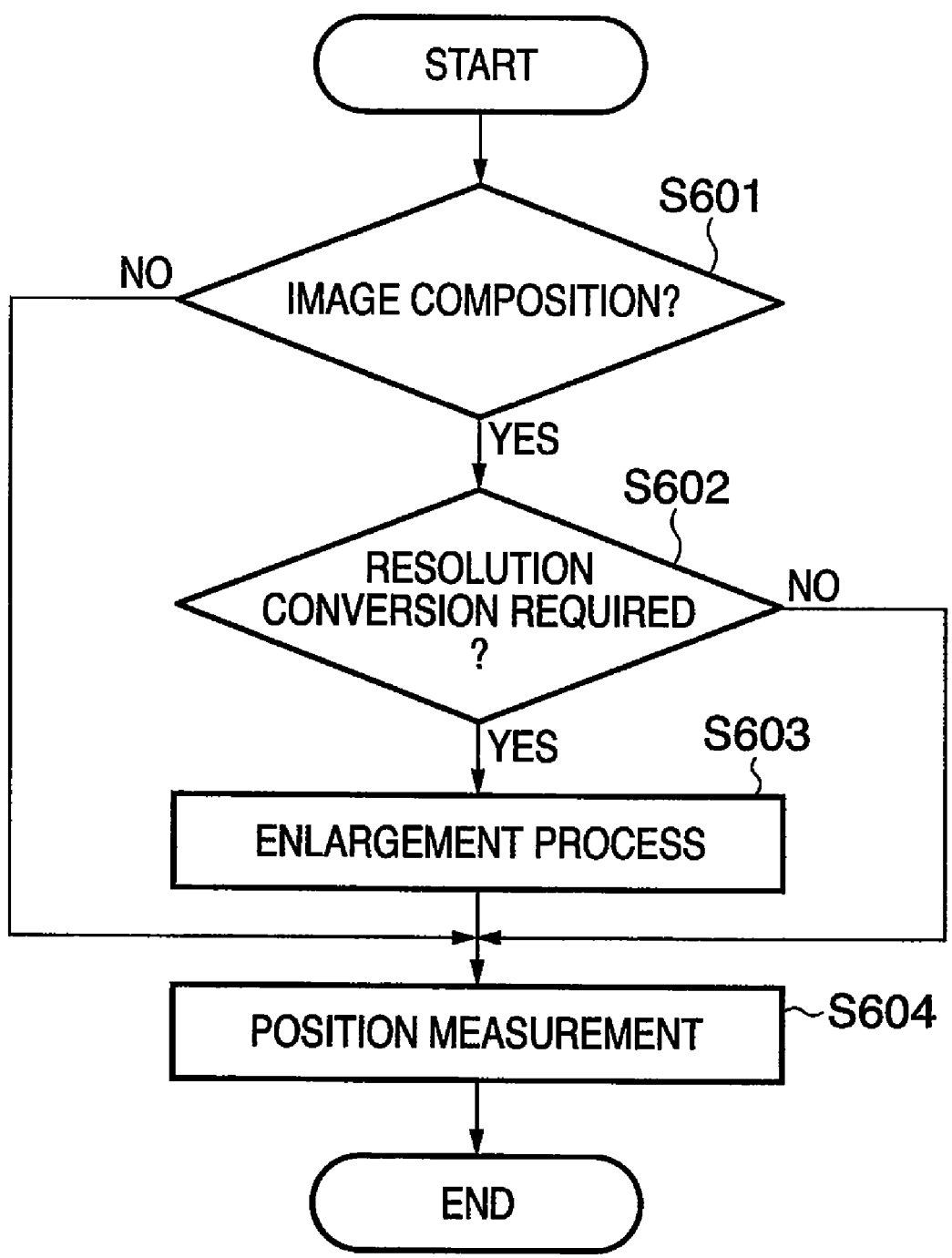
FIG. 6 is a flowchart showing details of a process in step S415.

FIG. 6 is a flowchart showing details of the process in step S415.

In step S601, it is determined whether the result of negotiation indicates that the image processing apparatus 102 should generate a composite image. If it is determined that the image sensing apparatus 101 should generate a composite image, the process advances to step S604.

If the image processing apparatus 102 should generate a composite image, the process advances to step S602.

In step S602, it is determined whether the image received in step S413 is a reduced image. If the received image is a reduced image, it is necessary to make the image size equal to that of the CG image as the composition target by enlarging the reduced image by resolution conversion. In step S602, if the size of the received image is smaller than that of the CG image as the composition target, it is determined that the received image must be enlarged.

If it is determined that enlargement is unnecessary, the process advances to step S604. If enlargement is necessary, the process advances to step S603. In step S603, the reduced image is enlarged to make its size equal to that of the CG image as the composition target. The enlargement process has been described above.

In step S604, the position and orientation of the viewpoint, and as needed, auxiliary data are obtained by using the image enlarged in step S603 or the image received in step S413. The process in this step is basically the same as in steps S503 to S506. If the position measurement accuracy need not be so high, position measurement may be done for the reduced image before enlargement.

FIG. 7A is a sequence chart showing the communication state between the image sensing apparatus 101 and the image processing apparatus 102 in the negotiation process in steps S401 and S412.

FIG. 7A shows a negotiation procedure of determining which one of the image sensing apparatus 101 and the image processing apparatus 102 should execute the process of obtaining the position and orientation of the viewpoint and setting a mode corresponding to the determination result. The image processing apparatus 102 takes the initiative in the negotiation procedure shown in FIG. 7A.

First, the image processing apparatus 102 requests the device ID of the image sensing apparatus 101 to grasp the apparatus connected to itself. Upon receiving the request, the image sensing apparatus 101 transmits its device ID to the image processing apparatus 102. A mode setting process (to be described later) is executed if the image processing apparatus 102 has correspondence table data and can therefore grasp the capability of the apparatus with the device ID by referring to it.

The image processing apparatus 102 inquires of the image sensing apparatus 101 about the capability related to the function necessary for the position and orientation measurement process. The image sensing apparatus 101 returns, to the image processing apparatus 102, detailed information about its capability related to the function.

With this process, the image processing apparatus 102 can grasp the capability of the image sensing apparatus 101 in relation to the function necessary for the position and orientation measurement process. The capability to be grasped includes, e.g., the position measurement function of both the image sensing apparatus 101 and the image processing apparatus 102, the I/F transmission band and the type of transmission medium between the apparatuses, and the type and update time of the employed position measuring algorithm. On the basis of the grasped contents, the image processing apparatus 102 sets a mode to determine which one of the image sensing apparatus 101 and the image processing apparatus 102 should execute the position and orientation measurement process. More specifically, the image processing apparatus 102 sets a mode to determine which one of the image sensing apparatus 101 and the image processing apparatus 102 should execute a preprocess of obtaining the position and orientation of the viewpoint in the series of position and orientation measurement processes, and a process of actually obtaining the position and orientation of the viewpoint by using information prepared by the preprocess.

Not only for the process of obtaining the position and orientation of the viewpoint but also for the composite image generation process, such determination is done that one apparatus should wholly execute one process while the other apparatus should wholly execute the other process. It is also determined which one of the image sensing apparatus 101 and the image processing apparatus 102 should execute a preprocess necessary for finally obtaining the target and a post-process of finally obtaining the target by using information obtained by the preprocess.

The image processing apparatus 102 sets the mode and also notifies the image sensing apparatus 101 of the set mode. The image sensing apparatus 101 and the image processing apparatus 102 execute processes assigned in accordance with the set mode.

FIG. 7B shows a negotiation procedure of determining which one of the image sensing apparatus 101 and the image processing apparatus 102 should execute the process of obtaining the position and orientation of the viewpoint and setting a mode corresponding to the determination result. The image sensing apparatus 101 takes the initiative in the negotiation procedure shown in FIG. 7B. In the procedure shown in FIG. 7B, the device ID acquisition timing is the same as described above, though the image sensing apparatus 101 actively executes the subsequent request and setting. The negotiation may also include the process of determining which apparatus should take the initiative in setting.

FIG. 8 is a view showing an arrangement example of a table representing the correspondence defined on the basis of the set mode between data transmitted from the image sensing apparatus 101 to the image processing apparatus 102, the contents of processes executed by the image processing apparatus 102, and an apparatus that executes the composite image generation process.

According to the table in FIG. 8, when mode "1" is set by the negotiation, the image sensing apparatus 101 transmits the real space image (sensed image data) to the image processing apparatus 102. The image processing apparatus 102 generates a luminance image on the basis of the real space image, generates a binary image on the basis of the luminance image, extracts marker information on the basis of the binary image, and obtains the position and orientation of the viewpoint by using the extracted marker information. The image processing apparatus 102 generates an image (CG image) of the virtual space seen in accordance with the position and orientation of the viewpoint and composites it with the real space image, thereby generating a composite image.

When mode "2" is set, the image sensing apparatus 101 transmits the real space image (sensed image data) and auxiliary data to the image processing apparatus 102. The image processing apparatus 102 generates a luminance image on the basis of the real space image, generates a binary image on the basis of the luminance image, extracts marker information on the basis of the binary image, and obtains the position and orientation of the viewpoint by using the extracted marker information. The image processing apparatus 102 also corrects the obtained position and orientation data by using the auxiliary data. The image processing apparatus 102 generates an image (CG image) of the virtual space seen in accordance with the position and orientation of the viewpoint and composites it with the real space image, thereby generating a composite image.

When mode "3" is set, the image sensing apparatus 101 generates a reduced image of the real space image and transmits it to the image processing apparatus 102. The image processing apparatus 102 enlarges the reduced image and obtains the position and orientation of the viewpoint by using the enlarged image. The image processing apparatus 102 composites the enlarged image with a CG image.

When mode "4" is set, the image sensing apparatus 101 generates a reduced image of the real space image and transmits it to the image processing apparatus 102 together with auxiliary data. The image processing apparatus 102 enlarges the reduced image and obtains the position and orientation of the viewpoint by using the enlarged image and auxiliary data. The image processing apparatus 102 composites the enlarged image with a CG image.

When mode "3" or "4" is set, the image obtained by enlarging the reduced image is composite with the CG image in the composite image generation process. The image quality of the resultant composite image is poorer than in modes "1" and "2". However, since the data amount of the reduced image is smaller than that of the original real space image, the load of transfer to the image processing apparatus 102 is lighter than that of real space image transfer.

In modes "5" to "9", the image sensing apparatus 101 executes the composite image generation process, and the image processing apparatus 102 partially or wholly executes the process of obtaining the position and orientation of the viewpoint.

When mode "5" is set, the image sensing apparatus 101 generates a reduced image of the real space image and transmits it to the image processing apparatus 102. The image processing apparatus 102 enlarges the reduced image. The image processing apparatus 102 generates a luminance image on the basis of the enlarged image, generates a binary image on the basis of the luminance image, extracts marker information on the basis of the binary image, and obtains the position and orientation of the viewpoint by using the extracted marker information. The image processing apparatus 102 generates an image (CG image) of the virtual space seen in accordance with the position and orientation of the viewpoint.

When mode "6" is set, the image sensing apparatus 101 generates a luminance image of the real space image and transmits the generated luminance image to the image processing apparatus 102. The image processing apparatus 102 generates a binary image on the basis of the luminance image, extracts marker information on the basis of the binary image, and obtains the position and orientation of the viewpoint by using the extracted marker information. The image processing apparatus 102 generates an image (CG image) of the virtual space seen in accordance with the position and orientation of the viewpoint.

When mode "7" is set, the image sensing apparatus 101 generates a binary image of the real space image and transmits the generated binary image to the image processing apparatus 102. The image processing apparatus 102 extracts marker information on the basis of the binary image and obtains the position and orientation of the viewpoint by using the extracted marker information. The image processing apparatus 102 generates an image (CG image) of the virtual space seen in accordance with the position and orientation of the viewpoint.

When mode "8" is set, the image sensing apparatus 101 extracts marker information on the basis of a binary image of the real space image and transmits the extracted marker information to the image processing apparatus 102. The image processing apparatus 102 obtains the position and orientation of the viewpoint by using the extracted marker information. The image processing apparatus 102 generates an image (CG image) of the virtual space seen in accordance with the position and orientation of the viewpoint.

When mode "9" is set, the image sensing apparatus 101 obtains the position and orientation of the viewpoint on the basis of the real space image and transmits the position and orientation of the viewpoint to the image processing apparatus 102. The image processing apparatus 102 generates an image (CG image) of the virtual space seen in accordance with the position and orientation of the viewpoint.

When modes "5" to "8" described above are set, the final process of obtaining the position and orientation of the viewpoint is executed by the image processing apparatus 102, though the preprocess is done by the image sensing apparatus 101. To obtain the position and orientation of the viewpoint, it is necessary to execute a series of processes of obtaining a luminance image from the real space image (or its reduced image), obtaining a binary image from the luminance image, and obtaining marker information from the binary image, as described above. Depending on the range of process executed by the image sensing apparatus 101, the process amount on the side of the image sensing apparatus 101 increases from mode "5" to mode "8".

In any case, the data amount transmitted from the image sensing apparatus 101 to the image processing apparatus 102 is much smaller in modes "5" to "9" than in modes "1" to "4". Hence, the loads of data transfer decreases.

A mode that is not illustrated in the table representing the correspondence may be added such that in a general MR system that executes both position measurement and image composition on the side of the image processing apparatus 102, the image sensing apparatus 101 generates auxiliary data to reduce the load of position measurement and sends it. In this case, the image sensing apparatus 101 transmits the auxiliary data for position measurement obtained by the position measuring unit 106 to the image processing apparatus 102 together with the real space image including its reduced image. The image processing apparatus 102 obtains the position and orientation of the viewpoint and composites the real space image with a CG image.

Figure 9:
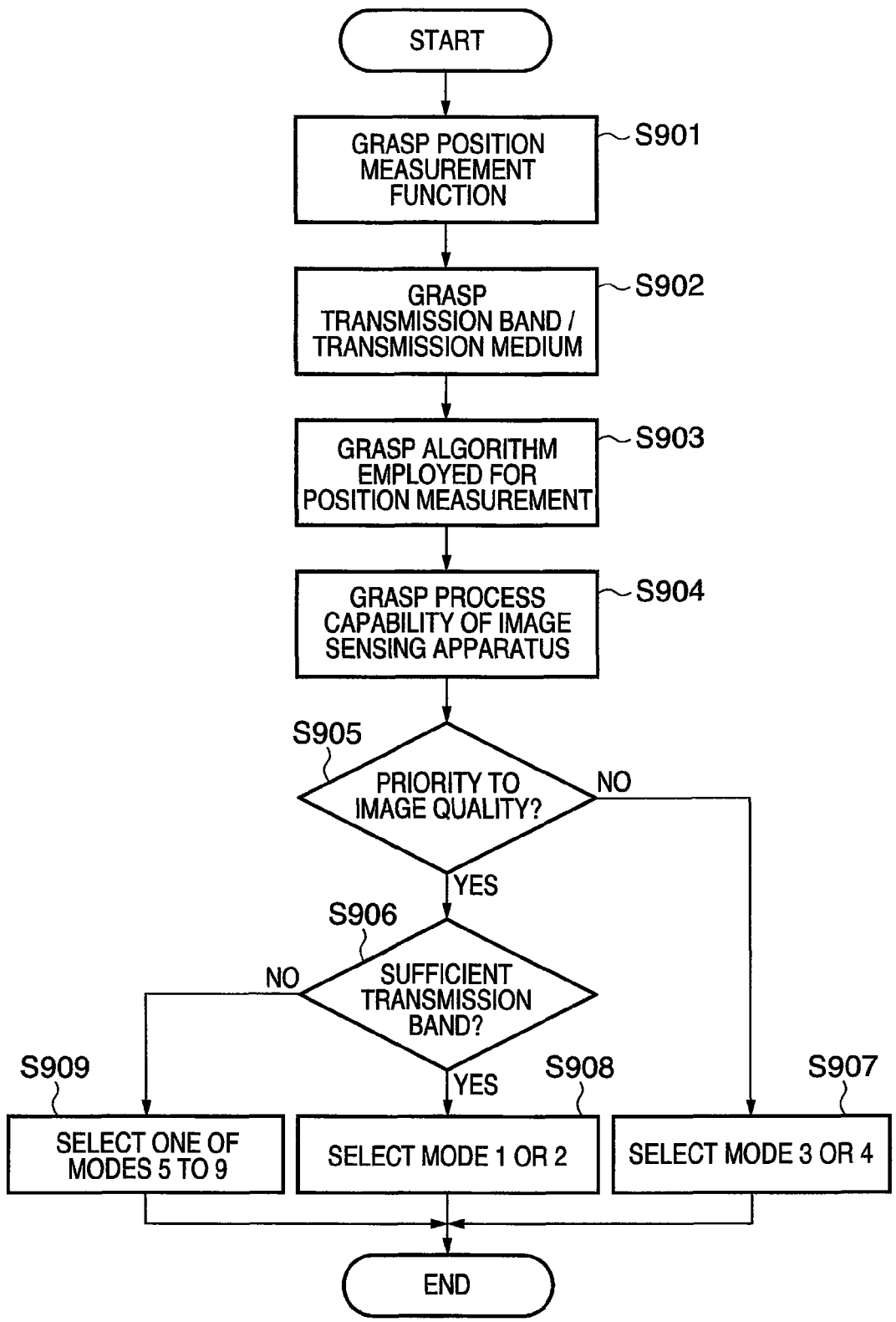
FIG. 9 is a flowchart showing a process of determining the set mode by negotiation.

FIG. 9 is a flowchart showing the process of determining the set mode by negotiation. The process corresponding to the flowchart in FIG. 9 can be executed either in step S401 or in step S412. In this embodiment, this process is executed in step S412. The image sensing apparatus 101 is also notified of the mode determined by this process.

In step S901, the position and orientation measurement function of each of the image sensing apparatus 101 and the image processing apparatus 102 is grasped.

In step S902, communication conditions such as the I/F transmission band and the type of transmission medium of each of the image sensing apparatus 101 and the image processing apparatus 102 are grasped.

In step S903, the type and update time of the algorithm used for the position and orientation measurement process are grasped. The required position accuracy and process load are grasped together.

In step S904, the data process capability of the image sensing apparatus 101 is grasped. The data process capability of the image processing apparatus 102 has been grasped in advance.

In step S905, whether to give priority to the image quality in the system operation is determined. Whether to give priority to the image quality may be set in the image processing apparatus 102 in advance. It may also be set as needed in the process procedure.

If no priority is to be given to the image quality, the process advances to step S907. In step S907, mode "3" or "4" is selected as the set mode. If an image is expressed by maximum performance independently of the transmission band, the process load is heavy. Hence, the resolution of the sensed image is set such that the delay time falls within a predetermined range within the process capability of the apparatus. The mode to be selected from modes "3" and "4" may be set in advance, or the way to select the mode is not particularly limited.

To give priority to the image quality, the process advances to step S906. In step S906, it is determined whether the transmission band grasped in step S902 exceeds a predetermined threshold value. If it is determined that the transmission band is equal to or more than the predetermined threshold value, i.e., if the transmission band is much wider than a predetermined band, the process advances to step S908 to set mode "1" or "2" as the set mode. This step is executed in a general system which causes the image processing apparatus 102 to receive a large quantity of real space image and execute the subsequent processes because the transmission band is sufficiently wide, and the image processing apparatus 102 has a sufficient process capability. In the general arrangement, only the real space image is transmitted. Unlike it, in mode "2", the image sensing apparatus 101 prepares auxiliary data in addition to the real space image. Although the system must provide the position measurement function on the side of the image sensing apparatus 101, the process load on the side of the image processing apparatus 102 can be reduced. The mode to be selected from modes "1" and "2" may be set in advance, or the way to select the mode is not particularly limited.

If the transmission band is less than the predetermined threshold value, the process advances to step S909 to set one of modes "5" or "9" as the set mode. In this step, it is determined to execute image composition by the image sensing apparatus 101 because the transmission band is insufficient. Since it is unnecessary to transmit the real space image, the band can effectively be used. Modes "5" to "9" assume that the image sensing apparatus 101 executes image composition. The contents of the position measurement process changes between the modes. The mode to be selected from modes "5" to "9" may be set in advance, or the way to select the mode is not particularly limited.

In this embodiment, mode selection is done setting importance on the transmission band. However, the mode may be selected on the basis of the contents and purpose of the MR application, including the position measurement accuracy that changes depending on the type and update time of the algorithm and the required minimum delay time.

Figure 10:
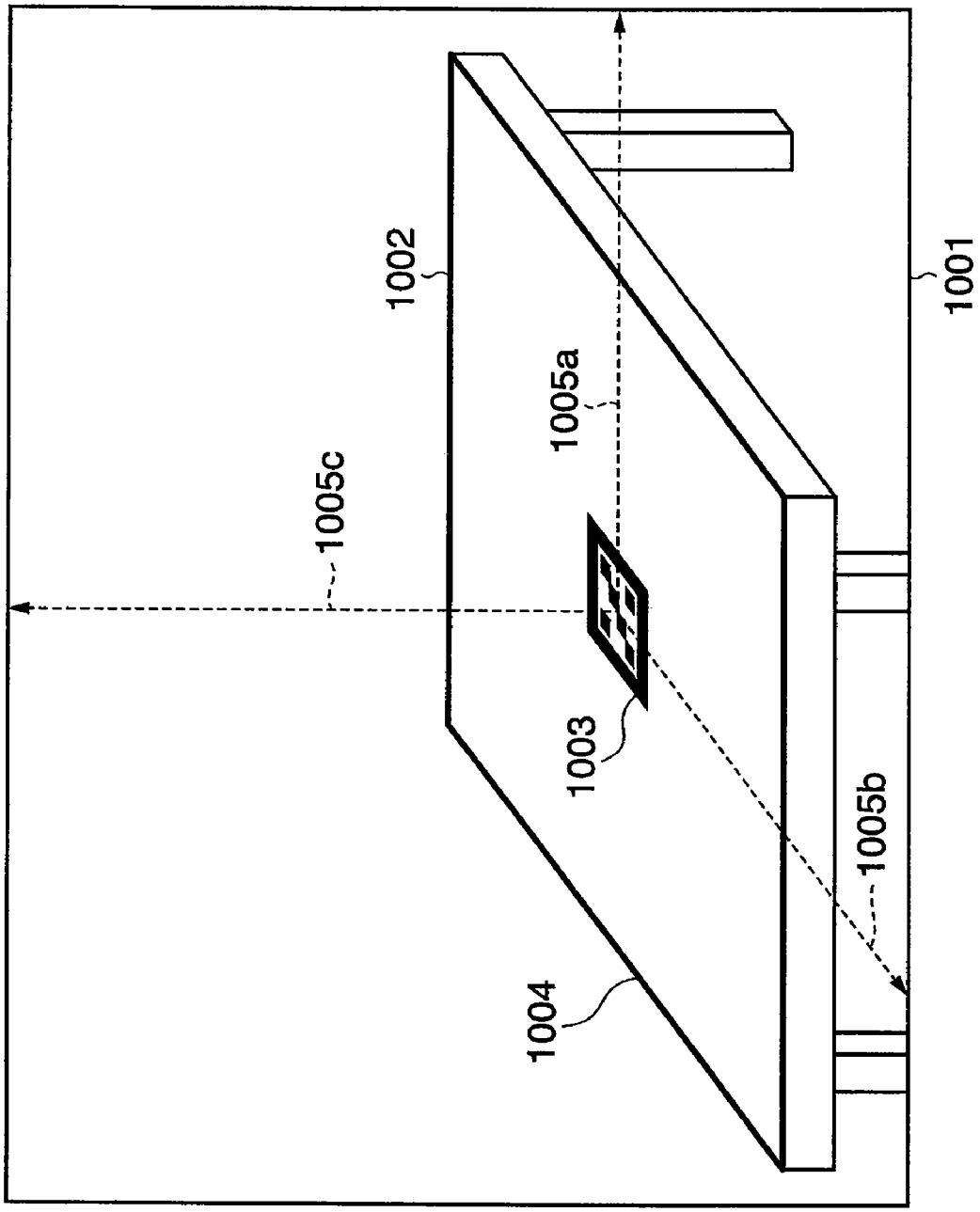
FIG. 10 is a view for explaining a process of obtaining the position and orientation of a viewpoint by using a marker in an image.

FIG. 10 is a view for explaining the process of obtaining the position and orientation of a viewpoint by using a marker in an image.

A marker 1003 has a predetermined positional relationship with respect to the image sensing apparatus 101. When the marker 1003 is displayed in a real space image 1001, the marker 1003 is detected from the real space image 1001. On the basis of information such as the size, shape, and fill pattern of the marker 1003, the relative positional relationship between the marker 1003 and the image sensing apparatus 101 and three-dimensional position and orientation information about the direction in which the wearer of the image sensing apparatus 101 is observing the marker 1003 can be calculated. The example shown FIG. 10 assumes a three-dimensional coordinate system with its origin being set at the center of the marker 1003. The origin of the coordinate system need not always be set on the marker 1003. The origin can be set at an arbitrary position by determining the relative positional relationship between the marker 1003 and the origin of the coordinate system.

The process of obtaining the position and orientation can be done by using a plurality of markers simultaneously, instead of using a single marker. To use a plurality of markers simultaneously, the positional relationship between them is defined in advance. The marker observation direction can be calculated from the relative positional relationship. Hence, not the marker that enables to identify the direction by the internal film pattern, as shown in FIG. 10, but a color marker or a marker formed from a light-emitting element such as an LED having no direction information can be used. In place of a marker, a feature point in the image, such as an outline 1004 of a table, or a specific color in the image may be extracted and used to calculate the position and orientation. It is possible to flexibly and more accurately generate position information by using a plurality of markers of the same kinds, using a plurality of kinds of markers simultaneously, or combining marker information with the information of a feature point in the image.

The plurality of markers or feature points have a predetermined positional relationship. For this reason, even when not all markers or feature points are displayed in the image, the position of each marker or feature point can be estimated. An MR technology by utilization of markers is disclosed in Kato, H. and Billinghurst, M., "Marker Tracking and HMD Calibration for a video-based Augmented Reality Conferencing System", In Proceedings of the 2nd International Workshop on Augmented Reality (IWAR 99), October (1999), San Francisco, USA.

In this embodiment, both the image sensing apparatus 101 and the image processing apparatus 102 have the position and orientation measurement function and the composite image generation function. Even when an apparatus having the functions and an HMD with an image sensing unit and a display unit may separately be provided, the same function can be implemented.

In this embodiment, the CPU 3205 implements the function of the position measuring unit 106 of the image sensing apparatus 101. The function can be implemented partially or wholly by using dedicated hardware (ASIC or FPGA).

As described above, in this embodiment, the capability related to the function of the partner or the function of its own is grasped by negotiation. The processes necessary for generating a composite image of a CG image and a real space image are optimally distributed to the image sensing apparatus 101 and the image processing apparatus 102 in accordance with the object, application purpose, and system configuration. How to distribute each process is not limited to the above-described arrangement.

[Second Embodiment]

In the first embodiment, to reduce the data amount of the real space image transmitted from the image sensing apparatus 101 to the image processing apparatus 102, a reduced image of the real space image is generated and transmitted. In the second embodiment, to achieve the same object, a compressed image obtained by compressing a real space image is transmitted to an image processing apparatus 102 in place of the reduced image.

Only the different points between the first embodiment and the second embodiment will be described below. That is, the second embodiment is the same as the first embodiment except the points to be described below.

Figure 11:
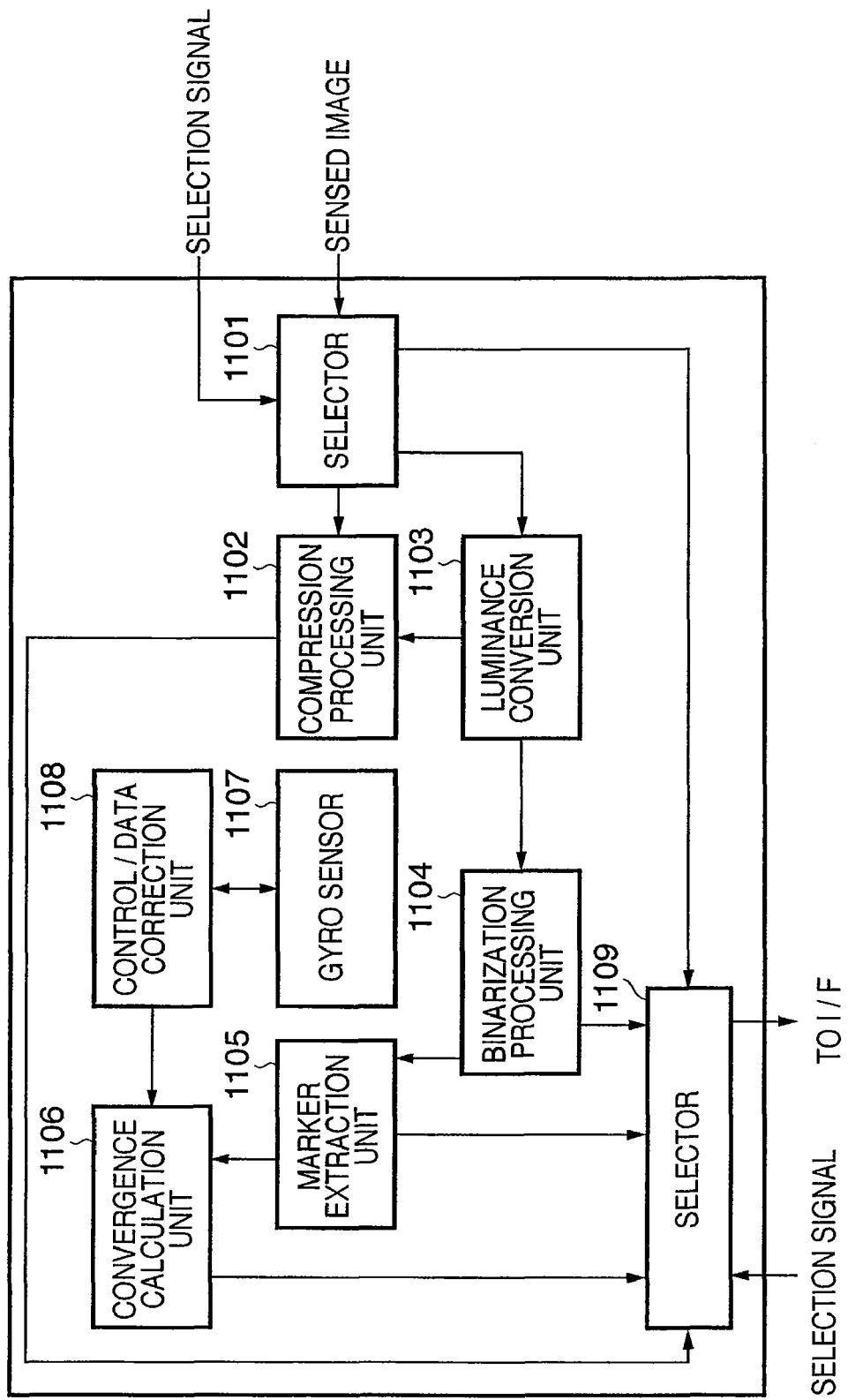
FIG. 11 is a block diagram showing the functional arrangement of a position measuring unit 106 of an image sensing apparatus 101.

FIG. 11 is a block diagram showing the functional arrangement of a position measuring unit 106 of an image sensing apparatus 101.

Reference numeral 1101 denotes a selector. The selector 1101 sends a real space image received via a switch 104 to one of a compression processing unit 1102, a luminance conversion unit 1103, and a selector 1109 to select the output of the final stage.

Reference numeral 1102 denotes the compression processing unit. Upon receiving a real space image via the selector 1101, the compression processing unit 1102 compresses the received image. The compression method is not particularly limited. JPEG or MPEG as a general image compression technique is used. The MR technology especially requires a real-time process. Hence, intra-frame compression such as Motion-JPEG is more preferable than MPEG-based compression using the difference between frames. In the JPEG2000 standard, not only lossy compression but also lossless compression can be selected. Which should be selected is determined upon negotiation on the basis of the transmission band and object.

Reference numeral 1103 denotes the luminance conversion unit. The luminance conversion unit 1103 is the same as the luminance conversion unit 203 of the first embodiment. The compression processing unit 1102 may compress a luminance image generated by the luminance conversion unit 203.

Reference numeral 1104 denotes a binarization processing unit. The binarization processing unit 1104 is the same as the binarization processing unit 204 of the first embodiment.

Reference numeral 1105 denotes a marker extraction unit. If a marker exists in the real space image input to the selector 1101, the marker extraction unit 1105 extracts the marker. The process of the marker extraction unit 1105 is the same as in the first embodiment.

Reference numeral 1106 denotes a convergence calculation unit. When the marker extraction unit 1105 extracts at least one marker, the convergence calculation unit 1106 executes iterative calculation to accurately calculate its position. As a result of this calculation, the position and orientation of the viewpoint of the observer are obtained. The process of the convergence calculation unit 1106 is the same as in the first embodiment.

Reference numeral 1107 denotes a gyro sensor. The gyro sensor 1107 is the same as the gyro sensor 207 of the first embodiment.

Reference numeral 1108 denotes a control/data correction unit. The control/data correction unit 1108 is the same as the control/data correction unit 208 of the first embodiment.

Reference numeral 1109 denotes the selector. The selector 1109 selects a target to be transmitted to the image processing apparatus 102 from the real space image input to the selector 1101, the compressed image generated by the compression processing unit 1102, the luminance image generated by the luminance conversion unit 1103, the binary image generated by the binarization processing unit 1104, marker information about the markers extracted by the marker extraction unit 1105, and the position and orientation of the viewpoint of the observer obtained by the convergence calculation unit 1106, and transmits the selected data to the image processing apparatus 102 via an I/F 109. A function selection unit 108 described above issues a selection instruction by a selection signal.

Figure 12:
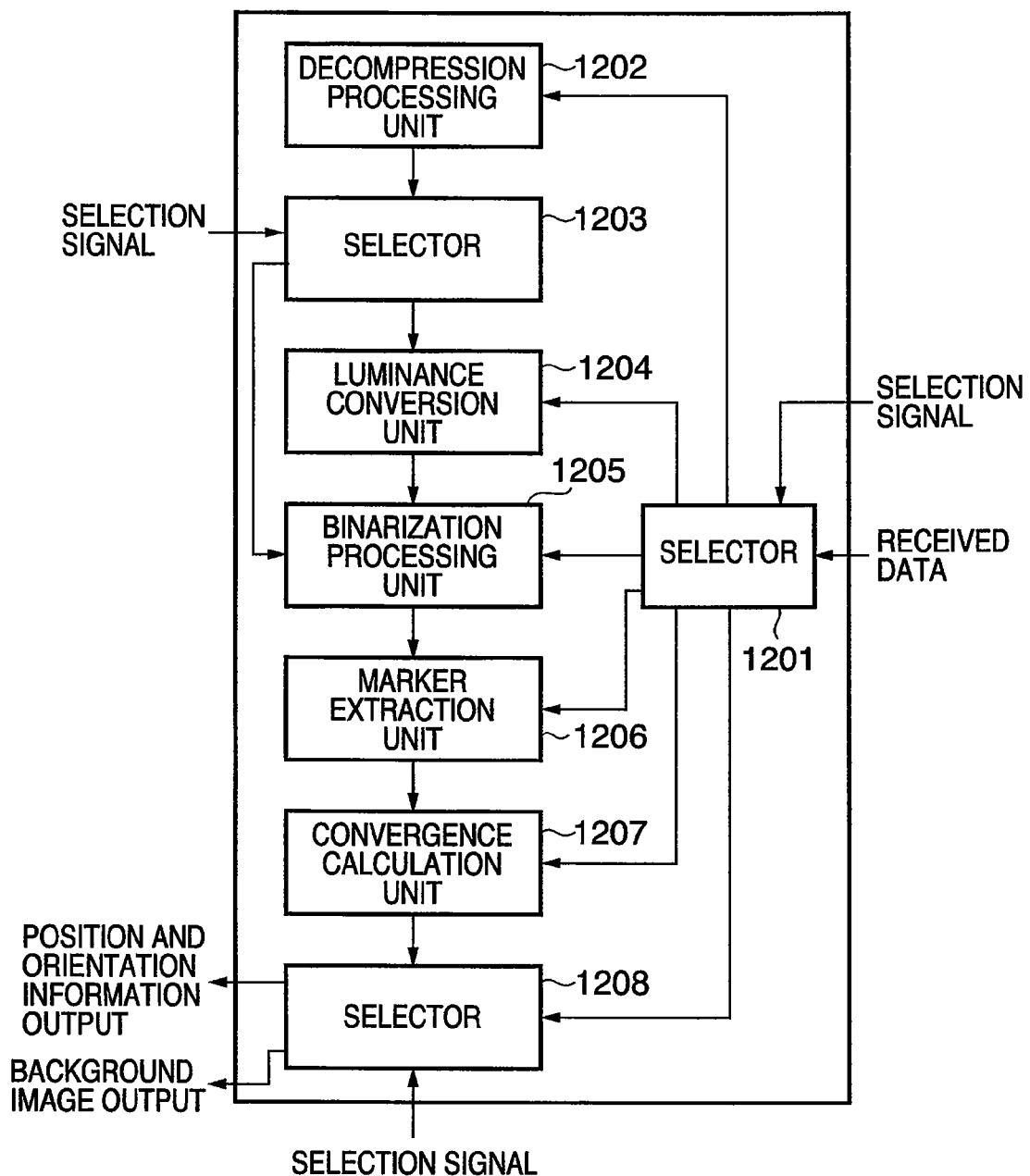
FIG. 12 is a block diagram showing the functional arrangement of a position measuring unit 116 of an image processing apparatus 102.

FIG. 12 is a block diagram showing the functional arrangement of a position measuring unit 116 of the image processing apparatus 102.

Referring to FIG. 12, reference numeral 1201 denotes a selector. The selector 1201 switches the output destination of received data on the basis of the type of the data received from the image sensing apparatus 101 via an I/F 113 and the result of negotiation with the image sensing apparatus 101. Upon receiving a real space image from the image sensing apparatus 101, the selector 1201 transfers it to a luminance conversion unit 1204. Upon receiving a compressed image, the selector 1201 transfers it to a decompression processing unit 1202. Upon receiving a luminance image, the selector 1201 transfers it to a binarization processing unit 1205. Upon receiving a binary image, the selector 1201 transfers it to a marker extraction unit 1206. Upon receiving marker information, the selector 1201 transfers it to a convergence calculation unit 1207. Upon receiving a position and orientation, the selector 1201 transfers it to a selector 1208.

Reference numeral 1202 denotes the decompression processing unit. The decompression processing unit 1202 decompresses the compressed image by executing a process reverse to that of the compression processing unit 1102.

Reference numeral 1203 denotes a selector. If the image decompressed by the decompression processing unit 1202 is a luminance image, the selector 1203 transfers it to the binarization processing unit 1205. If the decompressed image is a real space image, the selector 1203 transfers it to the luminance conversion unit 1204.

Reference numeral 1204 denotes the luminance conversion unit; 1205, the binarization processing unit; 1206, the marker extraction unit; and 1207, the convergence calculation unit. These units execute the same operations as the luminance conversion unit 1103, the binarization processing unit 1104, the marker extraction unit 1105, and the convergence calculation unit 1106 of the image sensing apparatus 101.

Reference numeral 1208 denotes the selector. The selector 1208 selectively outputs the position and orientation calculated on the side of the image sensing apparatus 101 or the position and orientation calculated by the convergence calculation unit 1207. If the image processing apparatus 102 should execute the composition process, the selector 1208 outputs the decompressed real space image as the background image to be used for composition. A function selection unit 115 described above issues a selection instruction by a selection signal.

Figure 13:
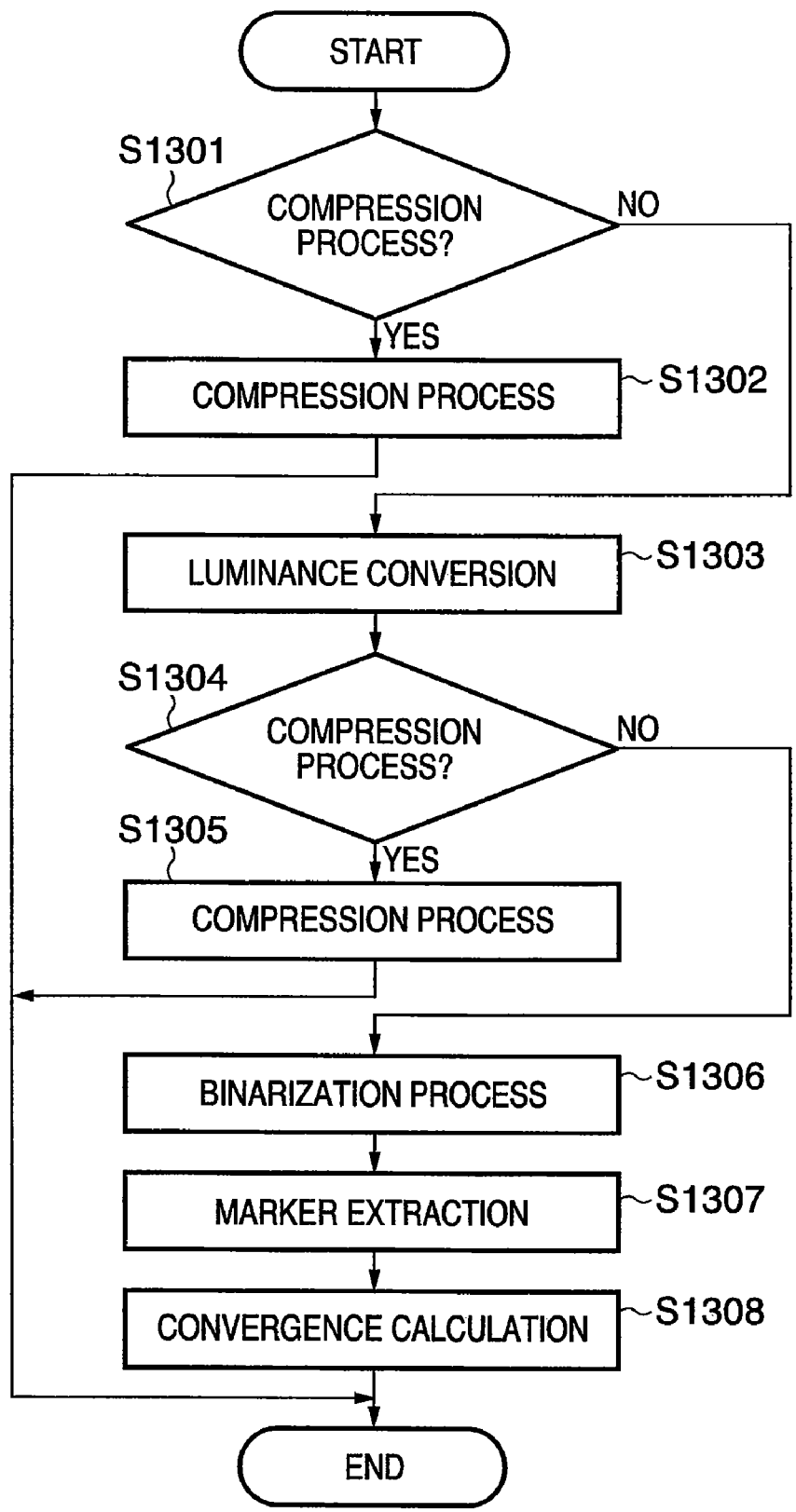
FIG. 13 is a flowchart showing details of a process in step S406.

FIG. 13 is a flowchart showing details of a process in step S406 in the second embodiment.

In step S1301, it is determined whether to generate a compressed image of a real space image by compression. Whether to generate a compressed image is determined by the set mode, as in the first embodiment in which whether to generate a reduced image is determined.

If NO in step S1301, the process advances to step S1303. If YES in step S1301, the process advances to step S1302. A CPU 3205 functions as the compression processing unit 1102 to generate a compressed image by compressing the real space image acquired in step S402. The process is ended.

In step S1303, the CPU 3205 functions as the luminance conversion unit 1103 to generate a luminance image of the real space image acquired in step S402.

In step S1304, it is determined whether to compress the luminance image. If YES in step S1304, the process advances to step S1305 to generate a compressed image by compressing the luminance image. The process is ended.

If NO in step S1304, the process advances to step S1306. The CPU 3205 functions as the binarization processing unit 1104 to generate a binary image by binarizing the luminance image generated in step S1303.

In step S1307, the CPU 3205 functions as the marker extraction unit 1105 to extract markers from the binary image generated in step S1306.

In step S1308, the CPU 3205 functions as the convergence calculation unit 1106 to execute accurate convergence calculation by a direct method using the positions of the markers extracted in step S1306. With this process, the position and orientation of the viewpoint, and as needed, the auxiliary data are obtained.

One of the compressed image, the uncompressed luminance image, the binary image, the marker information, and the position and orientation is transmitted to the image processing apparatus 102.

Figure 14:
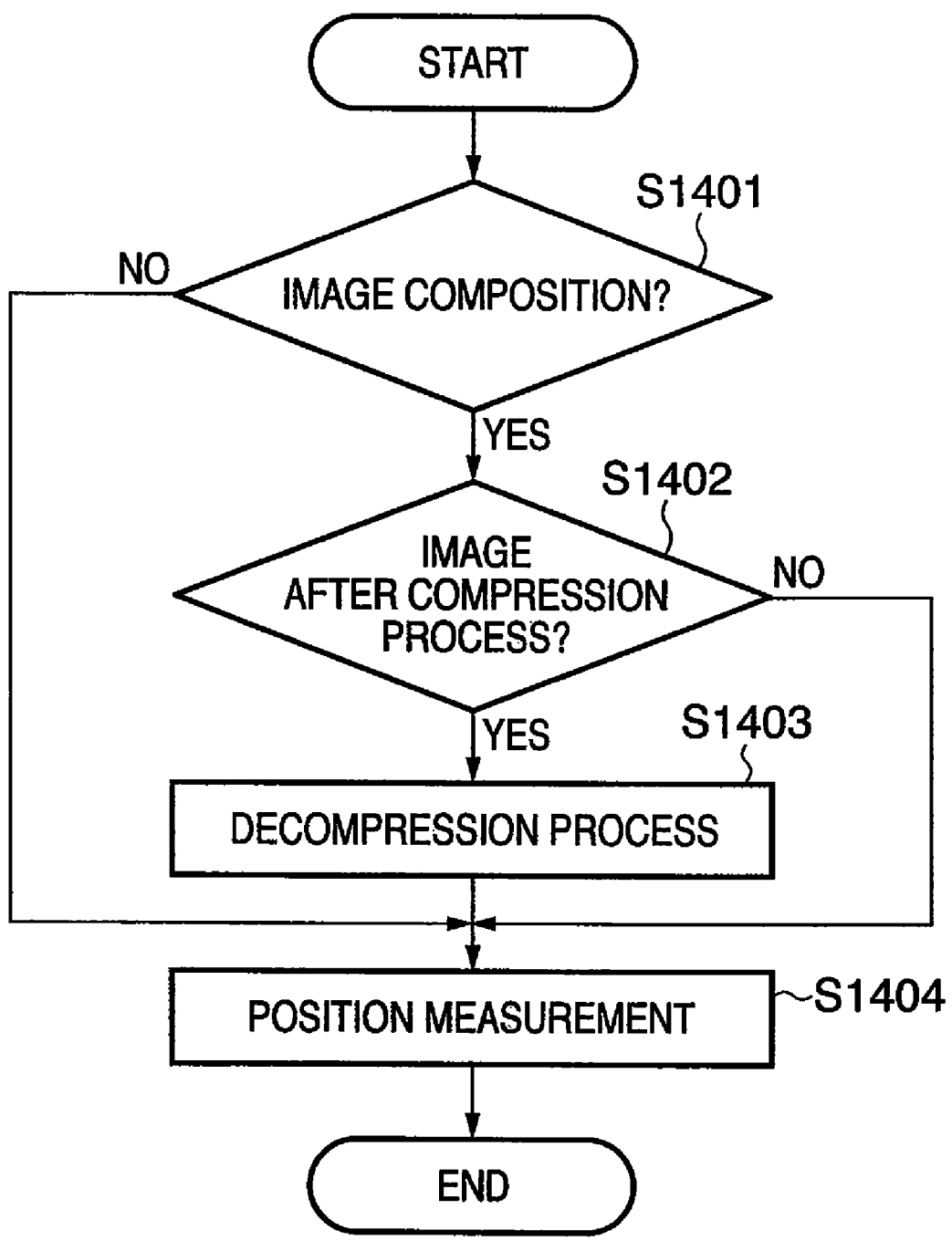
FIG. 14 is a flowchart showing details of a process in step S415.

FIG. 14 is a flowchart showing details of a process in step S415 in the second embodiment.

In step S1401, it is determined whether the result of negotiation indicates that the image processing apparatus 102 should generate a composite image. If it is determined that the image sensing apparatus 101 should generate a composite image, the process advances to step S1404.

If the image processing apparatus 102 should generate a composite image, the process advances to step S1402.

In step S1402, it is determined whether the image received in step S413 is a compressed image. In the processes to be described later, including this process, the process executed for the image can be determined by referring to header information added to the image. This technique is known, and a description thereof will be omitted.

If the received image is a compressed image, it must be decompressed. If it is determined that the image is not a compressed image, the process advances to step S1404. If the image is a compressed image, the process advances to step S1403. In step S1403, the compressed image is decompressed to reconstruct the original image.

In step S1404, the position and orientation of the viewpoint, and as needed, auxiliary data are obtained by using the image decompressed in step S1403 or the image received in step S413.

As described above, according to the second embodiment, the large transmission amount of a real space image is reduced by compression. Additionally, as in the first embodiment, both the image sensing apparatus and the image processing apparatus have the position and orientation measurement function, and the measurement contents of the respective apparatuses are determined by negotiation in advance. Hence, it is possible to optimally distribute the load in accordance with the object, the application purpose, and the system configuration.

Especially in the second embodiment using compression, the data amount can largely be reduced, although the delay caused by a larger circuit scale and a longer process time than in resolution conversion must be taken into consideration.

[Third Embodiment]

The third embodiment is different from the first embodiment only in that a converted image obtained by converting the color representation or the number of tones of a real space image is transmitted to an image processing apparatus 102 in place of a reduced image.

Figure 15:
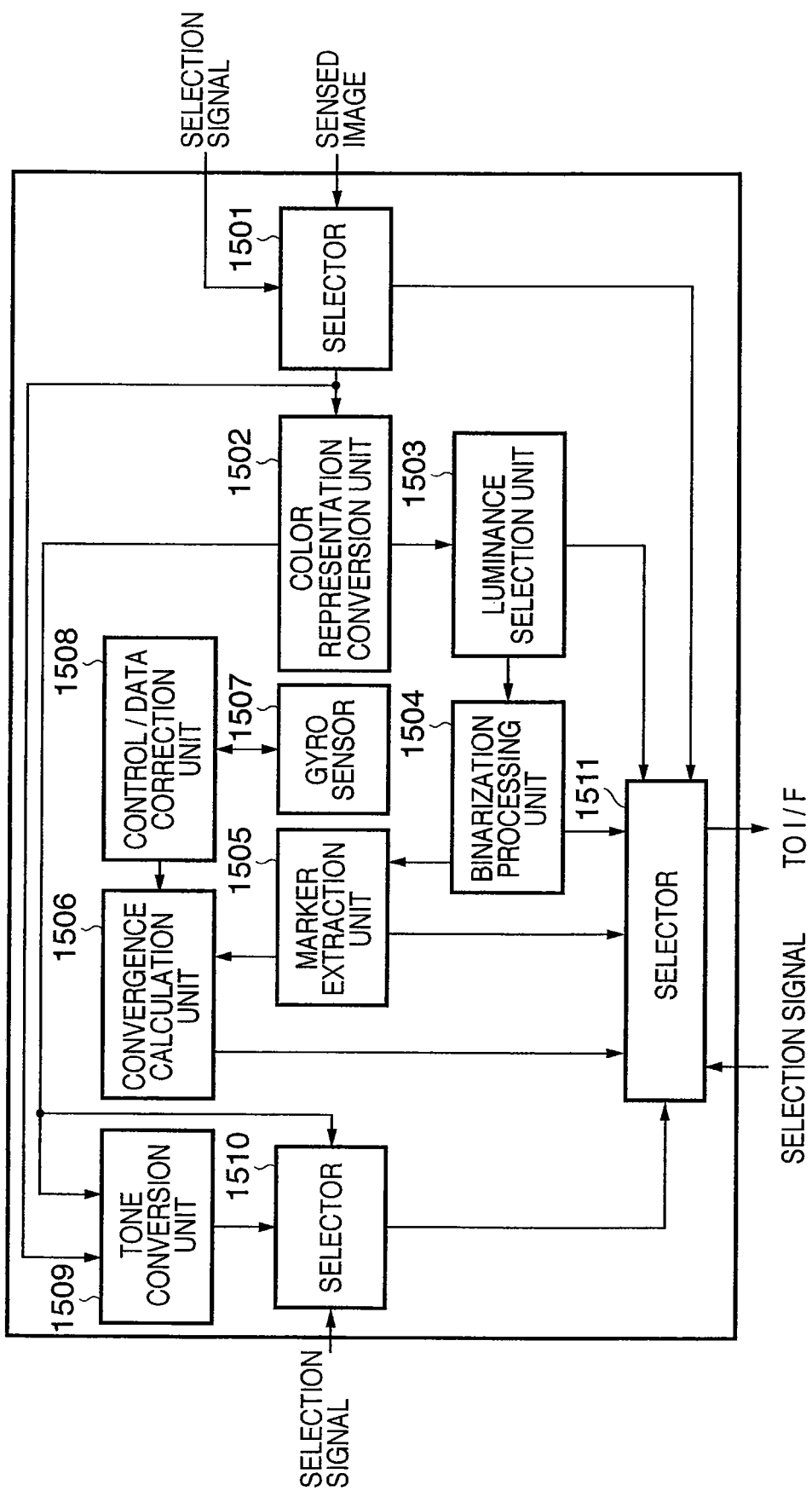
FIG. 15 is a block diagram showing the functional arrangement of a position measuring unit 106 of an image sensing apparatus 101;.

FIG. 15 is a block diagram showing the functional arrangement of a position measuring unit 106 of an image sensing apparatus 101. Only the different points between the position measuring unit 106 of the first embodiment and that of the third embodiment will be described below.

Reference numeral 1501 denotes a selector. The selector 1501 sends a real space image received via a switch 104 to one of a color representation conversion unit 1502 and a selector 1511 to select the output of the final stage.

Reference numeral 1502 denotes the color representation conversion unit. Upon receiving a real space image via the selector 1511, the color representation conversion unit 1502 converts the color representation of the received image. The color representation conversion method is not particularly limited. For example, 24-bit RGB image data is converted into various kinds of color representations such as YUV422, YUV420, YUV411, or YCC, and the color difference information is compressed.

Reference numeral 1503 denotes a luminance selection unit. After the color representation conversion unit 1502 separates the image data into a luminance signal and color difference signals, the luminance selection unit 1503 selects the luminance signal.

Reference numeral 1504 denotes a binarization processing unit. The binarization processing unit 1504 is the same as the binarization processing unit 204 of the first embodiment.

Reference numeral 1505 denotes a marker extraction unit. The process of the marker extraction unit 1505 is the same as in the first embodiment.

Reference numeral 1506 denotes a convergence calculation unit. When the marker extraction unit 1505 extracts at least one marker, the convergence calculation unit 1506 executes iterative calculation to accurately calculate its position. As a result of this calculation, the position and orientation of the viewpoint of the observer are obtained. The process of the convergence calculation unit 1506 is the same as in the first embodiment.

Reference numeral 1507 denotes a gyro sensor. The gyro sensor 1507 is the same as the gyro sensor 207 of the first embodiment.

Reference numeral 1508 denotes a control/data correction unit. The control/data correction unit 1508 is the same as the control/data correction unit 208 of the first embodiment.

Reference numeral 1509 denotes a tone conversion unit. The tone conversion unit 1509 converts the number of tones of the real space image. When the color of each pixel has an 8-bit tone in advance, the tone is converted into a 7-bit tone or a 6-bit tone by tone count conversion, thereby reducing the information amount. In color representation conversion, the color difference information is compressed without processing the luminance information. In tone count conversion, information is compressed by sacrificing the tonality. Information can be compressed further by combining color representation conversion and tone conversion.

Reference numeral 1510 denotes a selector. The selector 1510 outputs one of the image that has undergone tone conversion and the image without tone conversion to the selector 1511.

Reference numeral 1511 denotes the selector. The selector 1511 selects a target to be transmitted to the image processing apparatus 102 from the real space image, the image that has undergone tone conversion and/or color representation conversion, the luminance image, the binary image, the marker information, and the position and orientation of the viewpoint, and transmits the selected data to the image processing apparatus 102 via an I/F 109.

Figure 16:
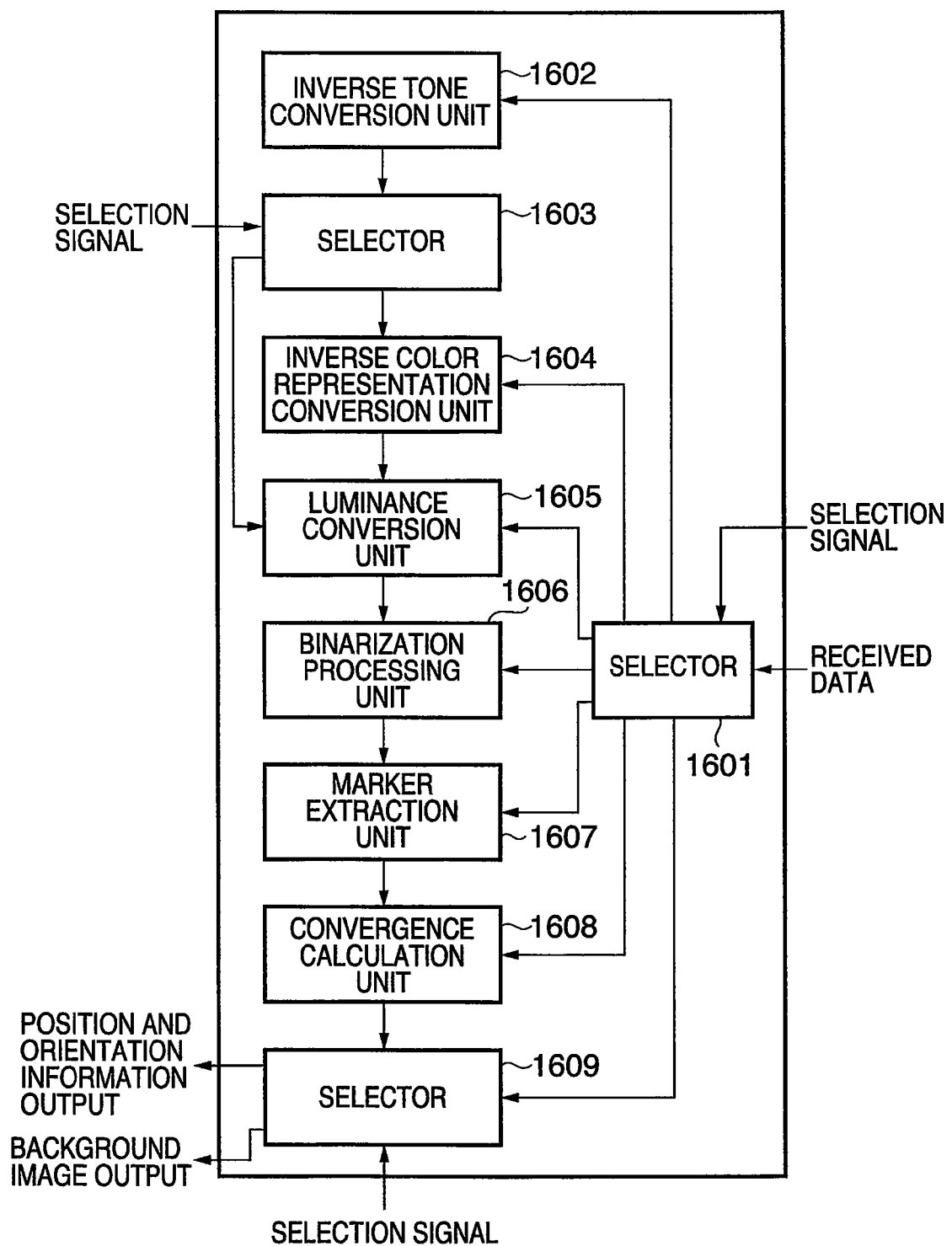
FIG. 16 is a block diagram showing the functional arrangement of a position measuring unit 116 of an image processing apparatus 102.

FIG. 16 is a block diagram showing the functional arrangement of a position measuring unit 116 of the image processing apparatus 102. Only the different points between the position measuring unit 116 of the first embodiment and that of the third embodiment will be described below.

Referring to FIG. 16, reference numeral 1601 denotes a selector. The selector 1601 switches the output destination of received data on the basis of the type of the data received from the image sensing apparatus 101 via an I/F 113 and the result of negotiation with the image sensing apparatus 101. Upon receiving a real space image from the image sensing apparatus 101, the selector 1601 transfers it to a luminance conversion unit 1605. Upon receiving an image that has undergone tone conversion or both tone conversion and color representation conversion, the selector 1601 transfers it to an inverse tone conversion unit 1602. Upon receiving an image that has undergone color representation conversion, the selector 1601 transfers it to an inverse color representation conversion unit 1604. Upon receiving a luminance image, the selector 1601 transfers it to a binarization processing unit 1606. Upon receiving a binary image, the selector 1601 transfers it to a marker extraction unit 1607. Upon receiving marker information, the selector 1601 transfers it to a convergence calculation unit 1608. Upon receiving a position and orientation, the selector 1601 transfers it to a selector 1609.

Reference numeral 1602 denotes the inverse tone conversion unit. The inverse tone conversion unit 1602 returns the tone of the image to the original tone by executing a process reverse to that of the tone conversion unit 1509.

Reference numeral 1603 denotes a selector. The selector 1603 determines whether the image received from the inverse tone conversion unit 1602 is an image that has undergone color representation conversion. An image that has undergone color representation conversion is transferred to the inverse color representation conversion unit 1604. An image without color representation conversion is transferred to the luminance conversion unit 1605.

Reference numeral 1604 denotes the inverse color representation conversion unit. The inverse color representation conversion unit 1604 returns the color representation of the image to the original color representation by executing a process reverse to that of the color representation conversion unit 1502.

Reference numeral 1605 denotes the luminance conversion unit; 1606, the binarization processing unit; 1607, the marker extraction unit; and 1608, the convergence calculation unit, which are the same as in the second embodiment.

Reference numeral 1609 denotes the selector. The selector 1609 selectively outputs the position and orientation calculated on the side of the image sensing apparatus 101 or the position and orientation calculated by the convergence calculation unit 1608. If the image processing apparatus 102 should execute the composition process, the selector 1609 outputs the image having the original tone representation or color representation as the background image to be used for composition. A function selection unit 115 described above issues a selection instruction by a selection signal.

Figure 17:
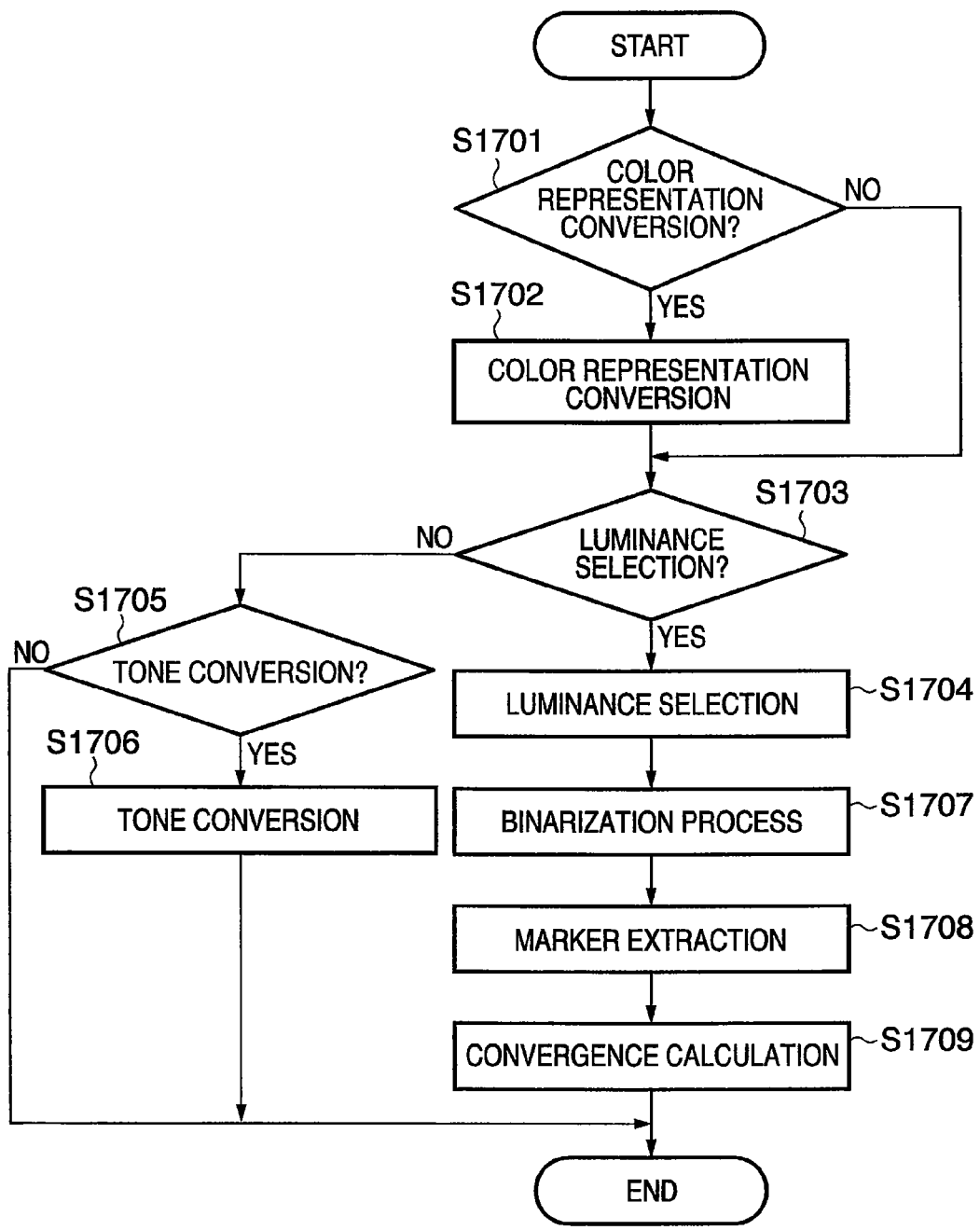
FIG. 17 is a flowchart showing details of a process in step S406.

FIG. 17 is a flowchart showing details of a process in step S406 in the third embodiment.

In step S1701, it is determined whether to execute color representation conversion of a real space image. Whether to execute color representation conversion is determined by the set mode, as in the first embodiment in which whether to generate a reduced image is determined.

If NO in step S1701, the process advances to step S1703. If YES in step S1701, the process advances to step S1702. A CPU 3205 functions as the color representation conversion unit 1502 to execute color representation conversion of the real space image acquired in step S402.

In step S1703, it is determined whether to select a luminance signal. If YES in step S1703, the process advances to step S1704. If NO in step S1703, the process advances to step S1705. In step S1704, the CPU 3205 functions as the luminance selection unit 1503 to generate a luminance image by selecting the luminance signal from the image that has undergone color representation conversion.

In step S1707, the CPU 3205 functions as the binarization processing unit 1504 to generate a binary image by binarizing the luminance image generated in step S1704.

In step S1708, the CPU 3205 functions as the marker extraction unit 1505 to extract markers from the binary image generated in step S1707.

In step S1709, the CPU 3205 functions as the convergence calculation unit 1506 to execute accurate convergence calculation by a direct method using the positions of the markers extracted in step S1708. With this process, the position and orientation of the viewpoint, and as needed, the auxiliary data are obtained.

If it is determined in the selection process of step S1703 that the luminance signal should not be selected, the process advances to step S1705. In step S1705, it is determined whether to execute tone conversion of the real space image acquired in step S402 or the image that has undergone color representation conversion in step S1702. If NO in step S1705, the process is ended. If YES in step S1705, the process advances to step S1706. The CPU 3205 functions as the tone conversion unit 1509 to execute tone conversion of the real space image acquired in step S402 or the image that has undergone color representation conversion in step S1702.

One of the image that has undergone tone conversion and/or color representation conversion, the real space image, the binary image, the marker information, and the position and orientation is transmitted to the image processing apparatus 102.

Figure 18:
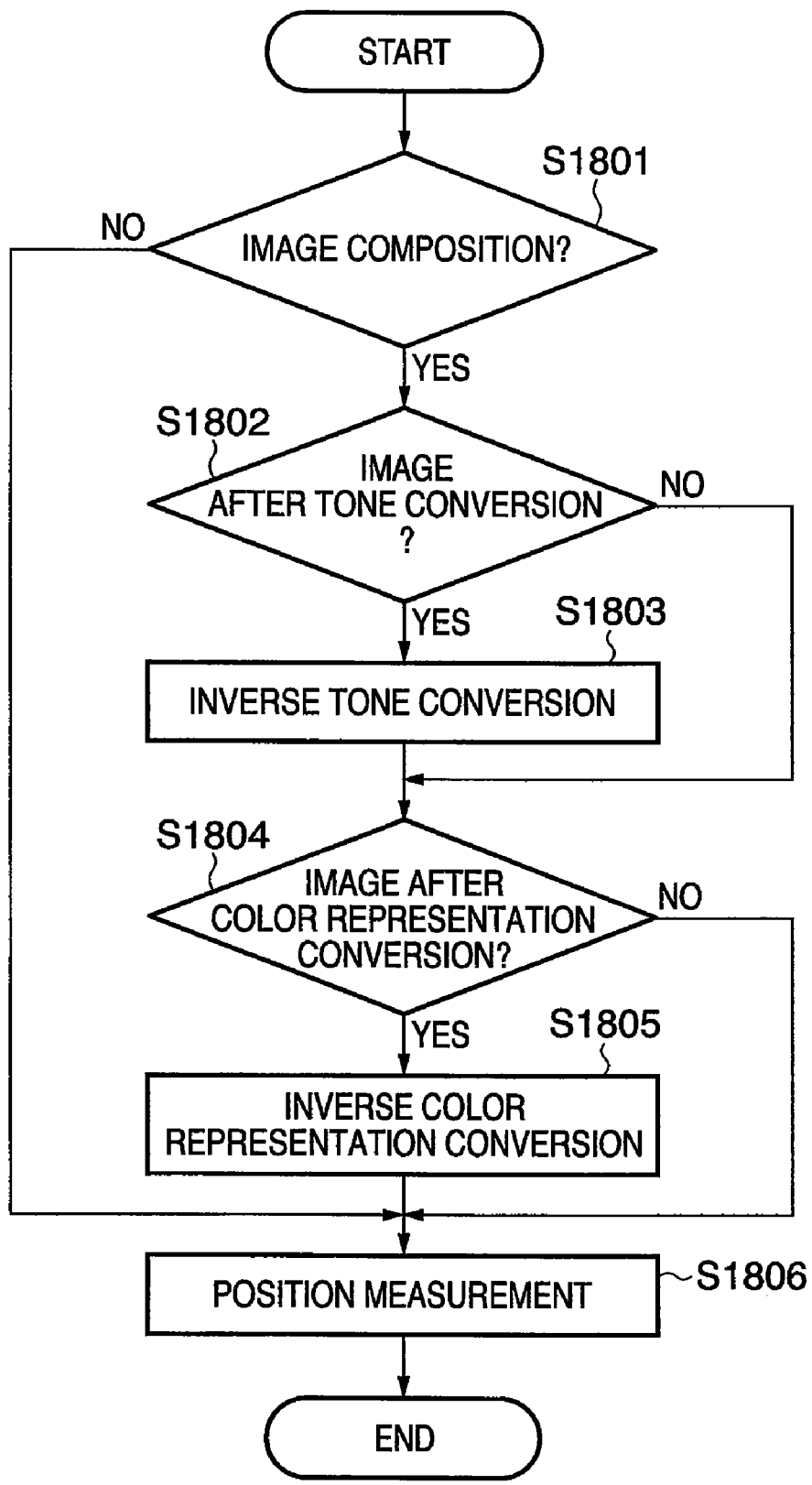
FIG. 18 is a flowchart showing details of a process in step S415.

FIG. 18 is a flowchart showing details of a process in step S415 in the third embodiment.

In step S1801, it is determined whether the result of negotiation indicates that the image processing apparatus 102 should generate a composite image. If it is determined that the image sensing apparatus 101 should generate a composite image, the process advances to step S1806.

If the image processing apparatus 102 should generate a composite image, the process advances to step S1802.

In step S1802, it is determined whether the image received in step S413 is an image that has undergone tone conversion. If the received image has not undergone tone conversion, the process advances to step S1804. If the received image has undergone tone conversion, the process advances to step S1803. In step S1803, the CPU 3205 functions as the inverse tone conversion unit 1602 to execute inverse tone conversion of the received image.

In step S1804, it is determined whether the image received in step S413 is an image that has undergone color representation conversion. If the received image has not undergone color representation conversion, the process advances to step S1806. If the received image has undergone color representation conversion, the process advances to step S1805. In step S1805, the CPU 3205 functions as the inverse color representation conversion unit 1604 to execute inverse color representation conversion of the received image.

In step S1806, the position and orientation of the viewpoint, and as needed, auxiliary data are obtained by using the real space image, the image obtained in step S1803, or the image obtained in step S1805.

As described above, according to the third embodiment, the large transmission amount of a real space image is reduced by converting the color representation or the tone representation. Additionally, as in the first and second embodiments, both the image sensing apparatus and the image processing apparatus have the position and orientation measurement function, and the measurement contents of the respective apparatuses are determined by negotiation in advance. Hence, it is possible to optimally distribute the load in accordance with the object, the application purpose, and the system configuration.

Especially in the third embodiment using conversion of color representation or tone count, a relatively simple arrangement can be implemented, and the influence of image quality degradation caused by data amount reduction is small, although the scale of data amount reduction is small as compared to resolution conversion or compression.

[Fourth Embodiment]

In the fourth embodiment, only an image sensing apparatus has an arrangement for measuring the position and orientation of a viewpoint and an arrangement for generating a composite image.

Figure 19:
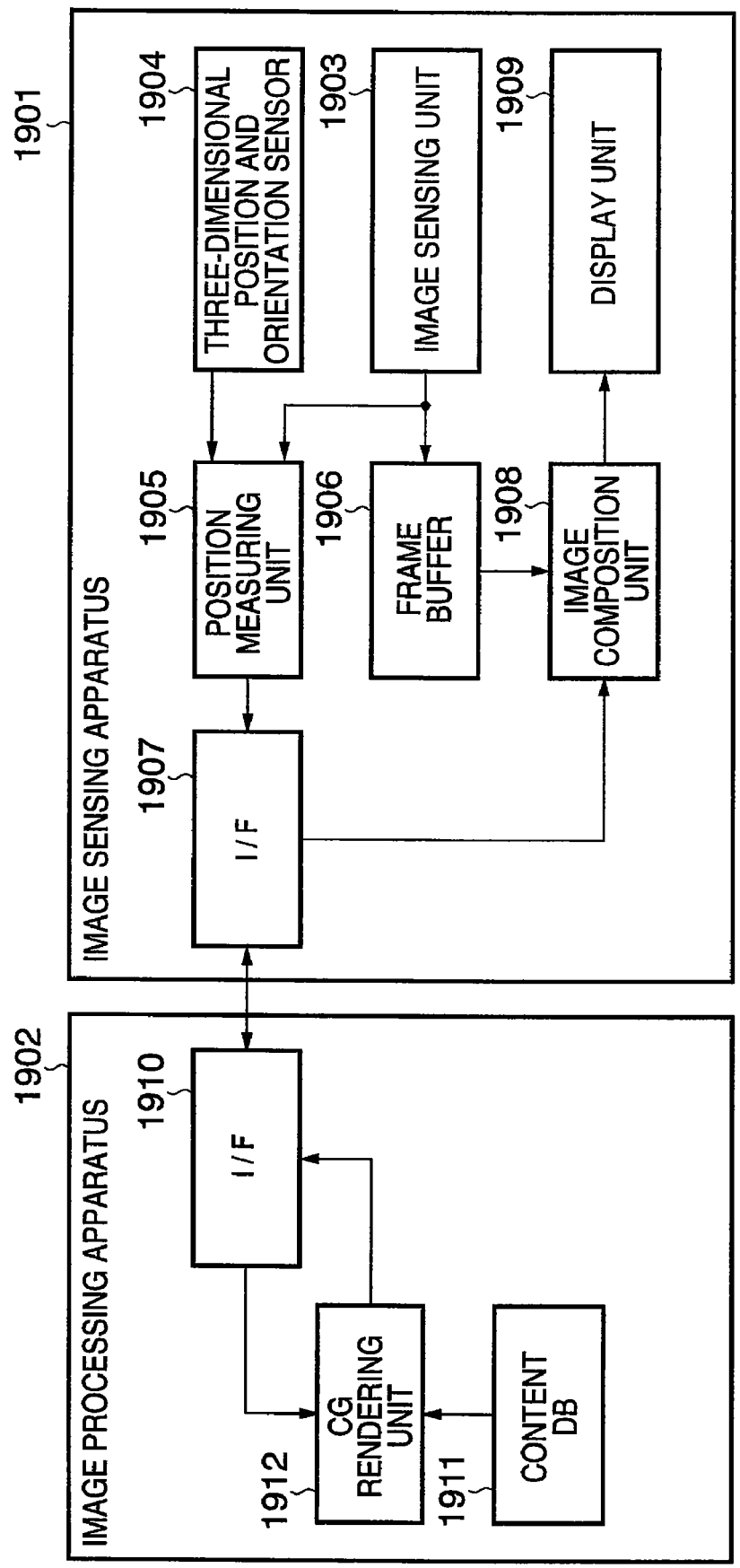
FIG. 19 is a block diagram showing the functional arrangement of a system according to the fourth embodiment of the present invention.

FIG. 19 is a block diagram showing the functional arrangement of a system according to this embodiment. As shown in FIG. 19, the system of this embodiment includes an image sensing apparatus 1901 and an image processing apparatus 1902.

The image sensing apparatus 1901 will be described. In this embodiment, the image sensing apparatus 1901 is a video see through HMD.

An image sensing unit 1903 is the same as the image sensing unit 103 shown in FIG. 1. Each sensed frame image (real space image) is transferred to a frame buffer 1906 and a position measuring unit 1905. The frame buffer 1906 is the same as the frame buffer 105 shown in FIG. 1. A three-dimensional position and orientation sensor 1904 measures auxiliary information to obtain the position and orientation of a viewpoint. In this embodiment, the three-dimensional position and orientation sensor 1904 is used to assist measurement. However, the use and implementation of the sensor are not essential. Measurement may be done by identifying markers included in an image.

The position measuring unit 1905 is fundamentally the same as the position measuring unit 106 shown in FIG. 1. That is, the position measuring unit 1905 executes a process of obtaining the position and orientation of a viewpoint by using auxiliary information received from the three-dimensional position and orientation sensor 1904 and a real space image received from the image sensing unit 1903. An I/F 1907 is the same as the I/F 109 shown in FIG. 1.

An image composition unit 1908 receives a CG image from the image processing apparatus 1902 via the I/F 1907 and generates a composite image (MR image) by compositing the received CG image with the real space image held in the frame buffer 1906. A display unit 1909 is the same as the display unit 112 shown in FIG. 1.

The image processing apparatus 1902 will be described.

A content DB 1911 is the same as the content DB 117 shown in FIG. 1. A CG rendering unit 1912 is the same as the CG rendering unit 118 shown in FIG. 1.

An I/F 1910 is the same as the I/F 113 shown in FIG. 1.

A real space image sensed by the image sensing unit 1903 is stored in the frame buffer 1906 and also input to the position measuring unit 1905. The position measuring unit 1905 obtains the position and orientation of the viewpoint by using auxiliary information obtained from the three-dimensional position and orientation sensor 1904 and the real space image obtained from the image sensing unit 1903. The obtained position and orientation are sent to the image processing apparatus 1902 via the I/F 1907.

In the image processing apparatus 1902, the CG rendering unit 1912 generates, by using the position and orientation received via the I/F 1910, an image of a virtual space seen from the viewpoint with the position and orientation. The process of generating the virtual space image is the same as in the above-described embodiments. The CG rendering unit 1912 sends the generated virtual space image to the image sensing apparatus 1901 via the I/F 1910 as a CG image.

In the image sensing apparatus 1901, upon receiving the CG image from the image processing apparatus 1902 via the I/F 1907, the image composition unit 1908 generates a composite image by compositing the CG image with the real space image stored in the frame buffer 1906.

To generate the composite image by a chroma key process, the image processing apparatus 1902 sends, as information, a specific color that is not used for CG rendering but will be used for chroma key composition. If a specific color need not be designated for each frame, the image processing apparatus 1902 negotiates with the image sensing apparatus 1901 in advance to decide to use a specific color during a predetermined period.

The image sensing apparatus 1901 chroma-key-composites the received CG image with the real space image stored in the frame buffer 1906 on the basis of the specific color. The real space image corresponding to the CG image is the image used to obtain the position information used for CG image generation.

To composite the image by using an α-channel, the image processing apparatus 1902 transmits an α-channel as two-dimensional data by the α value (mat value) of each pixel together with the CG image. The contents of the chroma key composition process and a semitransparent image composition process by α-channel will be described later.

The image composition unit 1908 sends the generated composite image to the display unit 1909. The display unit 1909 displays the composite image on its display screen.

In the above-described arrangement, it is unnecessary to transmit a real space image from the image sensing apparatus 1901 to the image processing apparatus 1902. If the real space image and the CG image have the same resolution, tone representation, and frame rate, the transmission data amount is almost ½ as compared to the general MR system configuration described as a prior art. Actually, the data amount is larger than ½ because the chroma key color or α-channel is transmitted together with the CG image.

The real space image used for composition is the image used to calculate position and orientation information measured upon CG image generation. Hence, there is no delay between the real space image and the CG image, and an MR image without sense of incompatibility can be provided.

In this embodiment, the basic arrangement has been described. It is also possible to make the data amount smaller than in RGB raw data transmission by executing reduction or compression by resolution conversion or tone conversion or color representation conversion before CG image transmission.

The above-described arrangement and process enable to obviate sensed image transmission for MR image display and maintain the same display quality.

Figure 20:
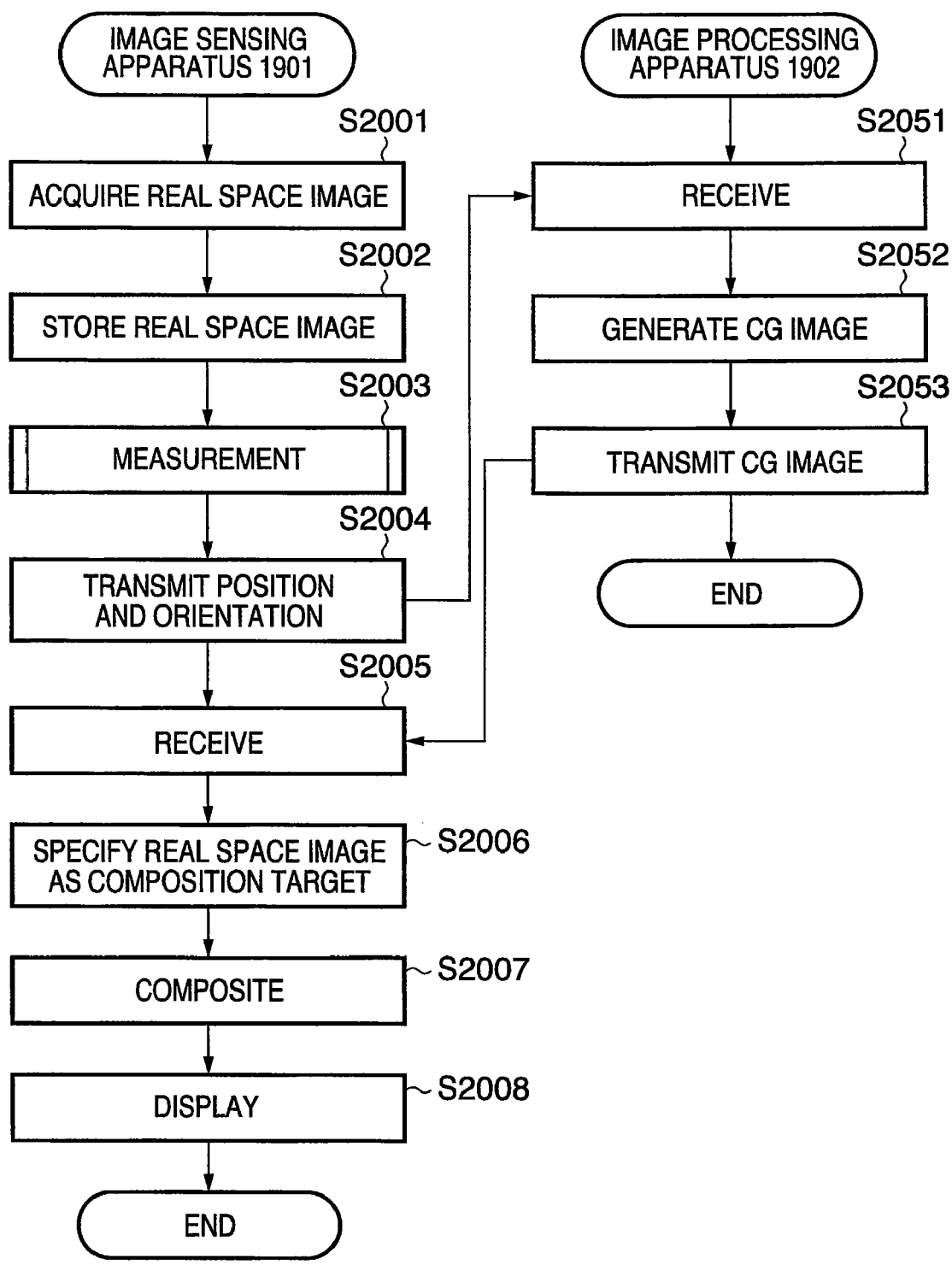
FIG. 20 is a flowchart showing processes executed by an image sensing apparatus 1901 and an image processing apparatus 1902 to display, on a display unit 1909 of the image sensing apparatus 1901, a composite image obtained by compositing a real space image sensed by the image sensing apparatus 1901 with a CG image generated by the image processing apparatus 1902.

FIG. 20 is a flowchart showing processes executed by the image sensing apparatus 1901 and the image processing apparatus 1902 to display, on the display unit 1909 of the image sensing apparatus 1901, a composite image obtained by compositing a real space image sensed by the image sensing apparatus 1901 with a CG image generated by the image processing apparatus 1902.

The process in steps S2001 to S2008 of the flowchart in FIG. 20 is executed by the image sensing apparatus 1901. A ROM 3204 stores the program and data to make a CPU 3205 of the image sensing apparatus 1901 execute the process in steps S2001 to S2008. The image sensing apparatus 1901 therefore executes the process in steps S2001 to S2008 by causing the CPU 3205 to execute the process by using the program and data.

The process in steps S2051 to S2053 of the flowchart in FIG. 20 is executed by the image processing apparatus 1902. An external storage device 3106 stores the program and data to make a CPU 3101 of the image processing apparatus 1902 execute the process in steps S2051 to S2053. The image processing apparatus 1902 therefore executes the process in steps S2051 to S2053 by causing the CPU 3101 to load the program and data to a RAM 3102 and execute the process by using them.

In step S2001, an image sensing unit 3201 (1903) senses the real space image under the control of the CPU 3205. In step S2002, the real space image is stored in the frame buffer 1906 provided on a RAM 3203.

In step S2003, the position and orientation of the viewpoint are obtained by using the real space image and the three-dimensional position and orientation sensor 1904. The three-dimensional position and orientation sensor 1904 is not indispensable and is used as needed.

In step S2004, the obtained position and orientation are transmitted to the image processing apparatus 1902. In step S2051, the CPU 3101 of the image processing apparatus 1902 receives the data transmitted in step S2004 via an I/F 3107 and acquires it on the RAM 3102.

In step S2052, first, the position and orientation of the viewpoint are determined by using the position and orientation received in step S2051. On the other hand, data about each virtual object is read out from the content DB 1911 in the external storage device 3106. A virtual space is formed by laying out the virtual objects in it. An image, i.e., CG image of the formed virtual space seen from the viewpoint with the determined position and orientation is generated.

In step S2053, the generated CG image is transmitted to the image sensing apparatus 1901. In step S2005, the image sensing apparatus 1901 receives the CG image transmitted in step S2053 from the image processing apparatus 1902 and acquires it on the RAM 3203.

In step S2006, the real space image acquired by the image sensing unit 1903 when the position measuring unit 1905 has calculated the position and orientation is specified. In step S2007, a composite image is generated by compositing the specified real space image with the CG image received in step S2005. In step S2008, the composite image is displayed on the display screen of the display unit 1909.

Figure 21:
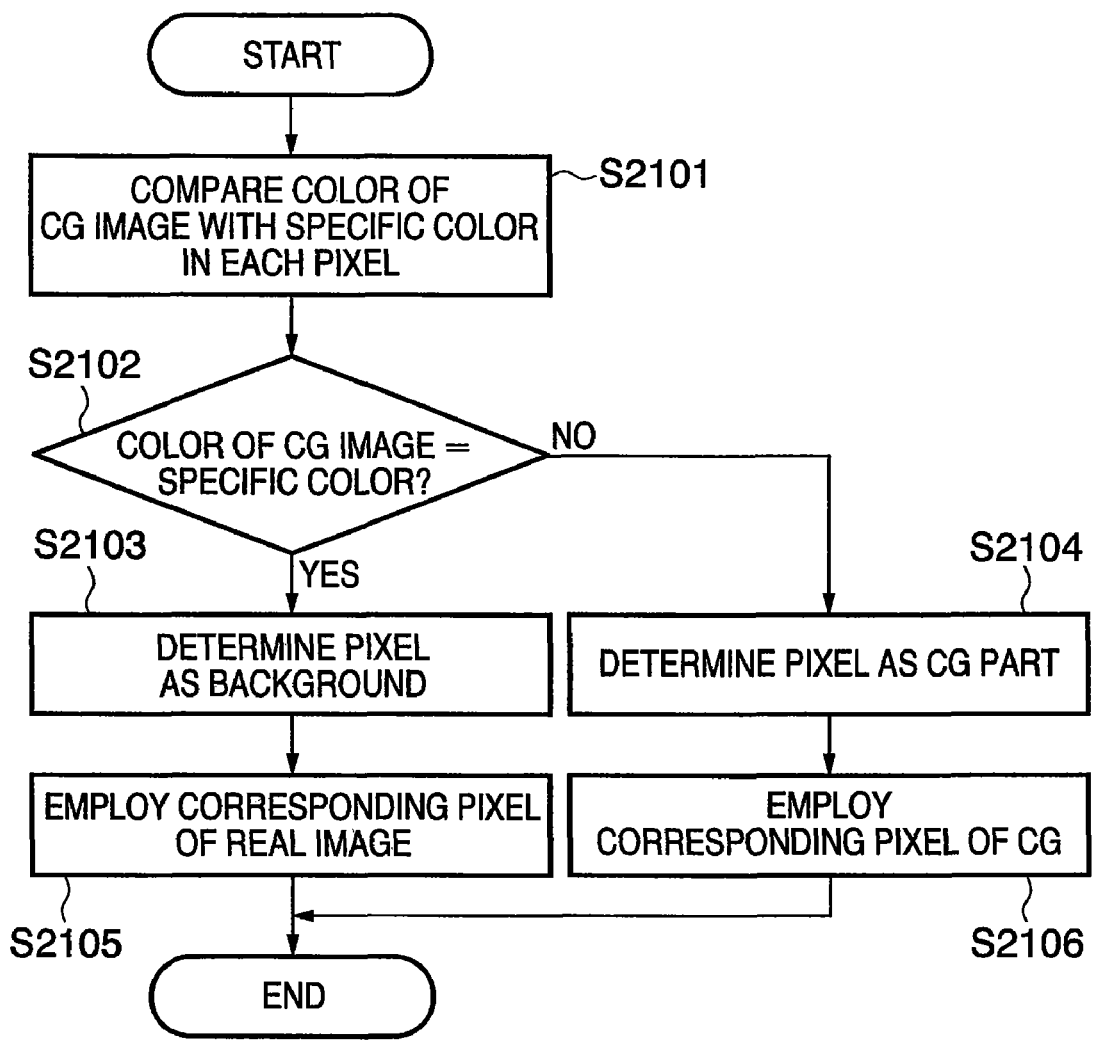
FIG. 21 is a flowchart showing an image composition process using a chroma key process.

FIG. 21 is a flowchart showing an image composition process using a chroma key process. The process corresponding to the flowchart in FIG. 21 is executed in step S2007. With this process, a composite image is generated.

General methods of superimposing a CG image on a real space image are classified into, e.g., chroma key, rotoscoping, and difference matching on the basis of the manner the real space image is cut out. The chroma key method as an automatic method suitable for MR will be described. In the chroma key method, blue back image sensing is done (an object is sensed in front of a wall with a uniform blue or green color serving as a background), and the area except the background color is automatically cut out. In CG image rendering of the MR technology, a specific color which is not used in CG is used to fill the area except the CD rendering area. Whether to cut out is determined for each pixel by comparison with the specific color.

In step S2101, the color of the CG image is compared, for each pixel, with the specific color used for the chroma key process.

In step S2102, each pixel of the CG image is referred to, and it is determined whether the color of the reference pixel matches the specific color. If YES in step S2102, the process advances to step S2103. If NO in step S2102, the process advances to step S2104.

In step S2103, it is determined that the reference pixel is included in the background part. In step S2105, the pixel included in the background part is replaced with a pixel of the real space image at the corresponding position. In step S2104, it is determined that the reference pixel is included in the CG part. In step S1206, the pixel included in the CG part is directly used.

By executing this process for all pixels of the CG image, the real space image sensed by the image sensing apparatus 1901 can be composite with the CG image generated by the image processing apparatus 1902 by a relatively simple arrangement.

A general chroma key composition process is disclosed in Japanese Patent Laid-Open Nos. 5-244630 and 7-154819.

Figure 22:
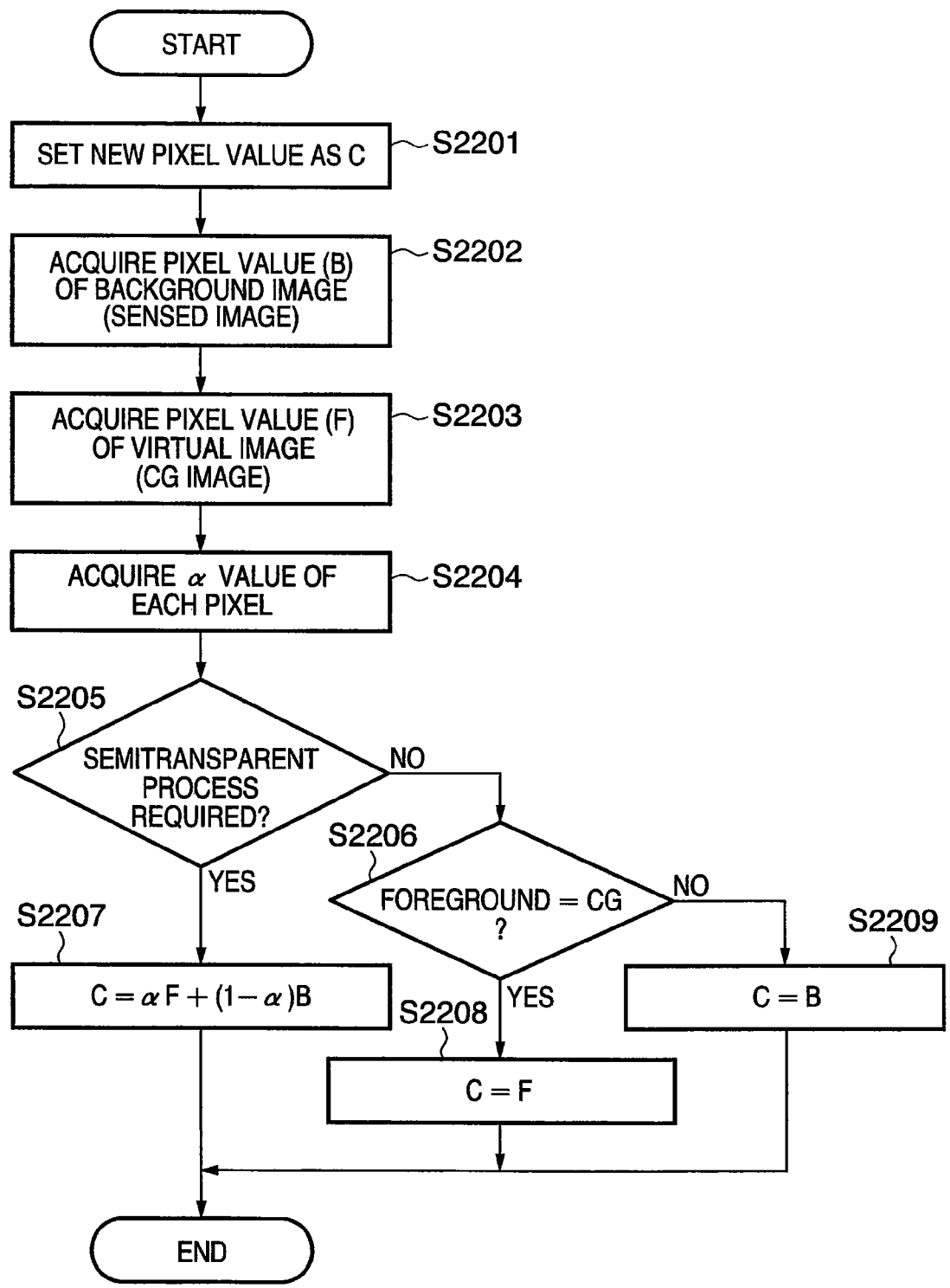
FIG. 22 is a flowchart showing a semitransparent image composition process using an α-channel.

FIG. 22 is a flowchart showing a semitransparent image composition process using an α-channel. The process corresponding to the flowchart in FIG. 22 is executed in step S2007. With this process, a composite image is generated.

The chroma key composition process cannot generate a semitransparent composite image of the background part as the real space image and the CG part as the CG image. To generate a semitransparent image, a contribution ratio that can take an intermediate value between 0 and 1, which is called an a value. The process will be described below.

In step S2201, the value of an arbitrary pixel of the composite image is set to C. This setting may be done in advance.

In step S2202, a correspond pixel value of the real space image is acquired. The acquired pixel value is defined as B here.

In step S2203, a correspond pixel value of the CG image is acquired. The acquired pixel value is defined as F here.

In step S2204, a correspond pixel value of the α-channel is transmitted from the image processing apparatus 1902. This value is acquired. The value is defined as α here.

In step S2205, it is determined for each pixel whether a semitransparent process is necessary. If YES in step S2205, the process advances to step S2207. If NO in step S2205, i.e., the value C should be replaced with the corresponding pixel of the real space image or CG image, the process advances to step S2206.

It is determined in step S2206 whether the foreground is a CG image. If YES in step S2206, the process advances to step S2208. If the foreground is the real space image, the process advances to step S2209.

In step S2207, the pixel value C after composition is obtained by $$C = \alpha \times F + (1-\alpha) \times B$$

In step S2208, the pixel value C is replaced with the pixel value F of the CG image.

In step S2209, the pixel value C is replaced with the pixel value B of the sensed image.

A general image composition process using an α-channel is disclosed in T. Porter and T. Duff, "Compositing Digital Images", Computer Graphics Vol. 18, No. 3 (1984).

As described above, according to the fourth embodiment, the position and orientation information of the image sensing apparatus necessary for CG image generation is measured on the image sensing apparatus side and transmitted, instead of transmitting a real space image with a large quantity. Since the transmission band can be used almost exclusively for transmission of the CG image, a high-resolution MR image can be provided even with a narrow transmission band.

In the conventional MR system, the image processing apparatus executes all processes of position and orientation measurement, CG image composition, and composite image generation. However, since the image sensing apparatus with the image sensing function has the position and orientation measurement function and composite image generation function, the process load on the image processing apparatus can be reduced.

As a consequence, it is possible to provide an MR image by using a device such as a portable phone, PDA, or notebook PC with a poor process capability without using a workstation or desktop PC having a function necessary for a high-speed complex calculation process.

In this embodiment, the image sensing apparatus has the position and orientation measurement function and composite image generation function. Even an arrangement that separately comprises an apparatus having both functions and an HMD including an image sensing unit and a display unit can implement the same function as described above.

[Fifth Embodiment]

In the fifth embodiment, as for the system configuration, only an image sensing apparatus has an arrangement for measuring the position and orientation of a viewpoint and an arrangement for generating a composite image, as in the fourth embodiment. The fifth embodiment is different from the fourth embodiment in that the latest real space image is composite with the latest virtual space image without using any frame buffer.

Figure 23:
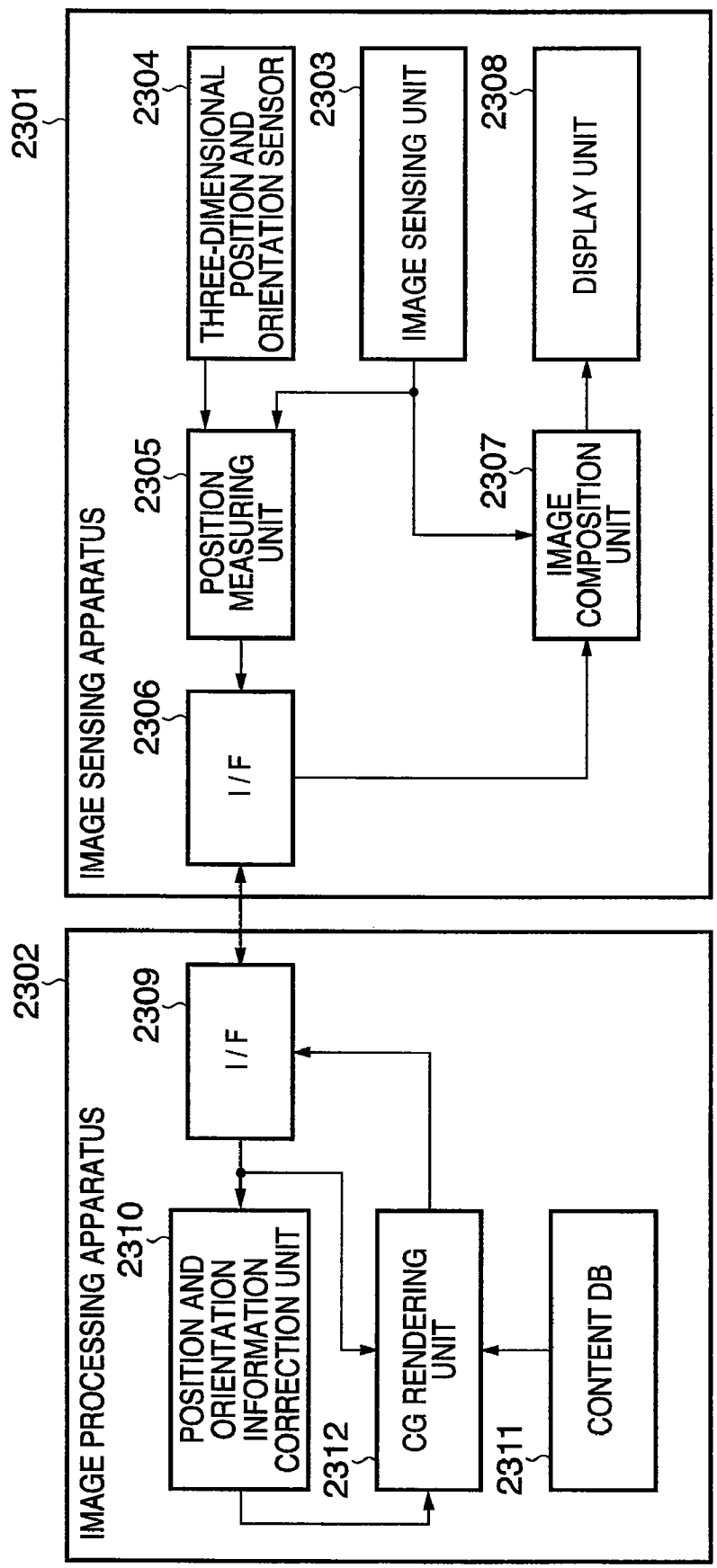
FIG. 23 is a block diagram showing the functional arrangement of a system according to the fifth embodiment of the present invention.

FIG. 23 is a block diagram showing the functional arrangement of a system according to this embodiment. As shown in FIG. 23, the system of this embodiment includes an image processing apparatus 2302 and an image sensing apparatus 2301. The image processing apparatus 2302 has an arrangement obtained by adding a position and orientation information correction unit 2310 to the image processing apparatus 1902 shown in FIG. 19. The image sensing apparatus 2301 has an arrangement obtained by removing the frame buffer 1906 from the image sensing apparatus 1901 shown in FIG. 19.

The position and orientation information correction unit 2310 corrects a position and orientation received from the image sensing apparatus 2301 in accordance with the timing of image composition. More specifically, the position and orientation information correction unit 2310 corrects a past position and orientation acquired in time series to the position and orientation upon image composition. This process can employ a general prediction method. A method using a Kalman filter is well known. In this embodiment, correction is done on the basis of the image composition timing. Correction may be done on the basis of the composite image display timing. In that case, a real space image has a slight time lag from acquisition to display. However, a CG image can almost guarantee a real-time process unless actual data largely deviates from the prediction.

A real space image sensed by an image sensing unit 2303 is input to a position measuring unit 2305 and an image composition unit 2307. The position measuring unit 2305 obtains the position and orientation of the viewpoint by using the received real space image and auxiliary information obtained from a three-dimensional position and orientation sensor 2304. Even in this embodiment, the three-dimensional position and orientation sensor 2304 is not essential in the arrangement, as in the fourth embodiment. The obtained position and orientation are sent to the image processing apparatus 2302 via ah I/F 2306.

In the image processing apparatus 2302, a CG rendering unit 2312 generates, by using the position and orientation received via an I/F 2309, an image of a virtual space seen from the viewpoint with the position and orientation. The process of generating the virtual space image is the same as in the above-described embodiments. The CG rendering unit 2312 sends the generated virtual space image to the image sensing apparatus 2301 via the I/F 2309 as a CG image.

In the image sensing apparatus 2301, upon receiving the CG image from the image processing apparatus 2302 via the I/F 2306, the image composition unit 2307 generates a composite image by compositing the CG image with the real space image input from the image sensing unit 2303.

To generate the composite image by a chroma key process, the image processing apparatus 2302 sends, as information, a specific color that is not used for CG rendering but will be used for chroma key composition. To composite the image by using an α-channel, the image processing apparatus 2302 transmits an α-channel as two-dimensional data by the α value (mat value) of each pixel together with the CG image. Both image composition processes are the same as described in the fourth embodiment.

The image composition unit 2307 sends the generated composite image to a display unit 2308. The display unit 2308 displays the composite image on its display screen.

The latest real space image is used for composition. Hence, as a characteristic feature, the image sensing apparatus 2301 needs to have no frame buffer to absorb the generation timings of the real space image and CG image. This makes the circuit arrangement small.

In this embodiment, calculation for the prediction process by the position and orientation information correction unit 2310 is done on the basis of the time from real space image sensing to composition. Since the single apparatus includes the image sensing unit 2303 and image the composition unit 2307, the delay time after image sensing to display after image composition can easily be grasped by an internal timer. The grasped delay time is transmitted to the image processing apparatus 2302 via the I/F 2306.

The above-described arrangement and process enable to obviate sensed image transmission for MR image display and maintain the same display quality.

Figure 24:
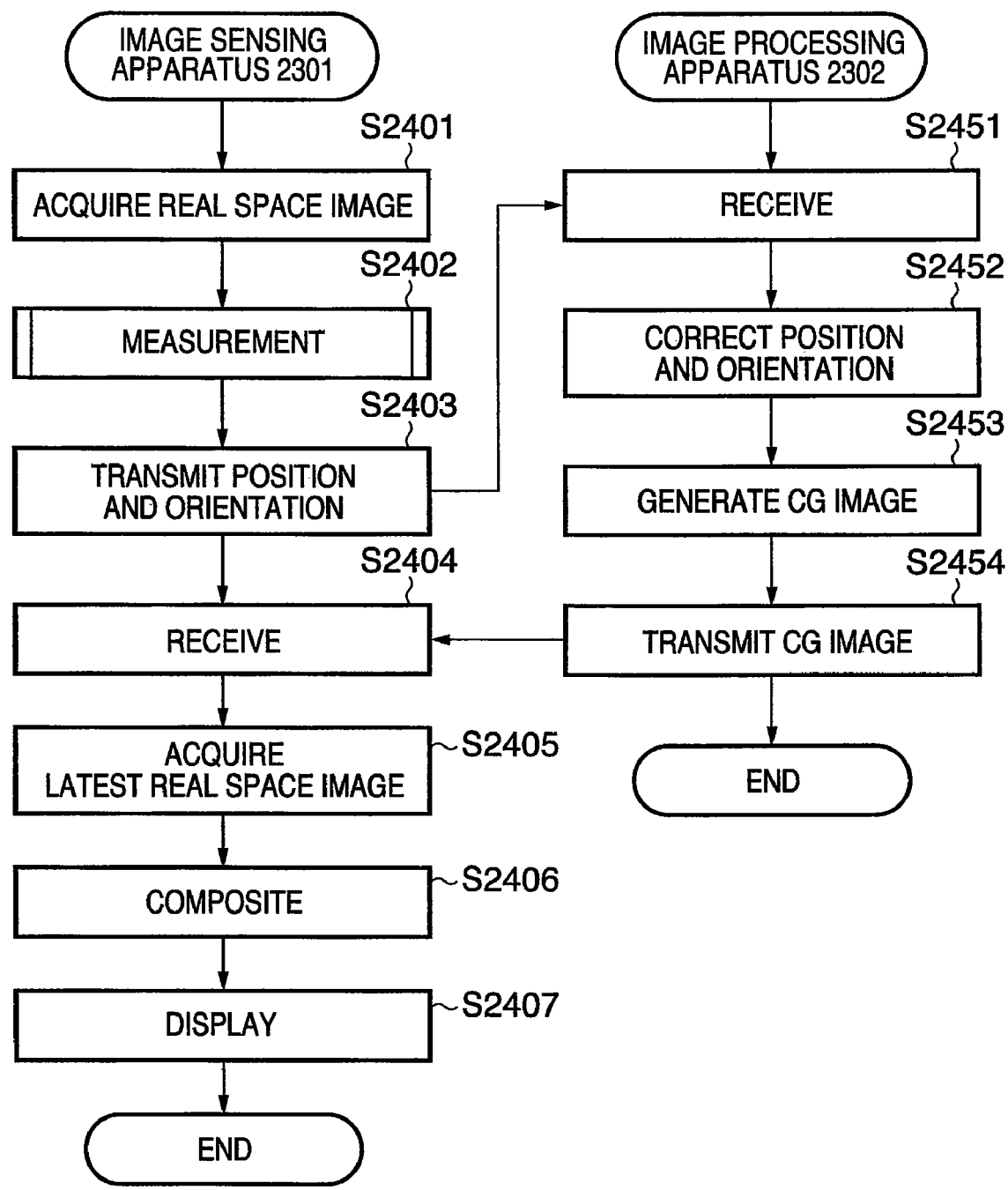
FIG. 24 is a flowchart showing processes executed by an image sensing apparatus 2301 and an image processing apparatus 2302 to display, on a display unit 2308 of the image sensing apparatus 2301, a composite image obtained by compositing a real space image sensed by the image sensing apparatus 2301 with a CG image generated by the image processing apparatus 2302.

FIG. 24 is a flowchart showing processes executed by the image sensing apparatus 2301 and the image processing apparatus 2302 to display, on the display unit 2308 of the image sensing apparatus 2301, a composite image obtained by compositing a real space image sensed by the image sensing apparatus 2301 with a CG image generated by the image processing apparatus 2302.

The process in steps S2401 to S2407 of the flowchart in FIG. 24 is executed by the image sensing apparatus 2301. A ROM 3204 stores the program and data to make a CPU 3205 of the image sensing apparatus 2301 execute the process in steps S2401 to S2407. The image sensing apparatus 2301 therefore executes the process in steps S2401 to S2407 by causing the CPU 3205 to execute the process by using the program and data.

The process in steps S2451 to S2454 of the flowchart in FIG. 24 is executed by the image processing apparatus 2302. An external storage device 3106 stores the program and data to make a CPU 3101 of the image processing apparatus 2302 execute the process in steps S2451 to S2454. The image processing apparatus 2302 therefore executes the process in steps S2451 to S2454 by causing the CPU 3101 to load the program and data to a RAM 3102 and execute the process by using them.

In step S2401, an image sensing unit 3201 (2303) senses the real space image under the control of the CPU 3205. The real space image is stored in a RAM 3203.

In step S2402, the position and orientation of the viewpoint are obtained by using the real space image and the three-dimensional position and orientation sensor 2304. The three-dimensional position and orientation sensor 2304 is not indispensable and is used as needed.

In step S2403, the obtained position and orientation are transmitted to the image processing apparatus 2302. In step S2451, the CPU 3101 of the image processing apparatus 2302 receives the data transmitted in step S2403 via an I/F 3107 and acquires it on the RAM 3102.

In step S2452, the position and orientation received in step S2451 are corrected in accordance with the timing of image composition (to be described later). The position and orientation information correction unit 2310 executes this correction process. In step S2453, data about each virtual object is read out from a content DB 2311 in the external storage device 3106. A virtual space is formed by laying out the virtual objects in it. An image, i.e., CG image of the formed virtual space seen from the viewpoint with the corrected position and orientation is generated.

In step S2454, the generated CG image is transmitted to the image sensing apparatus 2301. In step S2404, the image sensing apparatus 2301 receives the CG image transmitted in step S2454 from the image processing apparatus 2302 and acquires it on the RAM 3203.

In step S2405, the latest one of the real space images held in the RAM 3203 is acquired. In step S2406, a composite image is generated by compositing the acquired real space image with the CG image received in step S2404. In step S2407, the composite image is displayed on the display screen of the display unit 2308.

As described above, according to the fifth embodiment, the position and orientation information of the image sensing apparatus necessary for CG image generation is measured on the image sensing apparatus side and transmitted, instead of transmitting a real space image with a large quantity. Since the transmission band can be used almost exclusively for transmission of the CG image, a high-resolution MR image can be provided even with a narrow transmission band. Additionally, omission of the frame buffer as the difference from the fourth embodiment makes the arrangement on the image sensing apparatus side small. When the position and orientation of the CG image are corrected in accordance with the timing of image composition or composite image display, the time lag from the real space image can be solved.

In this embodiment, the image sensing apparatus has the position measurement function and the image composition function. Even an arrangement that separately comprises an apparatus having the position measurement function and the image composition function and an HMD including an image sensing unit and a display unit can implement the same function as described above.

[Sixth Embodiment]

In the sixth embodiment assumes that an image processing apparatus executes an image composition process, the data transmission amount is reduced, and an MR image by a high-resolution real space image is provided by decreasing the transmission amount of the real space image to be transferred to an image sensing apparatus while holding the precise real space image on the image sensing apparatus side. This embodiment also reproduces a semitransparent image without sending an α-channel necessary for semitransparent image generation.

Figure 25:
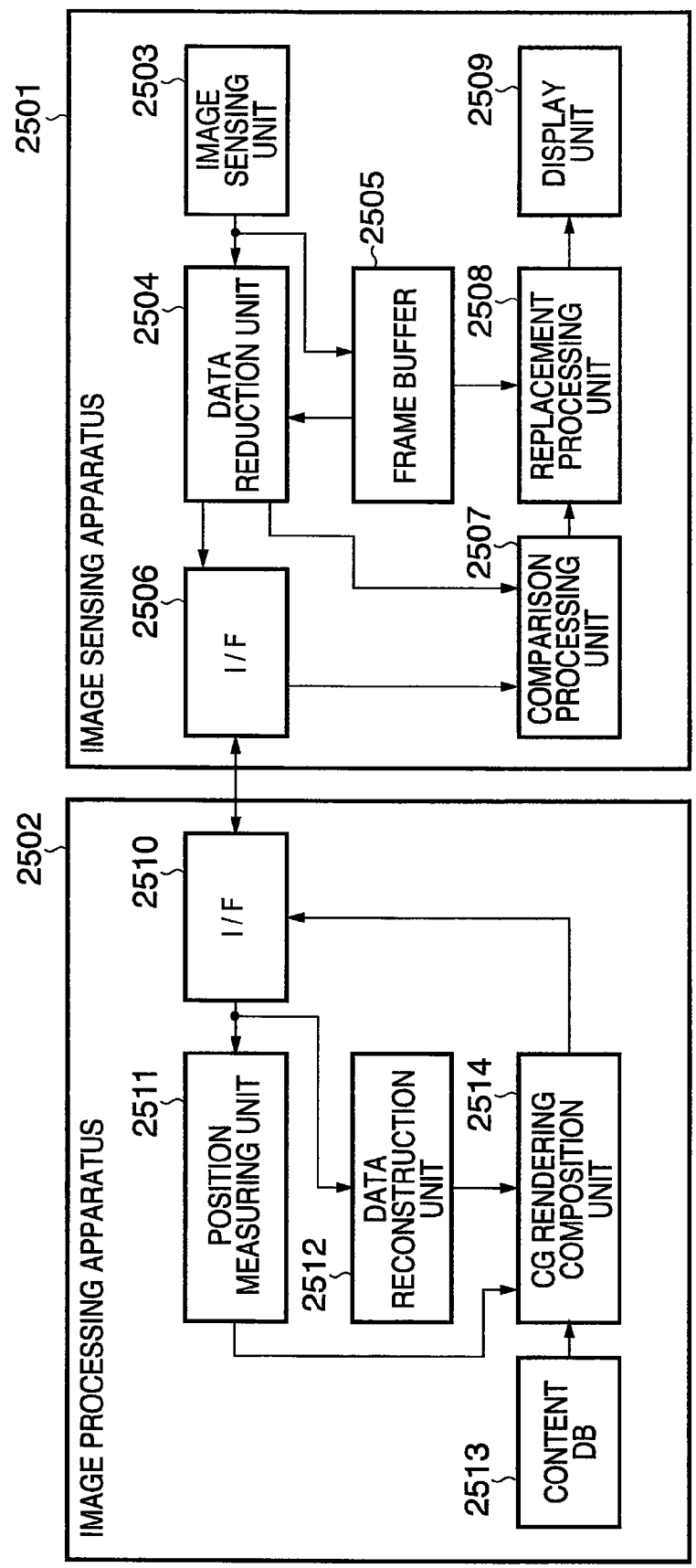
FIG. 25 is a block diagram showing the functional arrangement of a system according to the sixth embodiment of the present invention.

FIG. 25 is a block diagram showing the functional arrangement of a system according to this embodiment. As shown in FIG. 25, the system of this embodiment includes an image processing apparatus 2502 and an image sensing apparatus 2501.

The image sensing apparatus 2501 will be described. In this embodiment, the image sensing apparatus 2501 is a video see-through HMD.

An image sensing unit 2503 is the same as the image sensing unit 103 shown in FIG. 1. Each sensed frame image (real space image) is transferred to a frame buffer 2505 and a data reduction unit 2504. The frame buffer 2505 is the same as the frame buffer 105 shown in FIG. 1, though its use method is slightly different.

The data reduction unit 2504 reduces the data amount by generating a reduced image of the real space image received from the image sensing unit 2503. As described in the above embodiment, instead of generating a reduced image, a compressed image of the real space image may be generated, or an image may be generated by color representation conversion or tone count conversion of the real space image as far as the same object as described above is achieved.

An I/F 2506 is the same as the I/F 109 shown in FIG. 1. A comparison processing unit 2507 compares a real space image with a low resolution with a composite image generated by compositing the real space image having the low resolution with a CG image having a high resolution in each specific area.

If it is determined as the result of comparison by the comparison processing unit 2507 that the specific area includes the real space image with the low resolution, a replacement processing unit 2508 replaces the specific area with a part corresponding to the specific area in the original real space image stored in the frame buffer 2505. If it is determined that the specific area does not include the real space image with the low resolution, i.e., the area is an area including the CG image or an area obtained by a transparent process of the CG image and the real space image with the low resolution, the replacement process is not executed.

A display unit 2509 is the same as the display unit 112 shown in FIG. 1.

The image processing apparatus 2502 will be described.

An I/F 2510 is the same as the I/F 113 shown in FIG. 1.

A position measuring unit 2511 is the same as the position measuring unit 116 shown in FIG. 1. Even in this embodiment, the measurement accuracy may be increased by using auxiliary information, as in the above-described embodiments.

A data reconstruction unit 2512 executes an enlargement process by resolution conversion. More specifically, the data reconstruction unit 2512 enlarges the real space image, which is converted into the image size of a low resolution by the data reduction unit 2504, to the size of the CG image. The order of resolution conversion for enlargement is not particularly limited. It is necessary to use an algorithm corresponding to resolution conversion executed by the data reduction unit 2504.

When the image sensing apparatus includes a data reduction unit for executing a process except the reduction process by resolution conversion, i.e., when a compressed image is generated on the image sensing apparatus side, a decompression process is applied to reconstruct the image. When an image is generated by color representation conversion or tone count conversion, inverse conversion is applied to reconstruct the image.

A content DB 2513 is the same as the content DB 117 shown in FIG. 1. A CG rendering composition unit 2514 executes the CG image generation process of the CG rendering unit 118 shown in FIG. 1 and generates a composite image by compositing the CG image with the enlarged image of the real space image with the low resolution. The composite image is sent to the image sensing apparatus 2501 via the I/F 2510, undergoes the comparison process and the replacement process, and is displayed on the display screen of the display unit 2509.

A real space image sensed by the image sensing unit 2503 is stored in the frame buffer 2505 and also input to the data reduction unit 2504. The data reduction unit 2504 generates a reduced image of the real space image by executing resolution conversion of the received real space image. The generated reduced image is sent to the image processing apparatus 2502 via the I/F 2506.

In the image processing apparatus 2502, the position measuring unit 2511 obtains the position and orientation of the viewpoint by using markers or natural features in the reduced image received via the I/F 2510, as in the above-described embodiments. The reduced image is also input to the data reconstruction unit 2512. The data reconstruction unit 2512 enlarges the reduced image to the same size as the CG image to be generated by the subsequent process.

The CG rendering composition unit 2514 generates, by using the position and orientation obtained by the position measuring unit 2511, an image of a virtual space seen from the viewpoint with the position and orientation. The process of generating the virtual space image is the same as in the above-described embodiments. The CG rendering composition unit 2514 generates a composite image by compositing the generated virtual space image with the enlarged image obtained by the data reconstruction unit 2512. The generated composite image is sent to the image sensing apparatus 2501 via the I/F 2510.

In the image sensing apparatus 2501, the comparison processing unit 2507 generates a second enlarged image by enlarging the reduced image generated by the data reduction unit 2504. Upon receiving the composite image from the image processing apparatus 2502 via the I/F 2506, the comparison processing unit 2507 compares a specific area on the composite image with a corresponding area on the second enlarged image. If the comparison result indicates matching, i.e., if the specific area on the composite image is the area on the second enlarged image, the replacement processing unit 2508 replaces the specific area on the composite image with a corresponding area on the real space image that is used by the data reduction unit 2504 to generate the second enlarged image. In the processed composite image, only the part corresponding to the background (real space image) is converted into the real space image with the initial high resolution.

The composite image generated by the replacement processing unit 2508 or the composite image received from the image processing apparatus 2502 is sent to the display unit 2509. The display unit 2509 displays the composite image on its display screen.

With the above-described arrangement and process, the transmission amount of the sensed image with a large quantity can be reduced, and the resolution of the real space image in the composite image containing an opaque image can be increased easily and simply as compared to chroma key composition.

Figure 26:
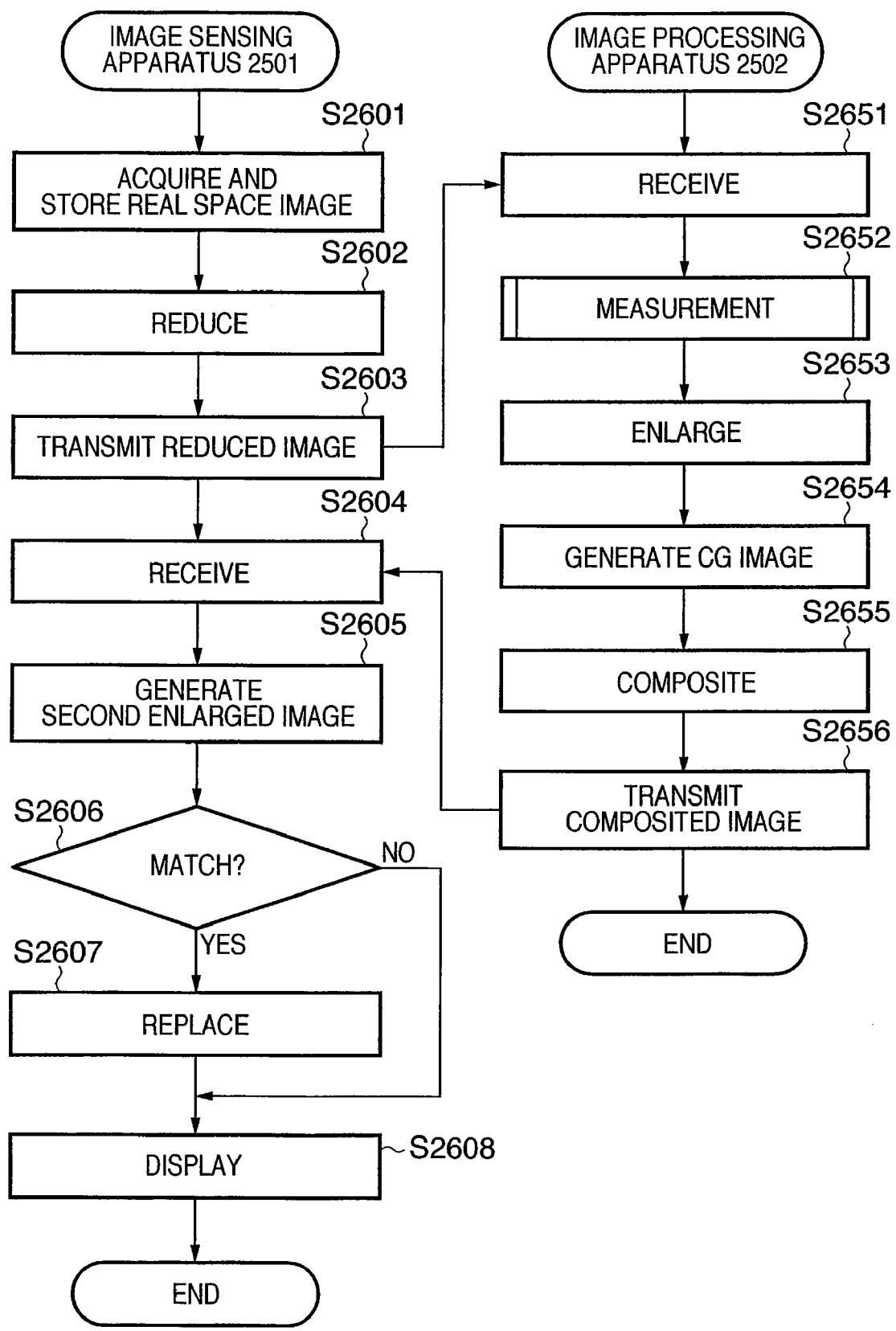
FIG. 26 is a flowchart showing processes executed by an image sensing apparatus 2501 and an image processing apparatus 2502 to display, on a display unit 2509 of the image sensing apparatus 2501, a composite image obtained by compositing a real space image sensed by the image sensing apparatus 2501 with a CG image generated by the image processing apparatus 2502.

FIG. 26 is a flowchart showing processes executed by the image sensing apparatus 2501 and the image processing apparatus 2502 to display, on the display unit 2509 of the image sensing apparatus 2501, a composite image obtained by compositing a real space image sensed by the image sensing apparatus 2501 with a CG image generated by the image processing apparatus 2502.

The process in steps S2601 to S2608 of the flowchart in FIG. 26 is executed by the image sensing apparatus 2501. A ROM 3204 stores the program and data to make a CPU 3205 of the image sensing apparatus 2501 execute the process in steps S2601 to S2608. The image sensing apparatus 2501 therefore executes the process in steps S2601 to S2608 by causing the CPU 3205 to execute the process by using the program and data.

The process in steps S2651 to S2656 of the flowchart in FIG. 26 is executed by the image processing apparatus 2502. An external storage device 3106 stores the program and data to make a CPU 3101 of the image processing apparatus 2502 execute the process in steps S2651 to S2656. The image processing apparatus 2502 therefore executes the process in steps S2651 to S2656 by causing the CPU 3101 to load the program and data to a RAM 3102 and execute the process by using them.

In step S2601, an image sensing unit 3201 (2503) senses the real space image under the control of the CPU 3205. The real space image is stored in the frame buffer 2505 provided on a RAM 3203.

In step S2602, a resolution conversion process is executed for the real space image to generate a reduced image. In step S2603, the generated reduced image is transmitted to the image processing apparatus 2502.

In step S2651, the CPU 3101 of the image processing apparatus 2502 receives the data transmitted in step S2603 via an I/F 3107 and acquires it on the RAM 3102.

In step S2652, the position and orientation of the viewpoint are obtained by using the reduced image. This process is the same as in the above-described embodiments.

In step S2653, the received reduced image is enlarged to the same size as a virtual space image to be obtained by the process of the succeeding stage, thereby generating an enlarged image.

In step S2654, first, data about each virtual object is read out from a content DB 2311 in the external storage device 3106. A virtual space is formed by laying out the virtual objects in it. An image, i.e., a CG image of the formed virtual space seen from the viewpoint with the determined position and orientation obtained in step S2652 is generated.

In step S2655, a composite image is generated by compositing the enlarged image generated in step S2653 with the CG image generated in step S2654.

In step S2656, the generated composite image is transmitted to the image sensing apparatus 2501. In step S2604, the image sensing apparatus 2501 receives the composite image transmitted from the image processing apparatus 2502 in step S2656 and acquires it on the RAM 3203.

In step S2605, the real space image used to generate the reduced image in step S2602 is temporarily reduced. An image (second enlarged image) is generated by enlarging the reduced image.

In step S2406, a specific area on the composite image received in step S2604 is compared with a corresponding area on the second enlarged image. If the comparison result indicates mismatching, the process advances to step S2608 to display the composite image received in step S2604 on the display screen of a display unit 2308.

If the comparison result indicates matching, i.e., if the specific area on the composite image equals the area on the second enlarged image, the process advances to step S2607 to replace the specific area on the composite image with a corresponding area on the real space image that is used to generate the reduced image in step S2602.

In step S2608, the composite image obtained by the process in step S2607 is displayed on the display screen of the display unit 2308.

Figure 27:
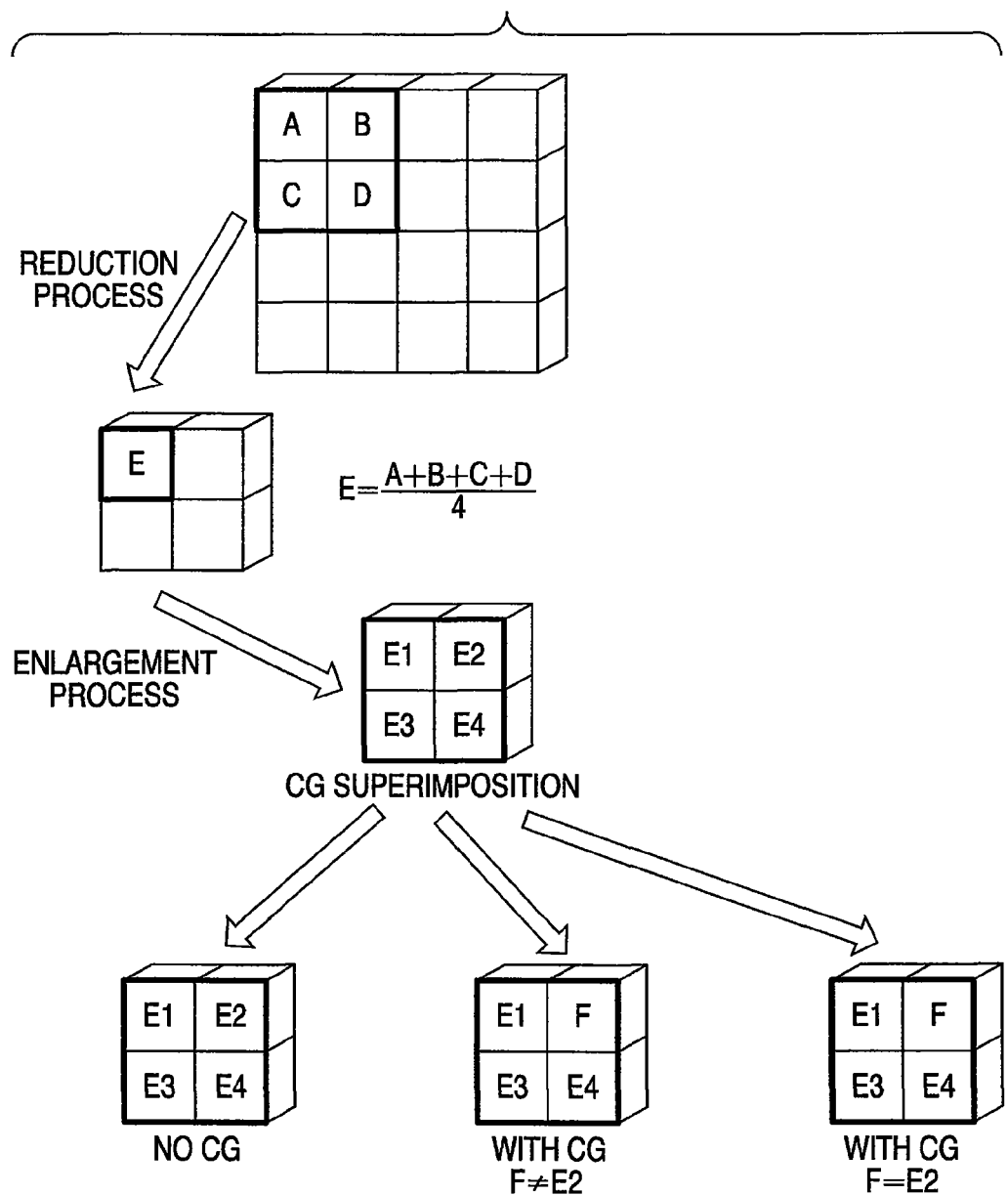
FIG. 27 is a conceptual view for explaining composite image generation.

FIG. 27 is a conceptual view for explaining composite image generation.

A cutout part of a real space image held in the frame buffer 2505 is shown at the upper part of FIG. 27. An explanation will be done taking notice of four pixels A, B, C, and D. For the sake of simplicity, a reduction process of reducing the vertical and horizontal sizes to ½, i.e., reducing the area to ¼ will be examined.

The four pixels A, B, C, and D are converted into one pixel by reduction using resolution conversion. As the conversion method, a one-dimensional linear process of replacing the pixels with an arithmetic mean of them is assumed here. A pixel E that is given the mean value of the four pixels after reduction is converted into four pixels again by the enlargement process later. The value indicates the color information of a pixel. The following description will be made assuming that each of R, G, and B colors has 8-bit information.

The enlargement process is done by linear interpolation. The pixel values are defined as E1, E2, E3, and E4. When a CG image is superimposed on a real space image serving as a background image, the following three patterns are available.

In the first pattern, no CG image is superimposed on the background image. In the second pattern, a CG image is superimposed on the background image, and the values of the superimposed pixels change. In this example, a CG image is superimposed on the pixel E2, and the pixel E2 changes to a pixel F having another value. In the third pattern, a CG image is superimposed on the background image, though it happens that the value of the pixel F of the superimposed CG image matches the value of the original pixel E2. Both the reduction process and the enlargement process use a linear process. However, the order of resolution conversion is not particularly limited.

Figure 28:
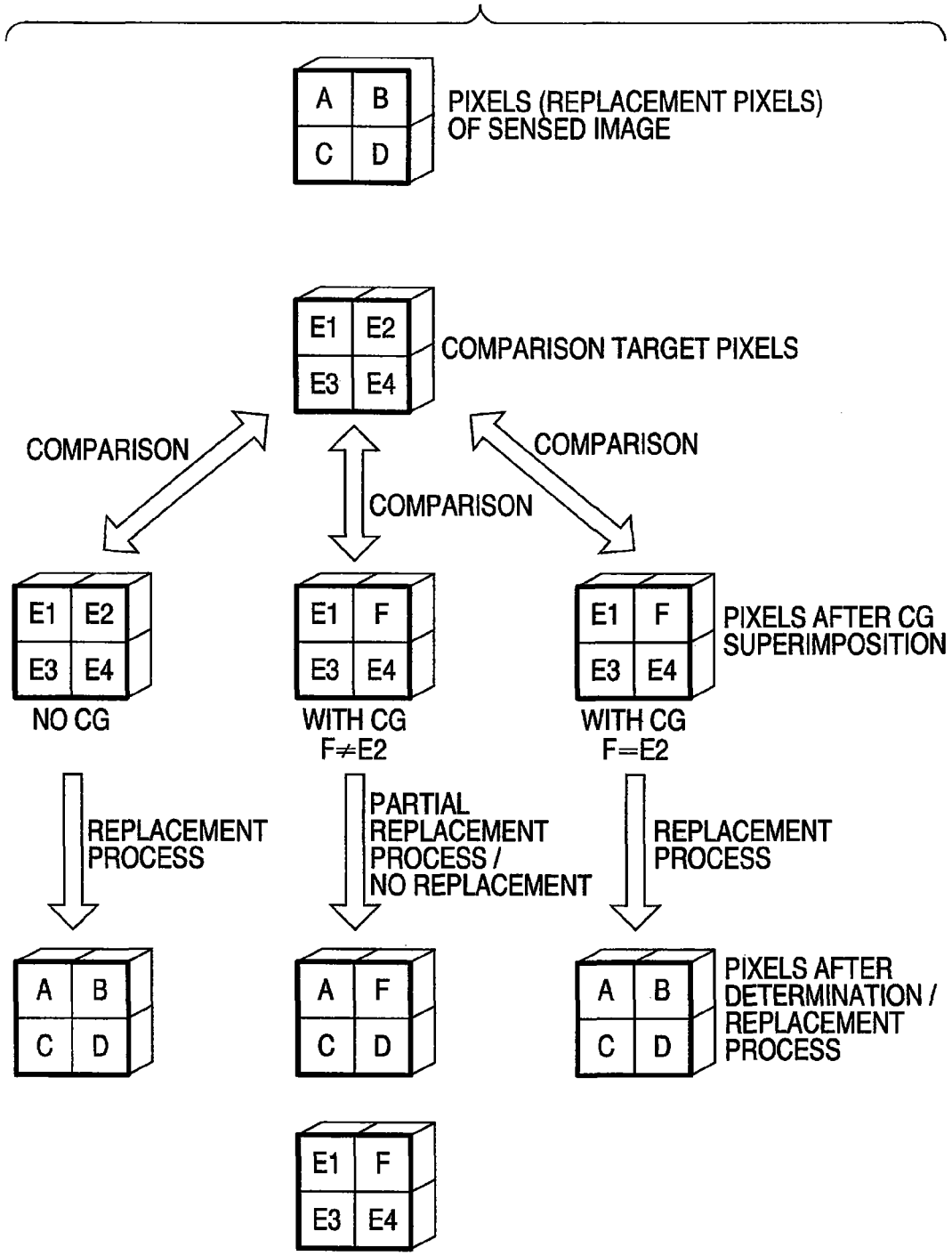
FIG. 28 is an explanatory view of a comparison process in step S2606 and a replacement process in step S2607.
Figure 29:
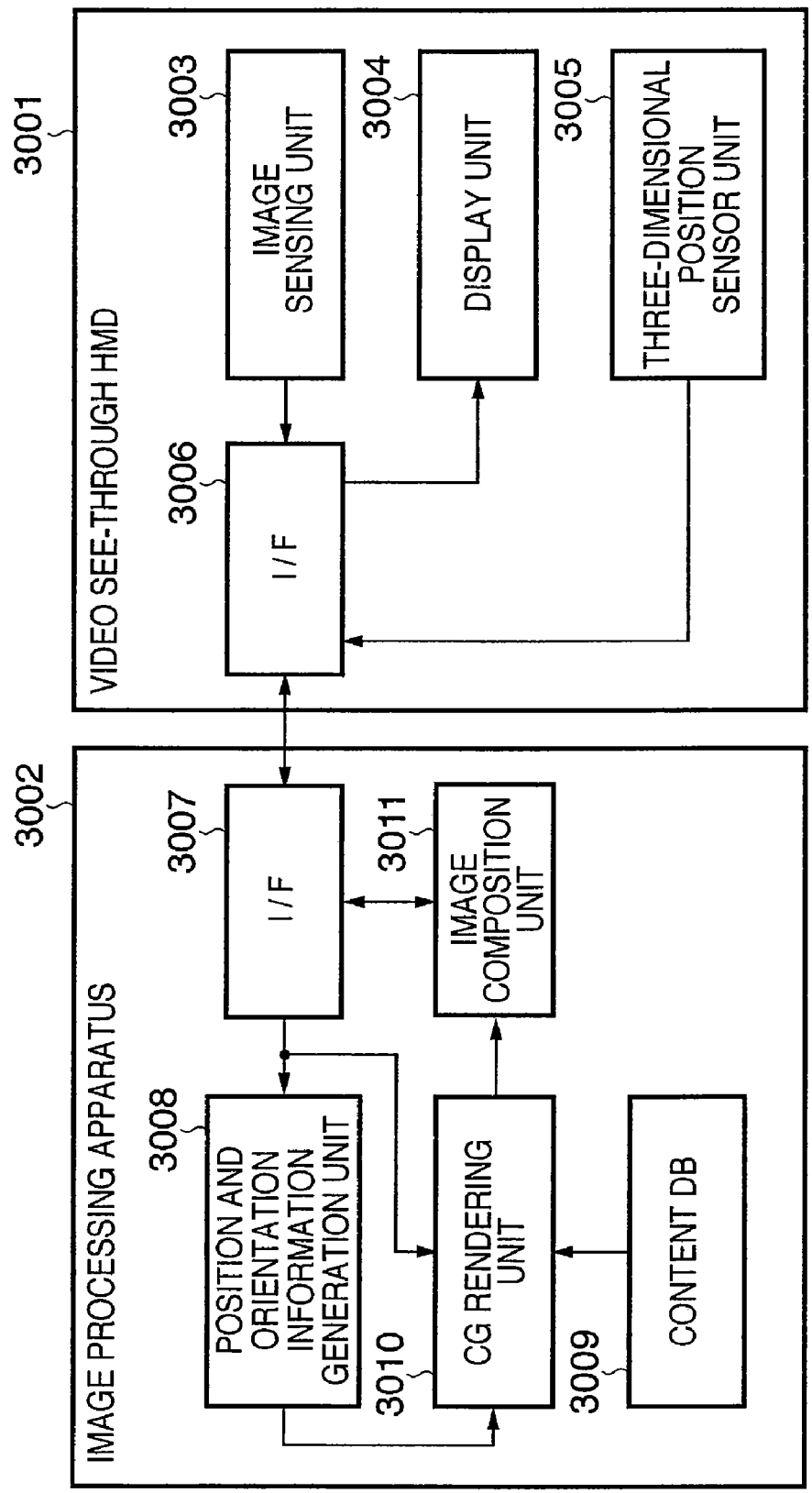
FIG. 29 is a block diagram showing the functional arrangement of a general mixed reality system using a video see-through HMD.

FIG. 28 is an explanatory view of the comparison process in step S2606 and the replacement process in step S2607.

A set of pixels of a real space image (sensed image) is shown in the uppermost column of FIG. 28. They are the replacement source of the replacement process. A set of pixels to be compared is shown in the second column. They form a second enlarged image. The set of pixels included in the second enlarged image is the same as the set of pixels generated as the background image. A set of pixels with a CG image superimposed is shown in the third column. The pixel set has the three patterns described with reference to FIG. 27.

Comparison between each pixel set after CG image superimposition and the pixel set of the second enlarged image will be described. When no CG image is superimposed, the pixels included in the composite image match those included in the second enlarged image. Hence, the composite image is regarded as the background image. The pixel values can be replaced with the values of pixels of the real space image held in the frame buffer 2505 by the replacement process (E1→A, E2→B, E3→C, and E4→D).

If a CG image is superimposed, and the value of the superimposed pixel is different from the value of the pixel of the background image, the process result changes depending on the area of the comparison and replacement target. If comparison and replacement should be done for each pixel, only the pixel E2 is regarded as a CG pixel, and the remaining pixels are replaced (E1→A, F→F, E3→C, and E4→D). If comparison and replacement should be done for each area including four pixels, the CG image is regarded as superimposed on part of the area, and the replacement process is not executed.

If a CG image is superimposed, the value of the superimposed pixel equals the value of the pixel of the background image, the state is the same as that without CG image superimposition. Hence, the replacement process is executed (E1→A, E2→B, E3→C, and E4→D).

The effects and problems of the replacement process will be described. If a CG image is superimposed even partially, and the pixel values change, it is possible to reliably determine whether an area is a CG area or a background image area. Hence, the background image can be reconstructed. If comparison and replacement are done for each pixel, more background image areas can be reconstructed, though the number of times of replacement increases. If comparison and replacement are done for a set of a plurality of pixels, the number of unreconstructable pixels increases while the number of times of replacement decreases.

When a predetermined process time is required for comparison and replacement independently of the area size, increase in the number of times of process indicates an increase in the process time, although this may change depending on how to implement the comparison and replacement processes. If a delay caused by, e.g., a pipeline process by hardware poses no problem, the size of the target area can be determined on the basis of the circuit scale and the quality of the reconstructed image. To generate a semitransparent image that requires a mat value for chroma key composition, a background image with a low resolution and a CG image with a high resolution are composite at a predetermined ratio. The background image has a resolution and tonality lower than the sensed image. However, since it exists as the background of the semitransparent CG image, the reality is hardly poorer than that of a simple background image.

A case wherein the result of the comparison process indicates coincidence will be described finally. When no CG image is included, the image can be reconstructed by the replacement process without any problem. A problem is posed when a CG image is superimposed, and nevertheless, the values of pixels of the superimposed CG image match the values of pixels of the background image that has undergone resolution conversion twice. This case will be examined from two viewpoints.

First, the probability that the value (i.e., color) of a pixel of the CG image matches that of a corresponding pixel of the background image will be described. Generally, an image output to the display panel of, e.g., a display is represented by R, G, and B colors each containing 8 bits, i.e., colors of a total of 24 bits. The appearance probability of each color changes depending on the type of the sensed outside world image, the type of the light source, and the generated CG. In this example, assume that all colors have the same appearance probability. The number of colors that can be represented by 24 bits is about 16,770,000. A display with an SXGA resolution has about 1,310,000 pixels. That is, the background image happens to match the CG image in one of 13 frames of a moving image and in only one pixel of one frame image. No one can deny that the probability increases to several to several ten times depending on the conditions, as a matter of course. However, this phenomenon is apparently unnoticeable in another viewpoint, as will be described below.

Second, the difference between the background image obtained by executing resolution conversion twice and the initial high-resolution real space image will be described. A problem posed by replacement is that the brightness and tint of a replaced pixel or area largely change from those of the pixel or area before replacement. The human eye is sensitive to brightness information (luminance) but not so sensitive to the color difference (chromaticity). A method of reducing image data by using this fact is color representation conversion. Even when RGB information containing 24 bits is reduced to ½, i.e., YUV411 (the color difference information is compressed to ¼ while maintaining the luminance information), the human eye can hardly recognize it, as is known.

The background image after resolution conversion and the high-resolution real space image have different resolutions but almost the same brightness and tint. Even when a CG area is determined as the background area, and the replacement process is executed, not so large difference is recognized in the appearance. Additionally, since a sensed natural image generally has a smooth tone, its brightness and tint do not abruptly change due to the neighboring pixels.

These facts are taken into consideration. Even when a CG area is determined as the background area, it is expected to be unnoticeable to the human eye. Furthermore, conversion errors may be reduced in total by making the above-described comparison and replacement area larger than a pixel to decrease the total number of replaced pixels.

As described above, according to the sixth embodiment, the transmission amount of a real space image with a large quantity can be reduced, and a high-resolution real space image area in an MR composite image containing an opaque image can be reconstructed easily and simply as compared to chroma key composition. In this embodiment, the image sensing apparatus has the position measurement function and image composition function. Even an arrangement that separately comprises an apparatus having the position measurement function and the image composition function and an HMD including an image sensing unit and a display unit can implement the same function as described above.

[Seventh Embodiment]

FIG. 32 is a block diagram showing the configuration of a system according to the seventh embodiment. The system according to this embodiment comprises image sensing apparatuses 3301 (image sensing apparatuses 3301a and 3301b which will sometimes be referred to as the image sensing apparatus 3301 in a common description), wireless access point 3302, and image processing apparatus 3303.

The image sensing apparatus 3301 will be described first. In this embodiment, the image sensing apparatus 3301 is a video see-through HMD. The image sensing apparatus 3301 has the same functions as the image sensing apparatus 101 shown in FIG. 1 except the I/F that is limited to wireless communication. As shown in FIG. 32, the plurality of image sensing apparatuses 3301 connect to one wireless AP (Access Point) 3302.

The wireless AP 3302 will be described next. The wireless AP 3302 wirelessly transmits/receives a sensed image, a virtual image, a composite image, and position and orientation information to/from the image sensing apparatus 3301. In this embodiment, the wireless AP 3302 is separated from the image processing apparatus 3303. However, the image processing apparatus 3303 may incorporate the wireless AP 3302.

The image processing apparatus 3303 will be described next. The image processing apparatus 3303 has the same functions as the image processing apparatus 102 shown in FIG. 1 except a set mode determination process by negotiation.

Figure 33B:
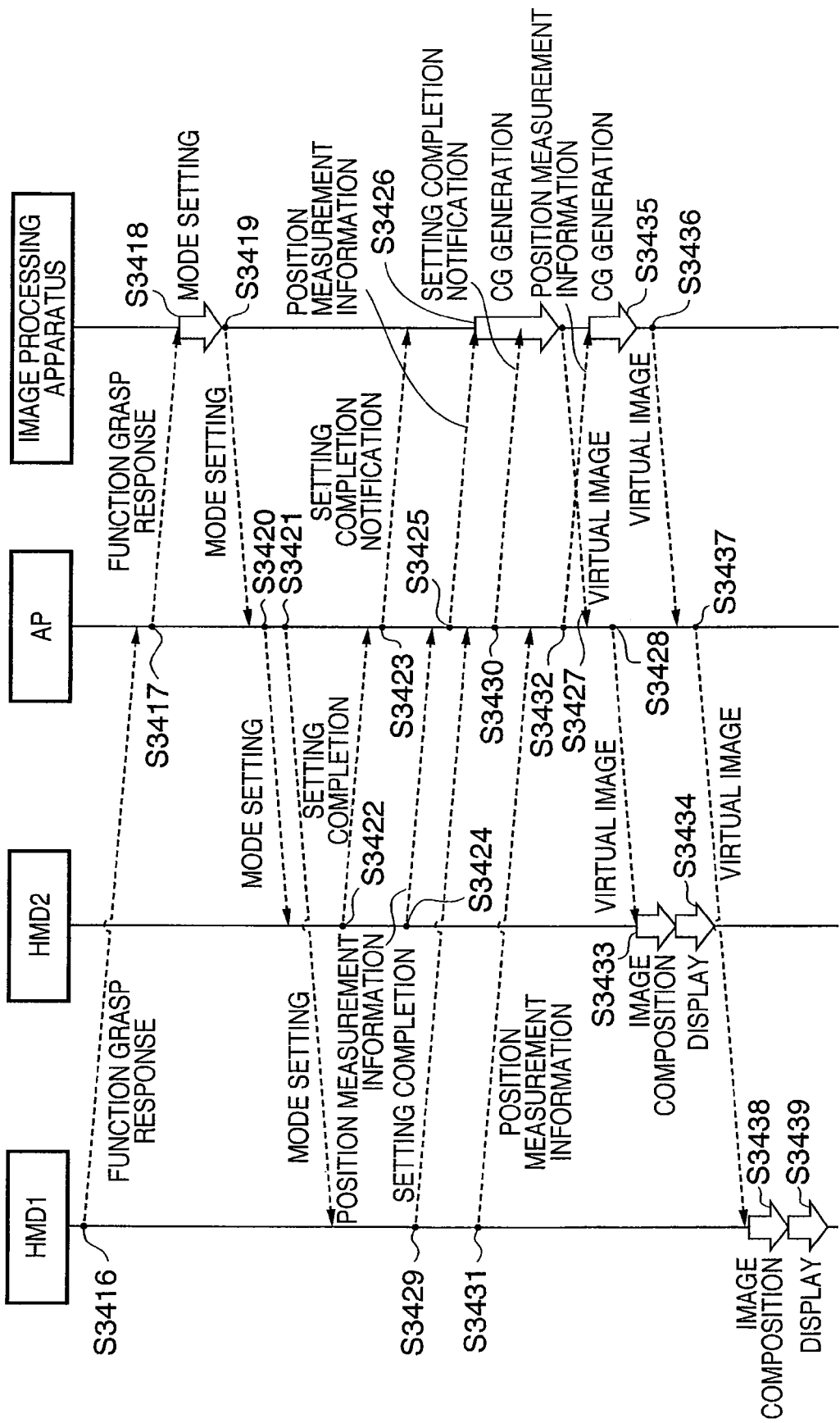

FIG. 33A and 33B are sequence charts showing the communication state between the image sensing apparatuses 3301, the wireless AP 3302, and the image processing apparatus 3303 in a negotiation process and a subsequent image process.

In the system including two image sensing apparatuses (HMDs), a wireless AP, and an image processing apparatus, an image sensing apparatus 1 (to be referred to as an HMD 1 hereinafter, which corresponds to the image sensing apparatus 3301a) is wirelessly communicating with the wireless access point. FIG. 33A and 33B show a rough process procedure until another image sensing apparatus 2 (to be referred to as an HMD 2 hereinafter, which corresponds to the image sensing apparatus 3301b) starts wireless communication with the same wireless access point.

In step S3401, the HMD 1 wirelessly transmits an acquired sensed image and output information from a three-dimensional position and orientation measuring sensor to the wireless AP 3302 in a linked state. The HMD periodically acquires a sensed image and sensor output information. Hence, these data are transmitted to the wireless AP 3302 asynchronously with the processes of the remaining apparatuses (corresponding to steps S3401a to S3401c).

In step S3402, the wireless AP 3302 transmits the received sensed image and sensor information to the image processing apparatus 3303.

In step S3403, position and orientation information is generated by extracting markers or feature points serving as markers in the sensed image. The arrangement can either calculate the position and orientation on the basis of the sensor information or use the sensor information as auxiliary information.

In step S3404, a CG image as a virtual image is generated by using the obtained position and orientation information.

In step S3405, a mixed reality image (MR image) as a composite image is generated by superimposing the CG image generated in step S3404 on the received sensed image.

In step S3406, the image processing apparatus 3303 transmits the obtained composite image to the wireless AP 3302.

In step S3407, the wireless AP 3302 wirelessly transmits the received composite image to the HMD 1. The HMD displays the obtained composite image. The process until this point has the same contents as the position and orientation measurement and image composition processes in the image processing apparatus which have been described at the last part of the description of FIG. 1. Since the image processing apparatus with a relatively high calculation process capability executes the process, a high-quality MR image can be displayed although a wide transmission band is used.

In step S3408, the HMD 2 that expects connection with the wireless AP 3302 transmits a new connection request.

In step S3409, the wireless AP 3302 receives the connection request from the HMD 2 and transmits it to the image processing apparatus 3303.

In step S3410, the wireless AP 3302 sends the ID of its own to the HMD 2 to establish a link. At this point of time, no image is transmitted although wireless communication is possible.

In step S3411, negotiation as a characteristic feature of this embodiment starts to grasp whether a change in image formation process contents by the HMD and image processing apparatus is necessary.

In step S3412, the image processing apparatus 3303 transmits a function grasp request to the wireless AP 3302 to grasp the presence/absence and contents of the position and orientation measurement function and the image composition function of the HMD 1 currently connected and the HMD 2 expected to connect newly.

In step S3413, the wireless AP 3302 transmits the function grasp request to the HMD 2.

In step S3414, the wireless AP 3302 transmits the function grasp request to the HMD 1.

In step S3415, the HMD 2 transmits the contents of the position and orientation measurement function and the image composition function of its own to the wireless AP 3302.

In step S3416, the HMD 1 transmits the contents of the position and orientation measurement function and the image composition function of its own to the wireless AP 3302.

In step S3417, the wireless AP 3302 transmits the functions of the two connected HMDs to the image processing apparatus 3303.

In step S3418, the image processing apparatus 3303 grasps the functions of the HMDs and determines on the basis of the transmission band and the number of connected HMDs whether position and orientation measurement and image composition need to be done on the HMD side to reduce the band. This process will be described later in detail with reference to a flowchart. The image processing apparatus 3303 sets a mode in accordance with the determination result. Settable modes will be described later by using a table. In this example, the image processing apparatus 3303 grasps that both the HMDs 1 and 2 have the position and orientation measurement function and the image composition function. Upon determining that no sufficient band can be ensured, the image processing apparatus 3303 executes negotiation to make both HMDs execute position and orientation measurement and image composition.

In step S3419, a request to set the mode determined by the image processing apparatus 3303 is transmitted to the wireless AP 3302.

In step S3420, the wireless AP 3302 receives the mode setting request and transmits it to the HMD 2.

In step S3421, the wireless AP 3302 transmits the mode setting request to the HMD 1.

In step S3422, the HMD 2 receives the mode setting request, selects the function in it, and transmits a setting completion notification.

In step S3423, the wireless AP 3302 notifies the image processing apparatus 3303 of the completion of mode setting in the HMD 2.

In step S3424, as the operation mode setting and negotiation are ended, image formation starts. More specifically, position and orientation information is generated in the HMD 2 and transmitted.

In step S3425, the wireless AP 3302 transmits the position and orientation information transmitted from the HMD 2 to the image processing apparatus 3303.

In step S3426, the image processing apparatus 3303 generates a CG image as a virtual image for the HMD 2 on the basis of the received position and orientation information.

In step S3427, the image processing apparatus 3303 transmits the generated virtual image to the wireless AP 3302.

In step S3428, the wireless AP 3302 wirelessly transmits the received virtual image to the HMD 2.

In step S3429, the HMD 1 receives the mode setting request, selects the function in it, and transmits a setting completion notification.

In step S3430, the wireless AP 3302 notifies the image processing apparatus 3303 of the completion of mode setting in the HMD 1.

In step S3431, as the operation mode setting and negotiation are ended, image formation starts. More specifically, position and orientation information is generated in the HMD 1 and transmitted.

In step S3432, the wireless AP 3302 transmits the position and orientation information transmitted from the HMD 1 to the image processing apparatus 3303.

In step S3433, the HMD 2 composites the received virtual image with the sensed image.

In step S3434, the HMD 2 displays the composite display image.

In step S3435, the image processing apparatus 3303 generates a CG image as a virtual image for the HMD 1 on the basis of the received position and orientation information.

In step S3436, the image processing apparatus 3303 transmits the generated virtual image to the wireless AP 3302.

In step S3437, the wireless AP 3302 wirelessly transmits the received virtual image to the HMD 1.

In step S3438, the HMD 1 composites the received virtual image with the sensed image.

In step S3439, the HMD 1 displays the composite display image.

FIG. 34 is a table showing the correspondence between the transmission contents of the apparatuses, the position and orientation measurement, and the image composition.

The modes are roughly classified into four categories depending on whether image composition should be done in the image processing apparatus or the image sensing apparatus and whether position and orientation measurement should be done in the image processing apparatus or the image sensing apparatus. FIG. 34 shows six modes. At least two modes, i.e., the first or second mode (the image processing apparatus wholly executes the position and orientation measurement process) and the fifth mode (the image sensing apparatus wholly executes the position and orientation measurement process) are selectable. The number of modes may be increased by sub-dividing the position and orientation measurement process.

In modes 1 and 2, the image processing apparatus executes image composition on the basis of a sensed image without resolution conversion. The difference between modes 1 and 2 is whether the image sensing apparatus transmits auxiliary data for position and orientation measurement.

Mode 3 has the same basic arrangement as modes 1 and 2 except that a data reduction process by a data reduction unit is executed before sensed image transmission. In this case, a reduction process by resolution conversion is assumed. The image quality is poorer than in modes 1 and 2 because an image is composite on the basis of the reduced image. On the other hand, an effect of reducing the process load on the image processing apparatus can be expected because the transmission data amount decreases, and the total data amount decreases.

As characteristic feature of mode 4, the image sensing apparatus executes image composition, and position and orientation information necessary for virtual image generation is calculated on the basis of a sensed image sent from the image sensing apparatus or a sensed image with a reduced data amount and an additional sensor output.

In modes 5 and 6, the image sensing apparatus executes position and orientation measurement and image composition. The difference between modes 5 and 6 is the contents of data received from the image processing apparatus for image composition. Since no sensed image is transmitted, the transmission amount is the smallest in the three categories.

As described above, the modes are roughly classified into four categories. A mode is selected by determining the process capability of each apparatus, the number of image sensing apparatuses connected to the wireless access point, and the transmission band. The mode selection process will be described below with reference to FIG. 35.

Figure 35:
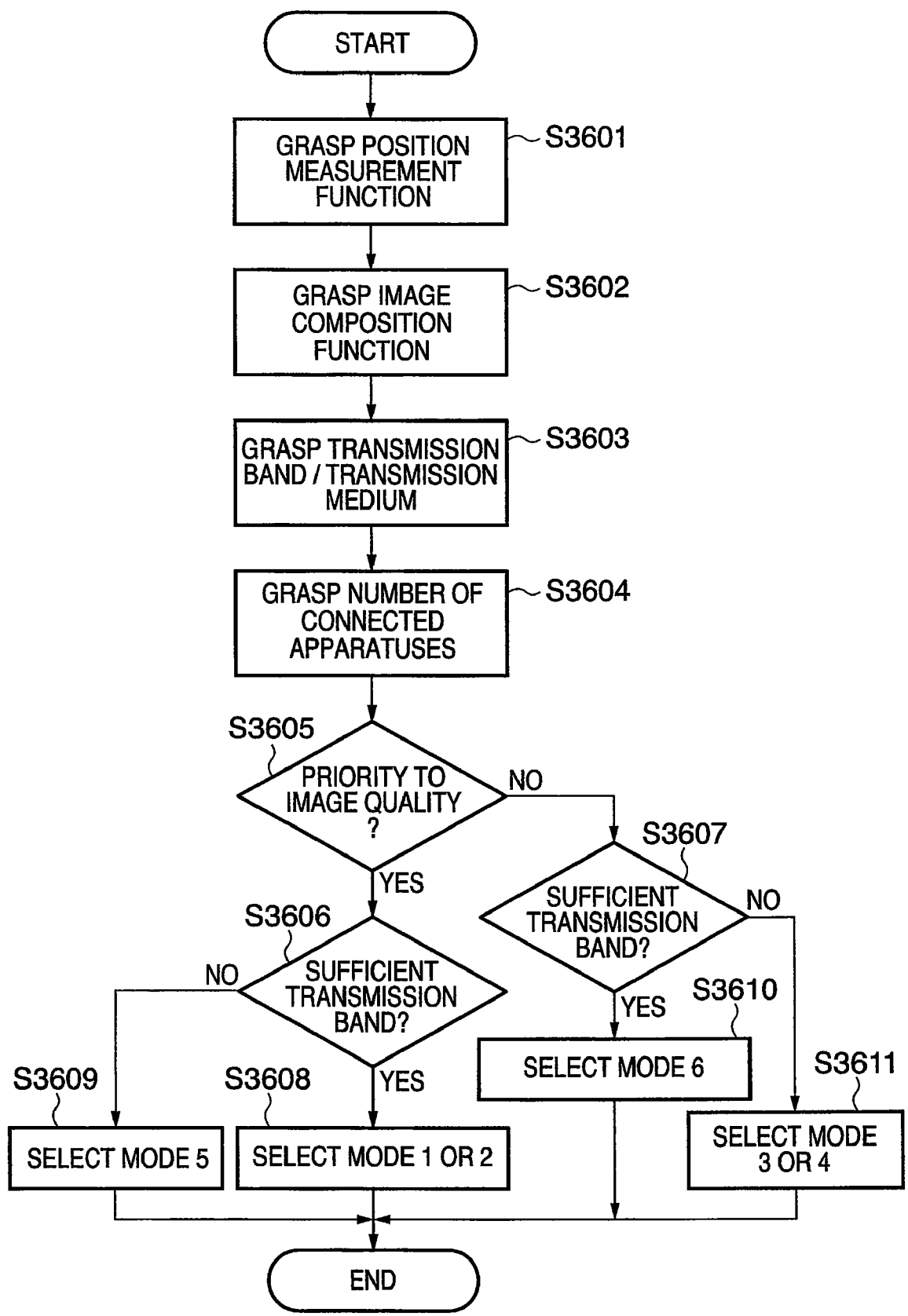
FIG. 35 is a flowchart showing a process of determining the set mode by negotiation.

FIG. 35 is a flowchart showing the process of determining the set mode by negotiation. The process subject is assumed to be on the image processing apparatus side. However, the image sensing apparatus may take the initiative. The following explanation will be done assuming that both the image sensing apparatus and the image processing apparatus have the position and orientation measurement function and the image composition function.

In step S3601, the position and orientation measurement function of each of the image sensing apparatus 3301 and the image processing apparatus 3303 is grasped.

In step S3602, the image composition function of each of the image sensing apparatus 3301 and the image processing apparatus 3303 is grasped.

In step S3603, communication conditions including the transmission band of the wireless communication I/F connecting the apparatuses and the type of transmission medium are grasped.

In step S3604, the number of image sensing apparatuses 3301 connected to the wireless access point 3302 is grasped.

In step S3605, it is determined whether to give priority to the image quality in the system operation. If YES in step S3605, the process advances to step S3606. If NO in step S3605, the process advances to step S3607.

In step S3606, it is determined whether the transmission band is sufficient relative to the number of connected image sensing apparatuses 3301. If YES in step S3606, the process advances to step S3608. If NO in step S3606, the process advances to step S3609. The order of the priority determination process in step S3605 and step S3606 may be reversed.

In step S3607, considering that no priority is given to the image quality, it is determined whether the transmission band is sufficient relative to the number of connected image sensing apparatuses 3301. If YES in step S3607, the process advances to step S3610. If NO in step S3607, the process advances to step S3611.

In step S3608, considering that the transmission band is sufficient, the image processing apparatus 3303 receives a sensed image with a large quantity and selects mode 1 or 2. In mode 1, only the sensed image is transmitted. In mode 2, the image sensing apparatus 3301 prepares position and orientation information or auxiliary data for calculation in addition to the sensed image. The mode to be selected from modes 1 and 2 may be set in advance, or the way to select the mode is not particularly limited.

In step S3609, considering that the transmission band is insufficient, it is determined to cause the image sensing apparatus 3301 to execute position and orientation measurement and image composition. Since sensed image transmission is unnecessary, the band can effectively be used. Hence, mode 5 is selected.

In step S3610, considering that the transmission band is sufficient, it is determined to cause the image sensing apparatus 3301 to execute position and orientation measurement and image composition, and mode 6 is selected. Mode 6 uses a wider band than mode 6 because an α-channel is also transmitted to composite a semitransparent image.

In step S3611, considering that no priority is given to the image quality, and the transmission band is insufficient, mode 3 or 4 is selected. The mode to be selected from modes 3 and 4 may be set in advance, or the way to select the mode is not particularly limited.

In this embodiment, mode selection is done setting importance on the transmission band. However, the mode may be selected on the basis of the contents and purpose of the application, including the position and orientation measurement accuracy and the required minimum delay time. The embodiment assumes that each image sensing apparatus 3301 has the position and orientation measurement function and the image composition function. The determination process becomes complex when each image sensing apparatus has only one of the functions, or only some of the plurality of image sensing apparatuses 3301 connected to the wireless access point 3302 have the functions. In that case, priority is given to an apparatus with a small number of selectable modes. Alternatively, the image sensing apparatus 3301 with priority on image formation is explicitly defined.

Figure 36:
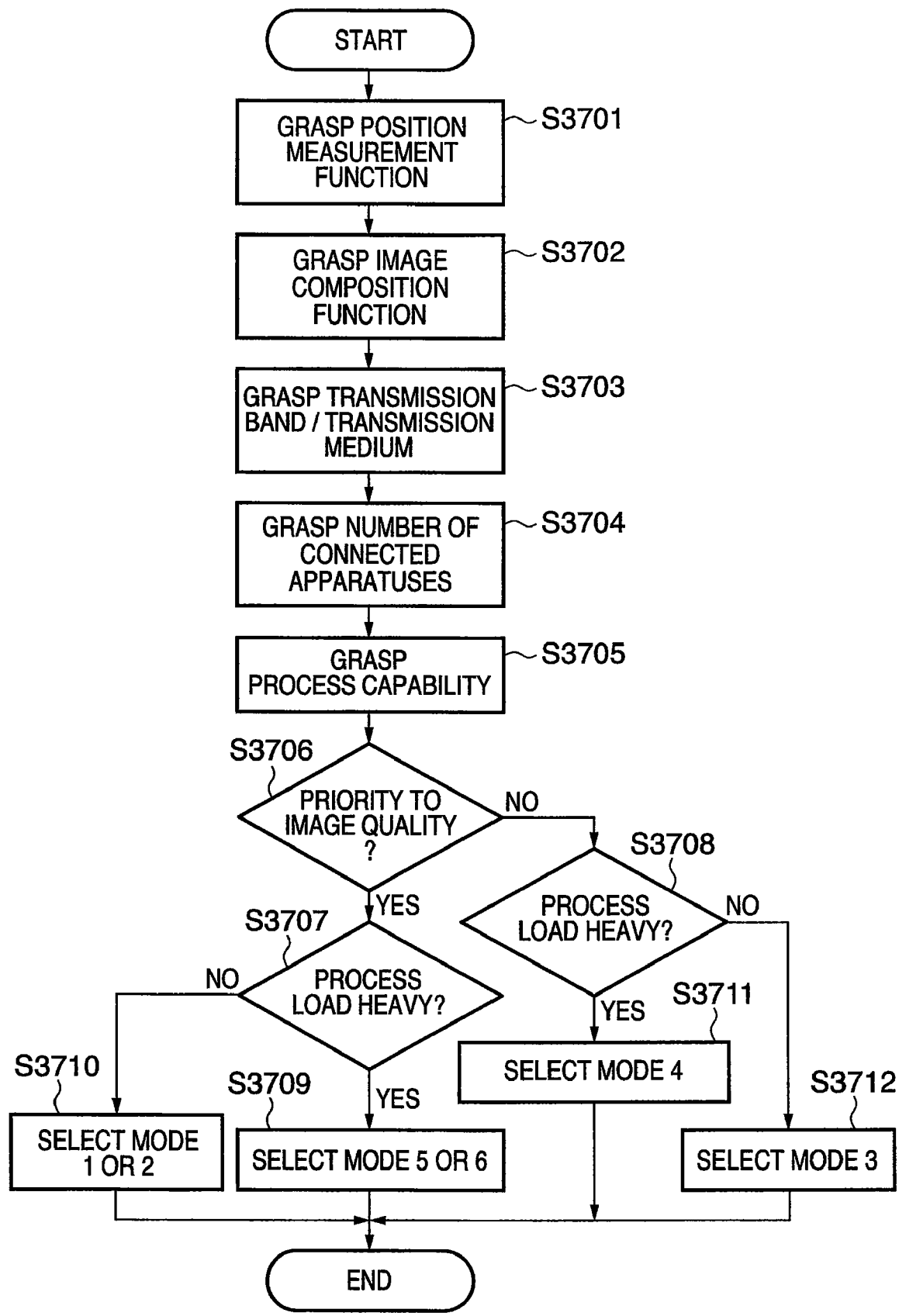
FIG. 36 is a flowchart showing another process of determining the set mode by negotiation.

FIG. 36 is a flowchart showing a process of determining the set mode by negotiation, which is different from that shown in FIG. 35.

Steps S3701 to S3704 are the same as steps S3601 to S3604 in FIG. 36, and a description thereof will be omitted.

In step S3705, the data process capability of the image sensing apparatus 3301 is grasped. Assume that the data process capability of the image processing apparatus 3303 is grasped in advance.

In step S3706, it is determined whether to give priority to the image quality in the system operation. If YES in step S3706, the process advances to step S3707. If NO in step S3706, the process advances to step S3708.

In step S3707, it is determined whether the process load on the image sensing apparatus 3301 and the image processing apparatus 3303 is heavy. If YES in step S3707, the process advances to step S3709. If NO in step S3707, the process advances to step S3710.

In step S3708, considering that no priority is given to the image quality, it is determined whether the process load on the image sensing apparatus 3301 and the image processing apparatus 3303 is heavy. If YES in step S3708, the process advances to step S3711. If NO in step S3708, the process advances to step S3712.

In step S3709, considering that the process load is heavy, mode 5 or 6 is selected. The mode to be selected from modes 5 and 6 may be set in advance, or the way to select the mode is not particularly limited.

In step S3710, considering that the process load is light, mode 1 or 2 is selected. The mode to be selected from modes 1 and 2 may be set in advance, or the way to select the mode is not particularly limited.

In step S3711, considering that the process load is heavy, mode 4 is selected.

In step S3712, considering that no priority is given to the image quality, and the process load is light, mode 3 is selected.

When the determination process changes, the selected mode also changes. The determination process to be employed may be determined in advance or selected on the basis of conditions.

As described above, when a plurality of wireless image sensing apparatuses connect to one image processing apparatus or wireless access point, the degree of distribution of the image formation process is switched, thereby effectively using the band.

[Eighth Embodiment]

In the above-described embodiments, as a method of reducing the data amount, the reduction process by resolution conversion, the compression process, color representation conversion, or tone count conversion is employed. As described above, a sufficient effect can be obtained by one of the data reduction methods. However, the data amount can further be reduced by combining them. When a plurality of processes are, implemented, the circuit scale or process time is expected to increase. However, this means is effective if reduction of the transmission data amount has large significance in the system balance. The combination is not particularly limited.

Those skilled in the art can easily imagine a new system formed by appropriately combining various techniques in the above-described embodiments. The system by various combinations is also incorporated in the present invention.

In the above-described embodiments, which apparatus should execute various functions is determined by negotiation. However, only one function may be determined.

[Other Embodiments]

The object of the present invention is also achieved by the following method. A recording medium (or storage medium) which records software program codes to implement the functions of the above-described embodiments is supplied to a system or apparatus. The computer (or CPU or MPU) of the system or apparatus reads out and executes the program codes stored in the recording medium. In this case, the program codes read out from the recording medium themselves implement the functions of the above-described embodiments. The recording medium that records the program codes constitutes the present invention.

When the computer executes the readout program codes, the operating system (OS) running on the computer partially or wholly executes actual processing on the basis of the instructions of the program codes, thereby implementing the functions of the above-described embodiments.

The program codes read out from the recording medium are written in the memory of a function expansion card inserted to the computer or a function expansion unit connected to the computer. The CPU of the function expansion card or function expansion unit partially or wholly executes actual processing on the basis of the instructions of the program codes, thereby implementing the functions of the above-described embodiments.

The recording medium to which the present invention is applied stores program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-112757, filed Apr. 14, 2006, which is hereby incorporated by reference herein in its entirety.

What is claimed is:

1. An image processing system including an image sensing apparatus for sensing a real space, and an image processing apparatus capable of data communication with the image sensing apparatus, the image sensing apparatus comprising:

a first selection unit that selects one or more combinations, each of which allows to obtain a composite image having a desired image quality, from combinations of plural types of first processes and plural types of second processes, wherein each of the first processes has a different process load and is preset as a candidate process being executed by the image sensing apparatus in order to obtain the composite image by compositing a sensed image by the image sensing apparatus with an image of a virtual space seen from a viewpoint of the image sensing apparatus, wherein each of the second processes has a different process load and is preset as a candidate process being executed by the image processing apparatus in order to obtain the composite image;

a second selection unit that selects by negotiation with the image processing apparatus, from the one or more combinations selected by said first selection unit, a combination which includes the first process being executable in a data process capability of the image sensing apparatus or a combination which includes the first and second processes each executable at a transmission band between the image sensing apparatus and the image processing apparatus;

a first transmission unit that transmits, to the image processing apparatus, data necessary for causing the image processing apparatus to execute the second process included in the combination selected by said second selection unit;

a first reception unit that receives a result of the process executed by the image processing apparatus by using the data transmitted by said first transmission unit;

a first processing unit that executes the first process included in the combination selected by said second selection unit; and a display unit that displays one of the composite image obtained on the basis of the process result by said first processing unit and the composite image obtained on the basis of the process result by said first processing unit and a reception result received by said first reception unit, and the image processing apparatus comprising:

a third selection unit that selects, from the combinations of the plural types of first processes and the plural types of second processes, the one or more combinations each of which allows to obtain the composite image having the desired image quality;

a fourth selection unit that selects by negotiation with the image sensing apparatus, from the one or more combinations selected by said third selection unit, the combination which includes the first process being executable in the data process capability of the image sensing apparatus or a combination which includes the first and second processes each executable at the transmission band;

a second processing unit that executes the second process included in the combination selected by said fourth selection unit, by using the data transmitted by said first transmission unit; and a second transmission unit that transmits a process result by said second processing unit to the image sensing apparatus.

2. The system according to claim 1, wherein when the first process includes a calculation process of obtaining a position and orientation of the viewpoint of the image sensing apparatus and the composition process of compositing the sensed image with the virtual space image, said first processing unit executes the calculation process, said first transmission unit transmits a calculation result of the calculation process, said first reception unit receives a virtual space image generated by the image processing apparatus on the basis of the calculation result transmitted by said first transmission unit, said display unit displays the composite image of the sensed image and the virtual space image received by said first reception unit, said second processing unit generates the virtual space image on the basis of the calculation result transmitted by said first transmission unit, and said second transmission unit transmits the virtual space image generated by said second processing unit.

3. The system according to claim 1, wherein when the second process includes a calculation process of obtaining a position and orientation of the viewpoint of the image sensing apparatus and the composition process of compositing the sensed image with the virtual space image, said first transmission unit transmits the sensed image, said first reception unit receives the composite image of the sensed image and a virtual space image generated by the image processing apparatus on the basis of the sensed image transmitted by said first transmission unit, said display unit displays the composite image received by said first reception unit, said second processing unit obtains the position and orientation of the viewpoint on the basis of the sensed image transmitted by said first transmission unit, generates the virtual space image on the basis of the obtained position and orientation, and generates the composite image of the generated virtual space image and the sensed image, and said second transmission unit transmits the composite image generated by said second processing unit.

4. The system according to claim 1, wherein the sensed image transmitted by said first transmission unit is a reduced image of the sensed image by the image sensing apparatus.

5. The system according to claim 1, wherein the sensed image transmitted by said first transmission unit is a compressed image of the sensed image by the image sensing apparatus.

6. The system according to claim 1, wherein the sensed image transmitted by said first transmission unit is an image obtained by converting color representation and/or the number of tones of the sensed image by the image sensing apparatus.

7. The system according to claim 1, wherein a position and orientation of the viewpoint are obtained by using one of a marker and a natural feature in an image.

8. A control method of an image processing system including an image sensing apparatus for sensing a real space, and an image processing apparatus capable of data communication with the image sensing apparatus, a control method of the image sensing apparatus comprising:

a first selection step of selecting one or more combinations, each of which allows to obtain a composite image having a desired image quality, from combinations of plural types of first processes and plural types of second processes, wherein each of the first processes has a different process load and is preset as a candidate process being executed by the image sensing apparatus in order to obtain the composite image by compositing a sensed image by the image sensing apparatus with an image of a virtual space seen from a viewpoint of the image sensing apparatus, wherein each of the second processes has a different process load and is preset as a candidate process being executed by the image processing apparatus in order to obtain the composite image;

a second selection step of selecting by negotiation with the image processing apparatus, from the one or more combinations selected in said first selection step, a combination which includes the first process being executable in a data process capability of the image sensing apparatus or a combination which includes the first and second processes each executable at a transmission band between the image sensing apparatus and the image processing apparatus;

a first transmission step of transmitting, to the image processing apparatus, data necessary for causing the image processing apparatus to execute the second process included in the combination selected in said second selection step;

a first reception step of receiving a result of the process executed by the image processing apparatus by using the data transmitted in the first transmission step;

a first processing step of executing the first process included in the combination selected in said second selection step; and a display step of displaying one of the composite image obtained on the basis of the process result in the first processing step and the composite image obtained on the basis of the process result in the first processing step and a reception result received in the first reception step, and a control method of the image processing apparatus comprising:

a third selection step of selecting, from the combinations of the plural types of first processes and the plural types of second processes, the one or more combinations each of which allows to obtain the composite image having the desired image quality;

a fourth selection step of selecting by negotiation with the image sensing apparatus, from the one or more combinations selected in said third selection step, the combination which includes the first process being executable in the data process capability of the image sensing apparatus or a combination which includes the first and second processes each executable at the transmission band;

a second processing step of executing the second process included in the combination selected in said fourth selection step, by using the data transmitted in the first transmission step; and a second transmission step of transmitting a process result in the second processing step to the image sensing apparatus.

* * * * *